US012631035B2

(12) United States Patent
Kennelly

(10) Patent No.: US 12,631,035 B2
(45) Date of Patent: May 19, 2026

(54) JIGGING SYSTEMS FOR FABRICATING TIMBER FRAMES AND APPLYING ATTACHMENTS TO MEMBERS THEREOF

(71) Applicant: Illinois Tool Works Inc., Glenview, IL (US)

(72) Inventor: Bernard Joseph Kennelly, New South Wales (AU)

(73) Assignee: Illinois Tool Works Inc., Glenview, IL (US)

( * ) Notice: Subject to any disclaimer, the term of this patent is extended or adjusted under 35 U.S.C. 154(b) by 402 days.

(21) Appl. No.: 18/035,446

(22) PCT Filed: Nov. 5, 2021

(86) PCT No.: PCT/US2021/058239
§ 371 (c)(1),
(2) Date: May 4, 2023

(87) PCT Pub. No.: WO2022/103662
PCT Pub. Date: May 19, 2022

(65) Prior Publication Data
US 2024/0035294 A1     Feb. 1, 2024

(30) Foreign Application Priority Data

Nov. 10, 2020    (AU) ................................ 2020267190

(51) Int. Cl.
| | |
|---|---|
| *E04G 21/18* | (2006.01) |
| *B23Q 3/18* | (2006.01) |
| *E04C 3/02* | (2006.01) |

(52) U.S. Cl.
CPC .............. *E04G 21/18* (2013.01); *B23Q 3/18* (2013.01); *E04C 3/02* (2013.01)

(58) Field of Classification Search
CPC ... B25H 1/00; B25H 1/02; B25H 1/08; B25H 1/10; E04G 21/1841; Y10S 269/904;
(Continued)

(56) References Cited

U.S. PATENT DOCUMENTS

| | | |
|---|---|---|
| 3,068,483 A | 12/1962 | Moehlenpah et al. |
| 3,826,188 A * | 7/1974 | Eberle ..................... B27F 7/155 |
| | | 269/910 |
| 3,837,274 A | 9/1974 | Zaccard |

FOREIGN PATENT DOCUMENTS

WO     WO-2018191116 A1 * 10/2018   ............... E04C 3/17

OTHER PUBLICATIONS

International Search Report and Written Opinion from International Application No. PCT/US2021/058239, mailed Jan. 27, 2022 (14 pages).

* cited by examiner

*Primary Examiner* — Tyrone V Hall, Jr.
(74) *Attorney, Agent, or Firm* — Neal, Gerber & Eisenberg LLP

(57) ABSTRACT

A jigging system for fabrication of a frame provided with at least one attachment applied to one or more members thereof, the system comprising: a support structure to support members arranged within a plane to define members of the frame; and at least one jig configured to hold a said attachment aligned to a defined axis that extends in one of orthogonal directions in the plane and is coaxial with a reference axis or is parallel thereto and spaced therefrom a predetermined distance in the other of the orthogonal directions, and to abut a face of one of the members transverse to the plane, whereby the attachment and member are located for application of the attachment to the member.

15 Claims, 36 Drawing Sheets

(58) Field of Classification Search

CPC ........... Y10T 29/53961; Y10T 29/5397; Y10T 29/53974; Y10T 29/53978

See application file for complete search history.

Block 2.5

32A'/32B'

38

235

160

Base plate 2.5

32C'

39A

39

386

39A

125

TS Stop base plate

32A'/32B'/32C'/32D'

2.5

R2.5

6

Fold Detail:
Typical

32AX"(32AY")/32BY"/32CY''/32DX"

JIGGING SYSTEMS FOR FABRICATING TIMBER FRAMES AND APPLYING ATTACHMENTS TO MEMBERS THEREOF

PRIORITY CLAIM

This application is a national stage application of PCT/US2021/058239, filed on Nov. 5, 2021, which claims priority to and the benefit of Australian Patent Application No. 2020267190, which was filed on Nov. 10, 2020, the entire contents of which is incorporated herein by reference.

FIELD

The present disclosure relates to fabrication of trusses. More particularly, the present disclosure relates to jigging for fabrication of trusses provided with attachments applied to members thereof. The present disclosure has particular, though not exclusive, application to fabrication of a supplementary truss to form part of a truss assembly in a building, such as a timber framed building.

BACKGROUND

In some types of building construction, including construction of timber framed buildings, it is conventional practice to construct the roof using trusses prefabricated in a factory situation and transported to site to be erected onto wall frames or other wall structure of the building. Although the main structure of a roof will normally comprise a series of spaced-apart parallel trusses, in the construction of a complex roof, such as one having hips and/or gables, further trusses are installed to a face of one or more other trusses within the structure after installation so as to extend transversely from the face of that truss, usually at right angles to it. Those further trusses are desirably also prefabricated whereby substantially the entire basic roof structure can be assembled on-site from prefabricated components.

Although construction of a roof from prefabricated trusses removes much of the skill which would otherwise be needed to construct a roof and, of course, enables relatively quick construction, arranging trusses in the assembly of the roof structure can be complicated, particularly given a need for accurate location of supplementary trusses relative to main trusses, which has to be achieved by people working at height and involves a degree of skill.

SUMMARY

According to a first aspect of the present disclosure, there is provided a jigging system for fabrication of a frame provided with at least one attachment applied to one or more members thereof, the system comprising:
a support structure to support members arranged within a plane to define members of the frame; and
at least one jig configured to hold a said attachment aligned to a defined axis that extends in one of orthogonal directions in the plane and is coaxial with a reference axis or is parallel thereto and spaced therefrom a predetermined distance in the other of the orthogonal directions, and to abut a face of one of the members transverse to the plane, whereby the attachment and member are located for application of the attachment to the member.
According to a second aspect of the present disclosure, there is provided a jigging system comprising: a support structure to support members arranged to define members of a frame; and at least one jig adapted to abut at least one of the so arranged members to locate an attachment for application thereto. Preferably, the members are arranged in a plane. Preferably, the, each, or at least one said, jig is configured to hold a said attachment aligned to a defined axis that extends in one of orthogonal directions in the plane and is coaxial with a reference axis or is parallel thereto and spaced therefrom a predetermined distance in the other of the orthogonal directions, and to abut a face of one of the members transverse to the plane, whereby the attachment and member are located for application of the attachment to the member.

According to a third aspect of the present disclosure, there is provided a method of fabricating, using said jigging system, a frame provided with at least one attachment applied to one or more members thereof, comprising:
positioning members and at least one said jig whereby the members are supported by the support structure and at least one of the members is abutted by the jig(s), such that the members are arranged to define members of the frame and the jig(s) is/are arranged to locate said attachment(s) to said one or more members; and
interconnecting the members,
the method including applying the attachment(s) located by the jig(s) to said one or more members.

In preferred embodiments of the present disclosure, interconnecting the members comprises applying at least one said attachment. The method may include, prior thereto, preliminarily interconnecting said members so arranged (e.g. comprising stapling them) to form a pre-assembly, separating the pre-assembly from the support structure or the/each jig sufficiently to permit fitting of the attachment to the/each jig, fitting the attachment to the/each jig and replacing the pre-assembly in position, whereby the attachment(s) is/are located for application. The method could, alternatively, include fitting of the attachment(s) to jig(s) prior to the positioning of the members.

Preferably, the, each or at least one said, jig is adapted to engage, or engages, the support structure to be retained in abutment with the member(s) and/or holding said attachment aligned to a said defined axis.

The system according to preferred embodiments of the present disclosure includes one or more fixtures adapted to engage, or which engage, the support structure and at least one said member to retain ones of the members in fixed relation. The fixture(s) may comprise, for example, any of pucks, posts, stops, blocks, pins, pegs and dowels. Preferably, the, each, or at least one said, jig defines at least one said fixture.

Preferably, said plane is a plane of said truss.

Preferably, the frame or truss comprises a timber frame and/or is for a timber-framed building structure.

Preferably, said orthogonal directions correspond to horizontal and vertical directions relative to the frame or truss in situ.

The members may comprise ones arranged to be perpendicular to one another, preferably such that respective ones thereof extend in said orthogonal directions.

The members may be arranged such that one member is oblique to the, each, or at least one, other member.

The frame may be a truss. The members may comprise ones arranged to define web and chord members of the truss.

The members of the truss may comprise an end web member.

The members of the truss may comprise web and chord members.

The members of the truss may comprise perpendicular web and chord members connected to one another.

The members of the truss may comprise interconnected web and chord members one of which is oblique to the other. The members of the truss may comprise interconnected chord members one of which is oblique to the other. The chord members may comprise top and bottom chord members. One of said chord members may be a sloped chord member. The sloped chord member is preferably a top chord member.

The abutted face of a given one of the members may be an axial or lengthways extending face ("axial face") of the member.

The abutted face of a given one of the members may be an end face of the member.

In a preferred embodiment of the present disclosure, at least one said jig is configured to abut, or abuts, an axial face of a said one of the members (which preferably defines a web member, though possibly defines (for example) a (preferably bottom) chord) member) extending in one (/said one) direction (preferably corresponding to a vertical direction), whereby the attachment and member are located in the other direction (preferably corresponding to the horizontal direction). (The attachment and member may be, more particularly, located to one another along said other direction.) The, each, or at least one such jig may, alternatively or additionally, abut, or be configured to abut, an end face of the member, whereby the attachment and member are located in the one direction (preferably corresponding to the vertical direction). (The attachment and member may be, more particularly, located to one another along said one direction.)

The, each, or at least one such jig preferably is configured additionally to abut, or additionally abuts, an axial face and/or an end face of a(nother) said member (preferably defining a chord member, though possibly defining (for example) a web member) which member either extends in the other direction (preferably corresponding to the horizontal direction, in which case it preferably defines a (preferably bottom) chord member), whereby the attachment and that (other) member are located in said one direction (preferably corresponding to the vertical direction) and/or in said other direction (preferably corresponding to the horizontal direction) respectively, or extends oblique to said orthogonal directions (in which case it preferably defines a top chord member), whereby the attachment and that (other) member are located in said one direction (preferably corresponding to the vertical direction). (The attachment and that (other) member may be, more particularly, located to one another along said one direction and/or other direction (respectively), or along said one direction, respectively.) Preferably, the jig is configured to abut, or abuts, the members adjacent a junction therebetween such that application of the attachment interconnects the members (preferably in the formation of a joint of the frame) at or adjacent said junction and/or positions the attachment correctly for fastening the frame to a structure—preferably comprising a(nother) frame or truss—adjacent the junction.

In a preferred embodiment of the present disclosure, at least one said jig is configured to abut, or abuts, an end face and/or an axial face of a said member (preferably defining a chord member, though possibly defining (for example) a web member) which extends in a first one of said orthogonal directions (preferably corresponding to a horizontal direction, in which case the member preferably defines a bottom chord member, though possibly corresponding to the vertical direction, in which case the member preferably defines a web member), whereby the attachment and member are located in the first direction and/or in the second direction (preferably corresponding to the vertical direction) respectively. (The attachment and member may be, more particularly, located to one another along said first direction and/or along the second direction, respectively.)

The, each, or at least one such jig preferably is configured additionally to abut, or additionally abuts, an axial face and/or an end face of a(nother) said member which member either extends in the second direction (preferably corresponding to the vertical direction, in which case it preferably defines a web member, though possibly corresponding to the horizontal direction, in which case it preferably defines a (preferably bottom) chord member) whereby the attachment and that (other) member are located in said first direction (preferably corresponding to the horizontal direction) and/or in said second direction (preferably corresponding to the vertical direction) respectively, or extends oblique to said orthogonal directions (in which case it preferably defines a top chord member) whereby the attachment and that (other) member are located in said one direction (preferably corresponding to the vertical direction). (The attachment and that other member may be, more particularly, located to one another along said one direction and/or other direction (respectively), or along said one direction, respectively.) Preferably, the jig is configured to abut, or abuts, the members adjacent a junction therebetween such that application of the attachment interconnects the members (preferably in the formation of a joint of the frame) at or adjacent said junction and/or positions the attachment correctly for fastening the frame to a structure—preferably comprising a(nother) frame or truss—adjacent the junction.

Preferably, a said jig is positionable or positioned such that ones of the members abutted by the jig adjacent a said junction therebetween are perpendicular (preferably extending in said orthogonal directions) and/or define chord (preferably bottom chord) and web members. Preferably, that jig is so positionable or positioned that application of the attachment interconnects the members (preferably in the formation of a joint of the frame) at or adjacent said junction and/or positions the attachment correctly for fastening the frame to a structure—preferably comprising a(nother) frame or truss—adjacent the junction. Preferably, the jig comprises perpendicular locating faces arranged to contact respective said faces of those members.

Preferably, a said jig is positionable or positioned such that one and the other of the members abutted by the jig adjacent a said junction therebetween extend in one of said orthogonal directions and oblique thereto, and/or define a web or chord member (preferably web member) and a chord (preferably top chord) member, respectively. Preferably, that jig is so positionable or positioned that application of the attachment interconnects the members (preferably in the formation of a joint of the frame) at or adjacent said junction and/or positions the attachment correctly for fastening the frame to a structure—preferably comprising a(nother) frame or truss—adjacent the junction. Preferably, the jig comprises at least one flat locating face, arranged to contact a corresponding flat face of said one member. The locating face may be defined, for example, by a block of the jig. Preferably, the jig comprises a locating edge or portion arranged to extend or project in a direction perpendicular to said plane to contact a said face of said other member along that direction. Said edge may be defined, for example, by a block of the jig. Said locating portion may comprise a transversely convex face, and may be defined, for example, by a pin or peg.

Preferably, at least one said jig which is so positioned or positionable is configured such that an axis of a hinge defined by the attachment is located to be coaxial with a said defined axis, being an axis about which the frame or truss is to be swingable relative to a structure—preferably comprising a(nother) truss (preferably a truncated girder truss)—when fastened to that structure via the attachment ("swing axis"), whereby the frame or truss is so swingable via the hinge.

In an embodiment of the present disclosure, each said jig which is so positioned or positionable is configured such that axes of respective hinges defined by the attachments are located to be coaxial with a said defined axis, being an axis about which the frame or truss is to be swingable relative to a structure—preferably comprising a(nother) truss (preferably a truncated girder truss)—when fastened to that structure via the attachment ("swing axis"), whereby the frame or truss is so swingable via the hinge(s).

In an embodiment of the present disclosure, a said jig abuts or is configured to abut—preferably to locate the/a said attachment for application thereto—a said member (which member preferably defines a said chord member (preferably a top chord member, and more preferably a sloped top chord member, though possibly a bottom chord member (which could be sloped)) and/or extends in one or the other of, or oblique to, said orthogonal directions) whereby a datum defined by the attachment is located to be coaxial with the/a said defined axis. Preferably that member comprises a section arranged to project from or beyond a (/a said/the) junction between the member and (the/an/)other said member of the frame or truss (defining preferably a web member, though possibly a(nother) chord member), and the jig abuts or is configured to abut said section whereby the attachment is applied to said section. Preferably, a portion of the attachment defining the datum projects from said section/member when the attachment is applied thereto.

In a preferred embodiment of the present disclosure, the defined axis with which said datum is located to be coaxial is said reference axis (/coaxial therewith) and the defined axis which is a said/the swing axis is a said predetermined distance therefrom, or vice versa.

Preferably, the datum is defined by an edge of the attachment, whereby when the frame or truss has been swung relative to a said structure to which it is fastened, so as to be in an extended position, the datum is disposed to be abuttable by another structure—preferably comprising a truss (preferably a truncated standard truss)—so as to locate that other structure relative to the frame or truss in a direction parallel to the plane thereof.

According to a fourth aspect of the present disclosure, there is provided the, each, or at least one said, jig of/for the jigging system.

Preferably, at least one said jig comprises one or more locators arranged to abut said member(s) or face(s) thereof.

Preferably, the, each, or at least one said, locator comprises a stop arranged to abut said member(s) or face(s) thereof.

At least one said locator may comprise a said locating edge or portion arranged to extend or project in a direction perpendicular to said plane. At least one said locator may have at least one face ("locating face")/one said locating face positioned so as to extend transverse—preferably perpendicular—to a plane within which the members are supported by the support structure so as to abut the member face(s). At least one said locating face may comprise a flat face positioned to contact a corresponding flat face of a said member, whereby the attachment is aligned to an axis (/longitudinal axis) of the member to which it is located.

At least one said locator may comprise an edge arranged to extend perpendicular to said plane.

At least one said locator may be defined by a block.

At least one said locator may be defined by a post, peg or pin.

Preferably, the or each jig comprises a holder which holds, or is configured to hold, the attachment in a predetermined orientation about an axis perpendicular to a plane of the frame or truss defined by the so arranged members ("rotational axis") whereby the attachment is located rotationally with respect to the member(s) to which it is to be applied.

Preferably, the holder is keyed to the attachment so as to be engaged, or engageable, therewith in said orientation.

Preferably, the holder comprises a template which fits to the attachment in said orientation.

Preferably, the holder comprises a sidewall having a configuration complementary to an edge of the attachment to engage the edge whereby the holder is fitted to the attachment in said orientation.

In preferred embodiments of the present disclosure, the holder comprises a recess, which is preferably upwardly opening, to receive the attachment therein.

Preferably, the recess extends throughout the holder in a direction along said rotational axis, whereby the attachment is received against a support surface of/defined by the support structure.

Preferably, the recess is defined by or configured in the form of a cutout.

Preferably, the or each jig comprises a base defining the holder. Preferably, the base is unitary. Preferably, the base is of single-piece construction.

Preferably, the or each jig comprises a support via which it is supported, or supportable, by the support structure and which supports one or more said locators of the jig. Preferably, the support is defined by a base of the jig.

Preferably, the or each jig comprises a section of plate which defines a said support or base of the jig. Preferably, a face of said section of plate is arranged to be received against the support surface.

In the system or method according to a preferred embodiment of the present disclosure, at least one (/one said) fixture (e.g. of the system) is securable or secured to part of the support structure so as to abut at least one of the members, whereby they are so arranged in fixed relation to be interconnectable in the fabrication of the frame or truss. The fixture(s) may comprise any of pucks, stops, blocks, pins, pegs and dowels. In the preferred embodiments of the present disclosure, the, each, or at least one said, jig defines a said fixture.

Preferably, the support structure comprises at least one support surface arranged, preferably in a plane, to support the members thereover.

In a preferred embodiment of the present disclosure, the support structure comprises a table—preferably a jig table—defining a said support surface.

In the preferred embodiments of the present disclosure, the or each jig is engaged or engageable with the support structure (whereby the attachment held thereby is so located) to be restrained from movement parallel to the plane.

In the preferred embodiments of the present disclosure, the, each, or at least one said, jig is engageable with the support structure at variable positions, or is engaged with the support structure at one of variable positions which is selected, according to a configuration and/or dimensions of the frame or truss and/or said members to locate the attachment.

In a preferred embodiment of the present disclosure, the, each, or at least one said, jig is engageable with the support structure at variable positions along an axis extending in one of said orthogonal directions, or engages the support structure at one of such variable positions which is selected, preferably according to at least a configuration and/or dimensions of the frame or truss and/or said members, to hold a said attachment aligned thereto.

Preferably, the, each, or at least one said, jig is engageable with the support structure at variable positions along either/any one of plural such axes, or is engaged with the support structure at one of variable positions which is selected, preferably according to at least a configuration and/or dimensions of the frame or truss and/or said members) to hold a said attachment aligned thereto. The plural axes may comprise axes extending in respective ones of said orthogonal directions and/or respective parallel axes extending in either or each of said directions.

In a preferred embodiment of the present disclosure, the, each, or at least one said, jig is, while engaged with the support structure, moveable or moved (preferably slideable or slid), along an axis extending in a said direction, from a set-back position, in which it does not abut one of the arranged members, to an advanced position, in which it abuts the member, whereby the attachment and member are correctly positioned relative to one another in a direction perpendicular to the face, such that the attachment is located for application to the member(s) to which it is to be applied.

In a preferred embodiment of the present disclosure, the, each, or at least one said, jig is adapted to engage the support structure at variable positions along an axis extending in one of said orthogonal directions, or engages the support structure at one of such variable positions which is selected, preferably according to at least a configuration and/or dimensions of the frame or truss and/or said members, to hold a said attachment aligned thereto.

In a preferred embodiment of the present disclosure, the system includes one or more retainers via which the, each, or at least one said, jig can be engaged with the support structure in positions which are variable, or is engaged with the support structure in one of such positions, preferably according to at least a configuration and/or dimensions of the frame or truss and/or said members—e.g. so as to be restrained or restrainable from movement parallel to the plane and/or to hold a said attachment aligned to a said axis.

The, each, or at least one said, retainer may comprise a fastener or fastening engaging, or adapted to engage, the jig and support structure whereby they are interengaged.

The, each, or at least one said, retainer may comprise a clamp. In a preferred embodiment of the present disclosure, the, each, or at least one said, jig comprises a said clamp. Preferably, said clamp engages, or is engageable with, at least one portion—preferably an edge portion—of the support structure. Preferably, the support structure comprises a table (preferably comprising a jigging table) defining said support surface(s). Preferably, the, each, or at least one said, portion comprises an edge portion of a tabletop of the table defining said support surface(s). At least one said portion may be defined by a peripheral edge of the tabletop. Preferably, the, each, or at least one said, portion extends in either or each of said orthogonal directions.

In a preferred embodiment of the present disclosure, at least one said retainer comprises one or more projections extending, or adapted to extend, from a portion of at least one said jig and/or the support structure to engage the support structure and/or the jig(s) respectively, preferably (at least) transversely to the projection. The, each, or at least one said, projection may fit and/or be secured in, or be configured to fit and/or be securable in at least one void. The, each, or at least one said, void may be defined by the support structure.

In a particular embodiment of the present disclosure, a said clamp includes at least one said projection interconnecting the opposed clamping parts thereof.

The, each, or at least one said, void may be defined by the, each, or at least one said, jig.

In a preferred embodiment of the present disclosure, the support structure is configured with/defines one or more voids, preferably opening through the support surface(s), and the retainer(s) comprise/s one or projections arranged to extend from portion(s) of the jig(s) to fit and/or be secured or securable in one or more, or ones of, said voids.

Preferably, one or more said voids are arranged or arrangeable to extend along at least one of said orthogonal directions.

The void(s) may comprise at least one slot or groove, preferably arranged or arrangeable to extend along at least one of said orthogonal directions.

In a preferred embodiment of the present disclosure, the, each, or at least one said, projection comprises a rib or tongue configured, preferably arranged or arrangeable to extend along at least one of said orthogonal directions, to fit in a void/slot or groove.

In the preferred embodiments of the present disclosure, the one or more voids are arranged such that the jig(s) hold/s the attachment(s) (aligned) to respective said axes/a said axis.

Said configuration may comprise, for example, handedness.

Said void(s) may comprise at least one hole.

The, each or at least one said, projection may comprise a peg or dowel.

The, each, or at least one said, projection or void may be arranged or arrangeable to extend from and/or through a respective portion—preferably comprising a periphery or edge portion—of one or more said bases or supports.

The, each, or at least one said, projection or void may be arranged or arrangeable at a respective portion—preferably comprising a periphery or edge portion—of one or more said bases or supports.

In a preferred embodiment of the present disclosure, the projection(s) comprise one(s) arranged/arrangeable at or to extend from, and preferably defined by or integral with, said portion(s).

In a preferred embodiment of the present disclosure, the void(s) comprise one(s) arranged/arrangeable at, or to extend from or through, said portion(s).

Preferably, the system comprises at least one track via which the support structure and the, each, or at least one said, retainer or jig are interengaged or interengageable. The, each, or at least one said, track may comprise one or more voids, such as grooves or slots.

In preferred embodiments of the present disclosure, the, each, or at least one said, jig is engaged or engageable with the support structure via at least one said projection received in the track, whereby a position thereof is adjustable along a direction of the track, preferably throughout a continuum along said direction.

Preferably, the projection(s) comprise/s at least one which can fit in selectable ones, or fits in a selected one, of said voids whereby the position of at least one said jig engaged with the support structure via at least one such projection which so fits is variable, preferably throughout a continuum along said direction.

Preferably, the projection(s) comprise/s at least one which can be arranged at any of selectable, or is arranged at one or more selected, portions of at least one said jig, or of a said support or base of at least one said jig, such that the position of at least one said jig engaged with the support structure via at least one such projection so arranged is variable.

In a preferred embodiment of the present disclosure, the, each, or at least one said, jig is, while engaged with the support structure, moveable or moved (e.g. slideable or slid) from a set-back position, along one (/said one) of said orthogonal directions, to abut at least one face of at least one of the members transverse (preferably perpendicular) to the/a said plane whereby the attachment and the or each member a said face of which the jig abuts are correctly positioned relative to one another in (/along) that direction.

Preferably, one or more said portions at which said projection(s) is/are arranged is a portion of a said plate section.

Preferably, each support is formed from plate.

In a preferred embodiment of the present disclosure, one or more said portions at which said projection(s) is/are arranged connects to the plate section via a bend or fold formed in said plate at that portion.

In a preferred embodiment of the present disclosure, the, each, or at least one said, projection is defined by a fastener.

In a preferred embodiment of the present disclosure, plural said voids comprise ones arranged in a grid—preferably in or along lines extending in said orthogonal directions. Preferably, the system is configured such that said variable positions comprise positions along one or more lines over the surface.

According to a fifth aspect of the present disclosure, there is provided a method of forming from plate an attachment securable to one or more timber frame members, the attachment having one or more edges configured such that it is keyed to a jig whereby engagement of the edge(s) with the jig locates the attachment to the member(s) for securement thereto, the method comprising stamping the plate whereby at least one said edge is formed.

According to a sixth aspect of the present disclosure, there is provided at least one said attachment formed by the method.

According to a seventh aspect of the present disclosure, there is provided an attachment securable to one or more timber frame members, the attachment having one or more edges configured such that it is keyed to a jig whereby engagement of the edge(s) with the jig locates the attachment to the member(s) for securement thereto, the attachment being formed from plate and at least one edge thereof being stamped.

Preferably, at least one said edge defines or comprises a peripheral edge of the attachment. Preferably, said edge(s) define/s a periphery of the attachment.

Preferably, the attachment comprises a base portion receivable adjacent the member(s) when the attachment is secured thereto.

Preferably, the attachment comprises projections driveable into the timber to secure the attachment. Preferably, the projections comprise teeth or spikes.

Preferably, the projections are transverse to said base portion.

Preferably, the projections are integral with said base portion.

In preferred embodiments of the present disclosure, the attachment comprises a portion engageable with another member when the attachment is secured. The portion may be connectable to the other member to be engaged with the other member. Preferably, the attachment comprises a living hinge. Preferably, the living hinge defines an interconnection between the base portion and said portion engageable with another member.

Preferably, the portion engageable with another member extends or projects transverse to an interconnection between it and said base portion.

The portion engageable with another member may be abuttable by the other member to be engaged therewith.

Preferably, the plate is formed with transverse projections driveable into the timber to secure the attachment. Preferably, the projections are bent from a section of the plate defining a base portion of the attachment receivable adjacent the member(s). The method may include forming respective bends in said plate whereby said projections are bent from said section. The method may include forming the projections. Preferably, forming the projections comprises stamping the projections. Alternatively, the plate may be preformed with respective bends and thus said transverse projections. Preferably, the bends are pressed in said section. Preferably, the bends are pressed by at least one tool of a press by which said plate is received.

Preferably, the stamping is effected by at least one tool of a press by which said plate is received.

Preferably, the stamping is effected by a single pressing operation.

In an embodiment of the present disclosure, stamping and bending are simultaneous/carried out simultaneously and/or are carried out via a single pressing operation.

Preferably, the plate comprises a (preferably smooth) section defining a portion of the attachment engageable with another member when the attachment is secured. In preferred embodiments of the present disclosure, stamping the plate comprises stamping that section, preferably such that at least one said edge defines an edge of said portion engageable with another member.

In a preferred embodiment of the present disclosure, the attachment is formed with opposite lateral edges defining edges of said base portion and portion engageable with another member respectively. Preferably, the lateral edge defining an edge of the base portion is defined by an edge of the plate.

In the method according to preferred embodiments of the present disclosure, at least one further such attachment is formed from said plate, the method comprising stamping the plate whereby at least one said edge of the/each further attachment is formed.

Preferably, the attachments comprise ones formed in opposed relation. Preferably, opposed edges of the plate define respective edges of portions of the attachments, those portions preferably being base portions of the attachments (preferably comprising a said base portion of each attachment). Preferably, the plate comprises laterally opposed sections defining respective ones of those (preferably base) portions. Preferably, the plate comprises an intermediate section arranged between said laterally opposed sections to define other portions of the attachments, preferably being portions (/said portions) engageable with another member when the attachment is secured, the intermediate section preferably being smooth. Preferably, said stamping comprises cutting the intermediate section, preferably with at least one tool of a press by which said plate is received. Preferably, said other portions are formed extending or projecting in opposite directions in side-by-side relation. In a preferred embodiment of the present disclosure, said other portions are defined by, and are preferably cut from, regions of said intermediate section which are side by side or arranged in side-by-side relation along a direction to which said opposite directions are transverse.

In a preferred embodiment of the present disclosure, at least one formation is formed in or into the plate to define said living hinge(s). Preferably, said formation(s) comprise/s one or more cutouts through the plate.

Preferably, said formation(s) is/are pressed into and/or stamped into said plate. Preferably, said stamping comprises stamping said formation(s) (defining said hinge(s)) into said plate.

Preferably, the formation(s) is/are formed by a (/said) press/at least one (/said) tool thereof by which said plate is received.

Preferably, said formation(s) is/are formed in said single pressing/stamping operation—preferably by one or more tool(s) of a said press/pressing apparatus.

In a preferred embodiment of the present disclosure, the plate is formed as a blank comprising sections defining said portions of the attachment.

Preferably, at least one edge of the plate or blank defines an edge of the attachment. Preferably, the attachment is formed with at least one edge additional to the edge defined by the plate or blank—preferably comprising at least one edge transverse that edge—preferably spaced apart such edges. Preferably, the/either/each said transverse edge is defined by the plate.

According to a preferred embodiment of the present disclosure, said jigging system includes or is provided with at least one said attachment.

In the description in this specification, reference may be made to subject matter that is not within the scope of the appended claims. That subject matter should be readily identifiable by a person skilled in the art and may assist in putting into practice the present disclosure as defined in the presently appended claims.

BRIEF DESCRIPTION OF THE DRAWINGS

Preferred embodiments of the present disclosure will be further described, by way of non-limiting example only, with reference to the accompanying drawings in which.

DETAILED DESCRIPTION

Figure 1A:
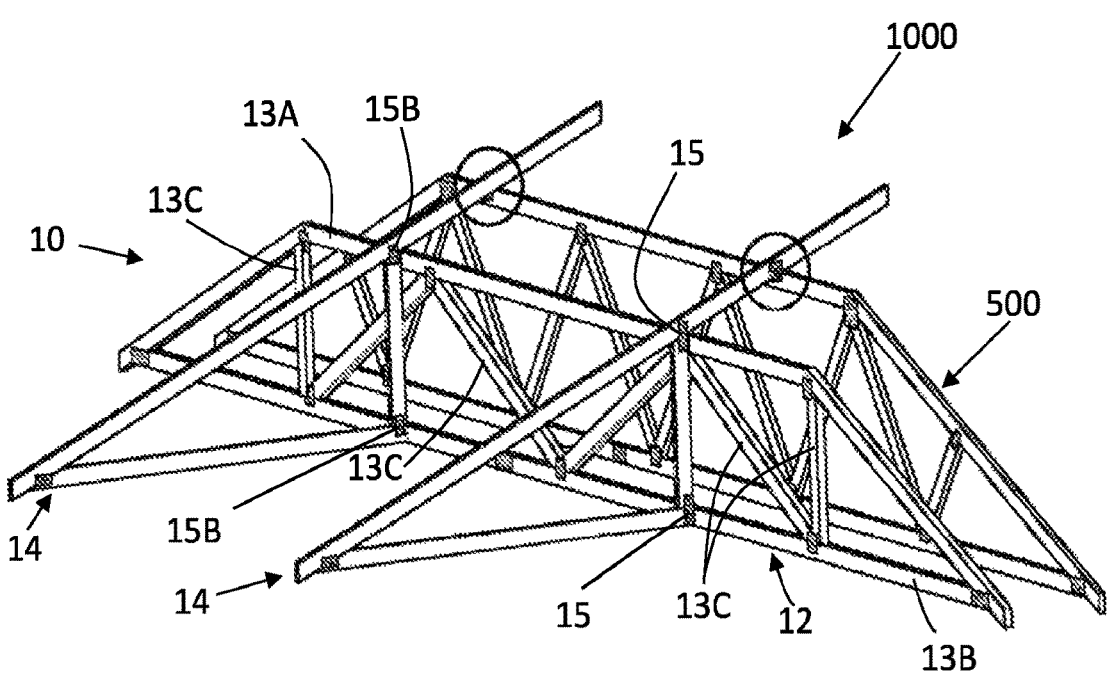
FIG. 1A is a perspective view of part of a roof structure, including a truss assembly constructed according to an embodiment of the present disclosure, which assembly comprises (left-hand and right-hand) supplementary (jack) trusses and a main (truncated girder) truss to which they are connected via upper and lower hinged fastening attachments, and a truncated standard truss which is located to and secured to the truss assembly.

While the systems, devices, and methods described herein may be embodied in various forms, the drawings show, and the specification describes certain exemplary and non-limiting embodiments. Not all components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

Figure 1B:
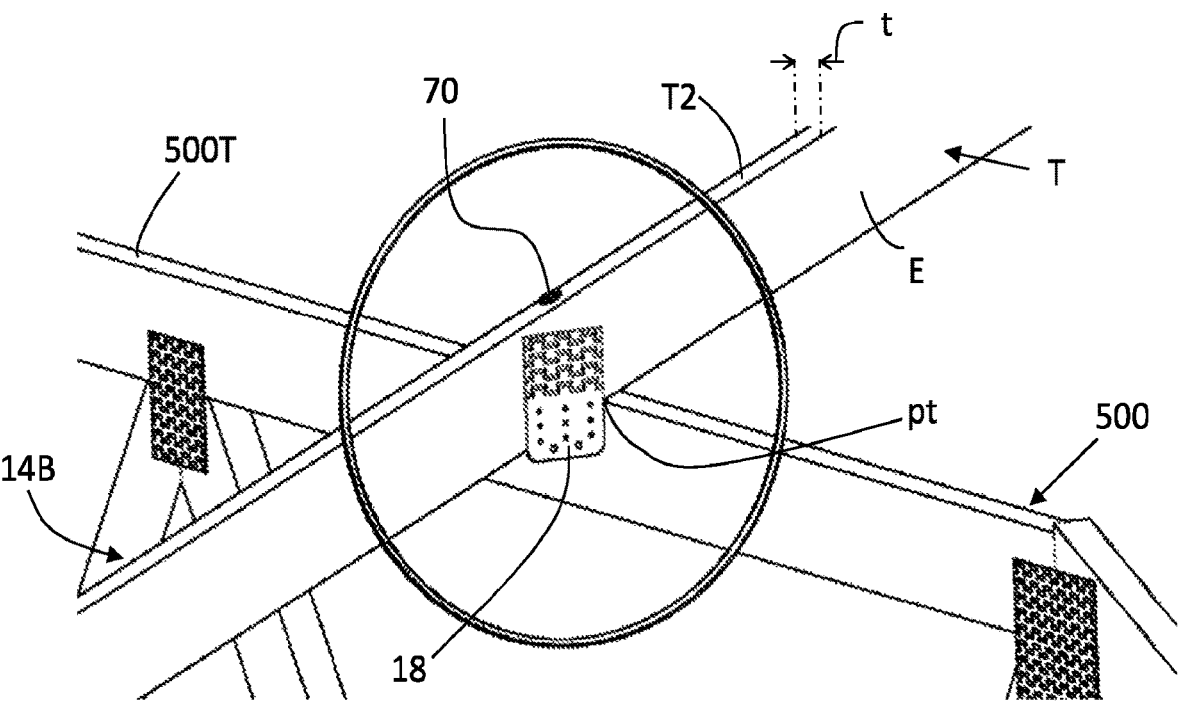
FIG. 1B is a perspective view showing abutment between an edge of a locating attachment, applied to an extension of the jack truss top chord, and the top chord of the truncated standard truss, whereby the further truncated standard truss is correctly located.

Shown in FIGS. 1A and 1B are details of a timber-framed building roof structure 1000, comprising a truss assembly 10, constructed according to a preferred embodiment of the present disclosure, in an erected or extended configuration/position and a truncated standard truss 500.

Figure 2A:
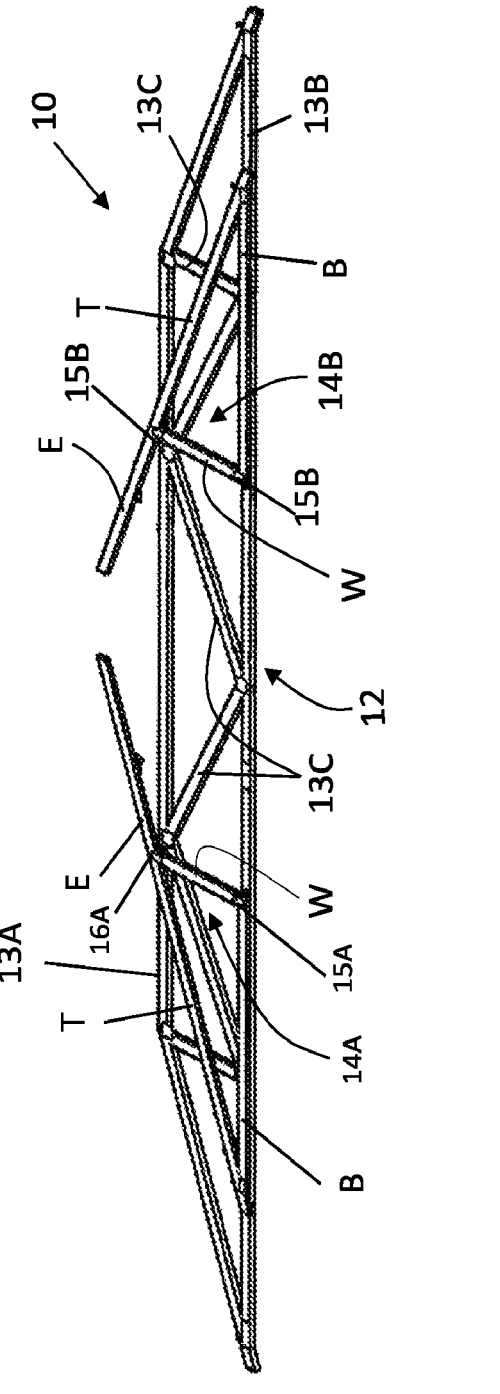
FIG. 2A is a perspective view showing the truss assembly, pre-installation, in a collapsed condition.

Referring also to FIG. 2A, which shows the assembly 10 in a collapsed or "folded" condition, suitable for transportation thereof and for lifting it onto the structure which is to support it in the building, the assembly 10 comprises a main truss 12, being a truncated girder truss which includes top 13A and bottom 13B chord members and web members 13C, and two oppositely handed supplementary trusses, generally designated by reference numeral 14 and comprising a left hand-truss 14A and a right-hand truss 14B, each being a jack truss, hingedly connected to the main truss 12 whereby it is swingable about a substantially vertical axis between a collapsed or "folded" position/configuration, shown in FIG. 2A, in which each supplementary truss 14 lies adjacent and parallel to the main truss 12, and the erected or extended configuration/position, in which the supplementary truss 14 is transverse to the main truss 12. The supplementary trusses 14 form a hip end in the roof, and each of them comprises a bottom chord B, web W and top chord T. The top chord T is configured with an extension E, which projects from a joint between the top chord T and the web W.

The number of supplementary trusses 14 connected to the main truss 12 in the assembly, which is two in the illustrated embodiment, can vary without departure from the present disclosure. For example, in other embodiments of the present disclosure, there may be only a single supplementary truss 14 connected to the main truss 12, or may be multiple supplementary trusses—e.g. three, four or five such trusses—connected to the main truss 12.

Each supplementary truss 14 is prefabricated and in the illustrated embodiment is shorter in length/generally smaller than the main truss 12, though in other embodiments the supplementary truss 14 and main truss 12 could be comparable in length/size or the latter possibly even longer/larger than the former. In the example shown, each of the supplementary trusses 14 is of a length which enables the set of supplementary trusses 14 to be folded flat against the face of the main truss 12 and which is desirable as it enables a series of such truss assemblies 10 to be stacked flat for transportation. Nevertheless, the overall concept would still be applicable for use with somewhat longer supplementary trusses in which, in their folded condition for transportation, an outer end of one supplementary truss might overlap the inner end of the adjacent supplementary truss whereby in its folded state it is inclined to the adjacent face of the main truss rather than lying flat against it.

Figure 7A:
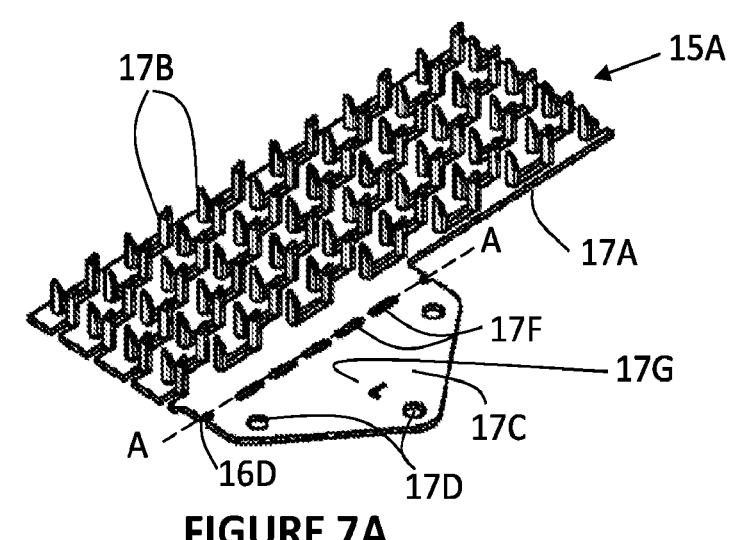
FIGS. 7A and 7B are perspective views of a left-hand version and right-hand version, respectively, of the hinged fastening attachment.
Figure 7B:
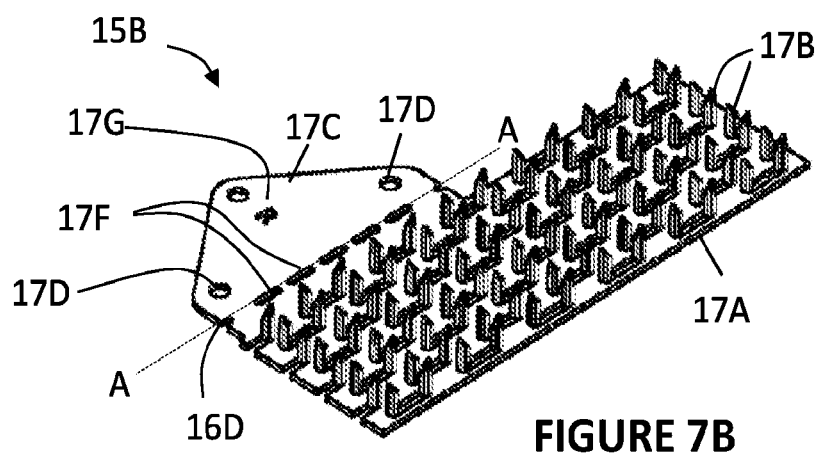

Referring also to FIGS. 7A and 7B, the assembly 10 includes hinged fastening attachments, generally designated by the reference numeral 15 and comprising a left-hand fastening attachment 15A and a right-hand fastening attachment 15B (which are described in further detail later), which securely connect the main truss 12 to each supplementary truss 14, permitting the supplementary trusses 14 to be swung from their collapsed positions, which they assume when the assembly 10 is in its collapsed condition—appropriate for transportation of the assembly 10 to site, typically on the bed of a truck, and for lifting the assembly 10, typically by way of a crane, into position on the top plate or other underlying support structure—to their extended positions, whereby the assembly 10 assumes its erected condition. Depending on the design of the roof structure, the angle through which each supplementary truss 14 is displaced rotationally, relative to the main truss 12 and about the (common) axis of the hinged fastening attachments 15, from its collapsed position to assume its extended position can be a right angle/90° (as illustrated) or instead could be acute. The assembly 10, particularly in its collapsed condition, is symmetrical about an axis in the plane of the main truss 12 and perpendicular to the bottom chord 13B of that truss (which axis is vertical when the assembly 10 is installed), whereby the hinged fastening attachments 15 are configured as the left-handed attachments 15A and right-handed attachments 15B.

Each attachment 15 has a nail plate portion, having a base 17A and spikes or teeth 17B which project from (and are integral with) the base 17A and are pressable into the truss member timber such that the base 17A is received thereagainst/adjacent thereto and the attachment 15 is thus applied. The attachment 15 further includes flange or tab 17C, which is coplanar (and integral) with the base 17A and projects from the periphery thereof, defining a connector portion of the attachment 15, the tab 17C being configured with one or more (preferably plural) mounting holes 17D to receive one or more respective fasteners, typically screws, to secure the tab 17C against a respective one of the top 13A and bottom chord 13B members of main truss 12. Each attachment 15 includes a living hinge 16D at which, or adjacent to where, the base 17A and tab 170 are interconnected, which is configured with perforations or slots/apertures 17F arranged in a line corresponding to the hinge axis A and is thereby relatively compliant so as to be able to bend as the respective truss 14 is rotated from its collapsed position to its extended position. The attachments 15A and 15B can be configured (preferably stamped) with indicia 17G, such as the letters L and R, to indicate they are of the left- and right-handed forms, respectively.

Figure 18A:
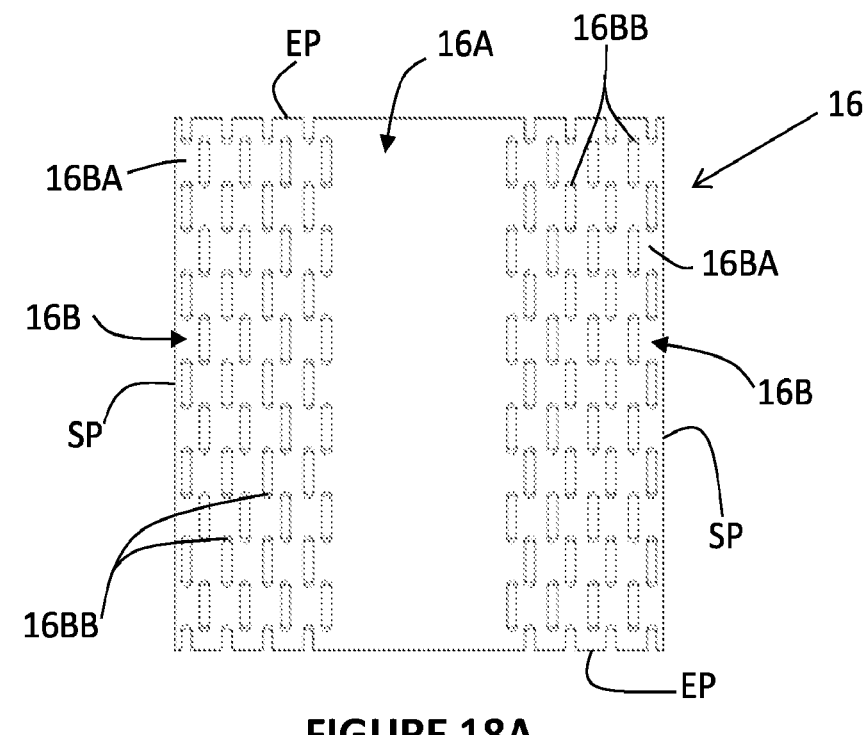
FIGS. 18A to 18E show blanks for forming hinged fastening attachments.

Referring to FIG. 18A, each attachment 15 is stamped from a blank 16, which is itself stamped (including cut/ punched), from substantially planar metal (preferably steel) plate (e.g. 1.2 mm thick).

The blank 16 comprises opposed end edges EP and opposed side edges SP, the edges EP being parallel and the edges SP being likewise parallel and also perpendicular to the edges EP, whereby the blank 16 has a rectangular or square periphery. The blank 16 has a smooth central portion 16A and nail plate or portions 16B to either lateral side of portion 16A, the portions 16A and 16B each extending from one of edges EP to the other. Each of portions 16B defines a respective one of the edges SP and comprises a base portion 16BA, lying in the plane of the plate/portion 16A, and spikes or teeth 16BB, cut/punched into and bent from the base portion 16BA so as to extend transverse thereto. The spikes or teeth 16BB of the portions 16B of blank 16 project in the same direction/are arranged on the same side of the blank 16.

Figure 18B:
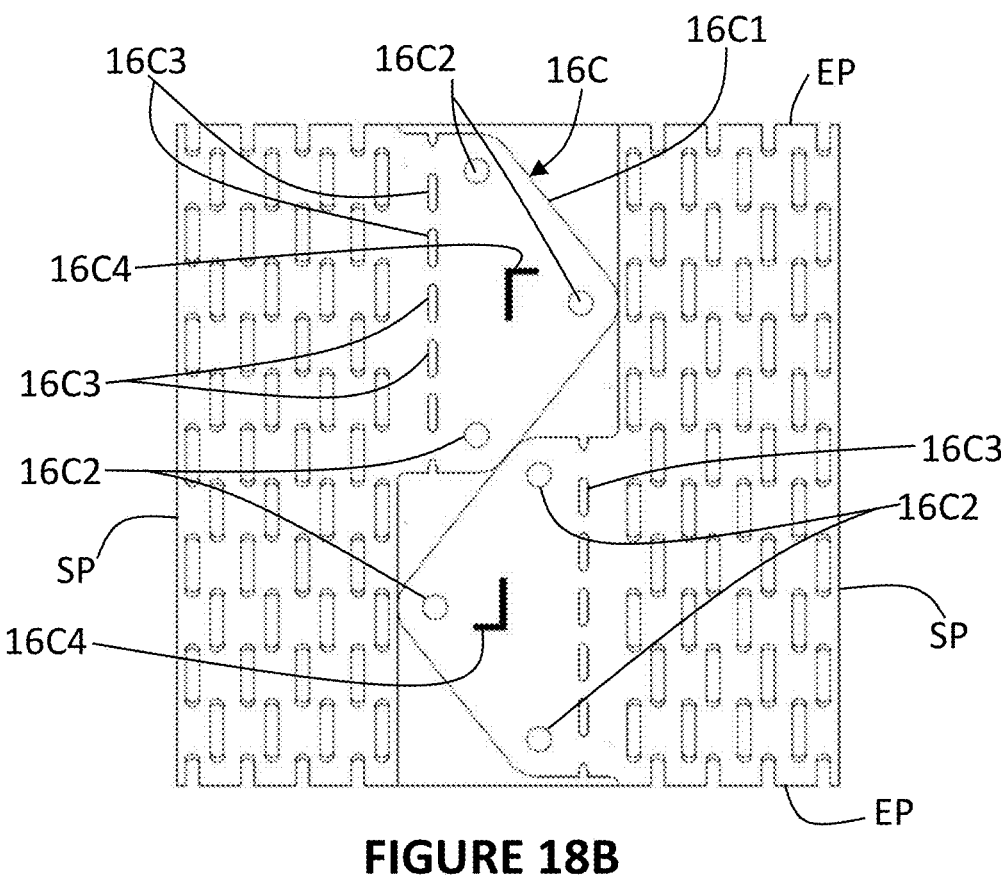

FIG. 18B shows the configuration of cuts formed through the blank 16 (particularly the portion 16A thereof), or (imaginary) lines along/at which such cuts are formed, designated generally by the reference numeral 16C using a pressing apparatus, as will be known to a person skilled in the art—to form a pair of left-hand attachments 15A. Referring also to FIGS. 7A and 7B, the cut lines 160 comprise: lines 1601, each extending from one of the edges EP to the other and defining one of laterally opposed side edges of a respective attachment 15A (including the edge of tab 17C), the other of which side edges is defined by a respective edge SP; lines 1602, which are endless and define respective ones of mounting holes 17D, cuts 1603, which are likewise endless and define respective ones of the apertures 17F; and cuts 1604, which define the indicia 17G.

Figure 18C:
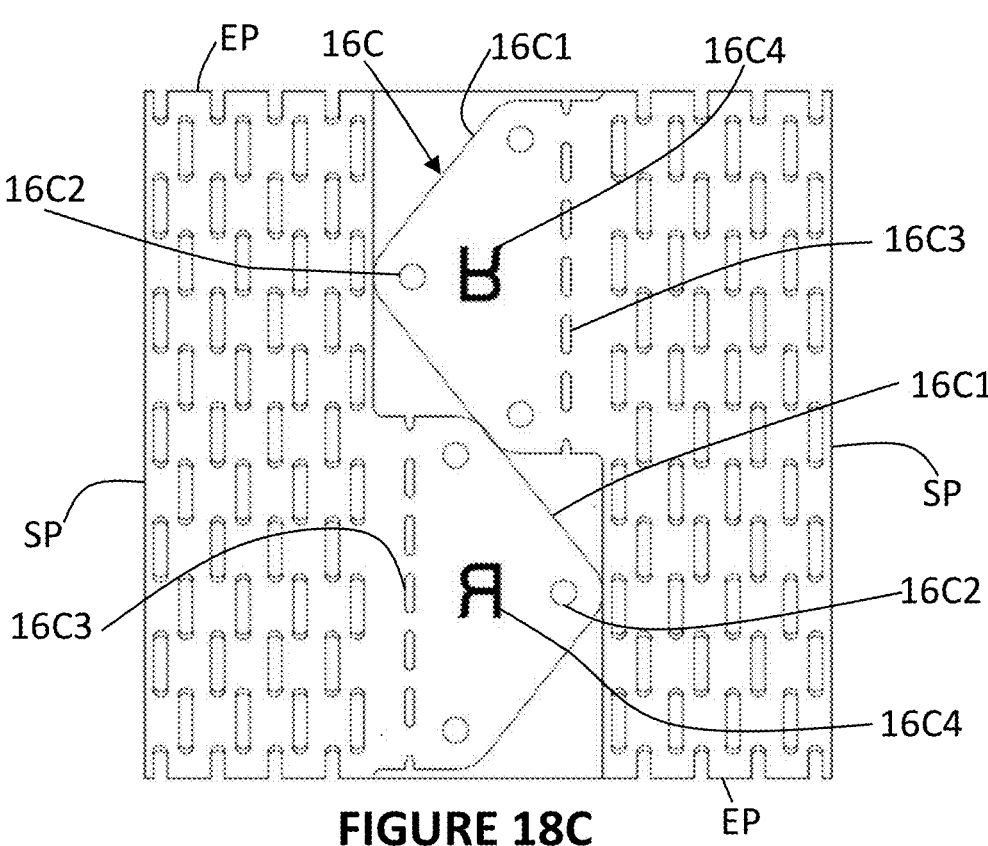

FIG. 18C shows, correspondingly, the configuration of cuts through the blank 16 to form a pair of right-hand attachments 15B, the configuration of cuts C1, C2 and C3 being the mirror image (in a plane perpendicular to the plate and parallel to a side edge SP) of the configuration of those cuts as forming the left-hand attachment 15A.

The positioning of the blank 16 in/relative to the pressing apparatus is preferably such that the spiked/toothed side thereof faces away from the cutting tool(s) of the apparatus (the tool(s) having a configuration corresponding to the cut lines 160)—downwardly in a typical such apparatus, which is configured such that the tool(s) is/are arranged to be advanced into the blank 16 from above. However, this is not critical; spikes/teeth 16BB may project towards, rather than away from the tool(s).

Figure 18D:
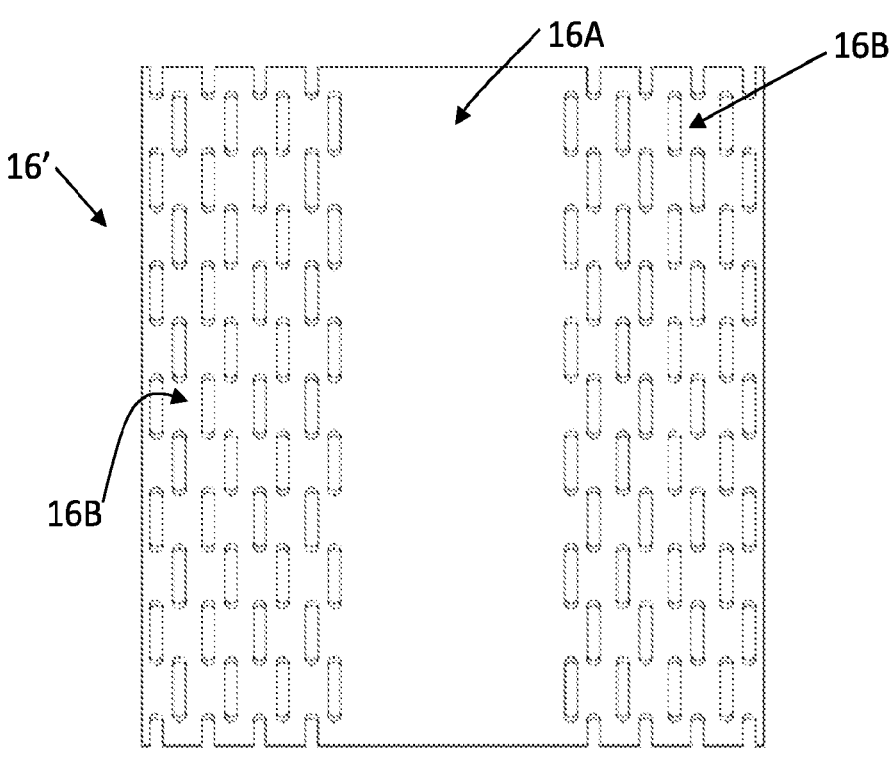
Figure 18E:
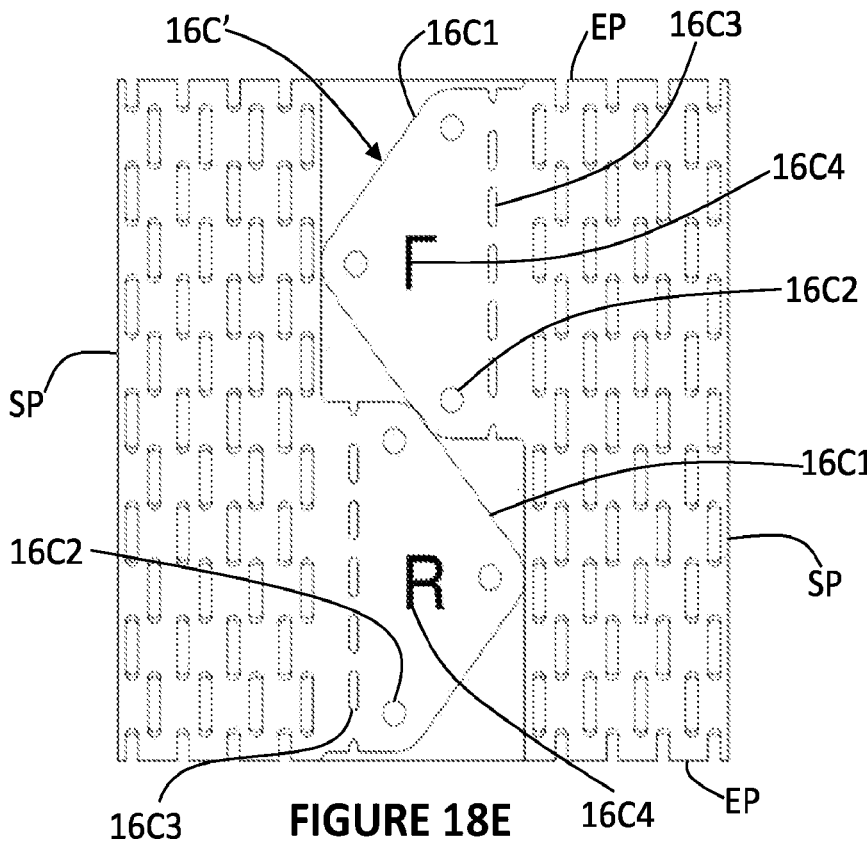

FIG. 18D shows an alternative blank 16', which is the same as the blank 16 except that the spikes or teeth 16BB of one of the portions 16B are on the opposite side of the blank 16' to the spikes or teeth 16BB of the other, projecting away from the plate/respective base portion 16BA in the opposite direction. Where the blank 16' is used, the configuration of the cut lines, designated generally by the reference numeral 16C', is as shown in FIG. 18E, and the pair of attachments 15 formed comprises a left-hand attachment 15A and a right-hand attachment 15B.

Advantageously, the configuration of the blank 16 or 16' (and the tool(s)) is such that only the smooth central portion

16A thereof is cut/punched. The teeth 16BB do not/cannot interfere with or hinder cutting/the tool(s). Also advantageously, the cuts 16C or 160' can be formed in a single pressing operation effected by/using the apparatus.

Also advantageous is that the configuration of cuts 16C or 16C' is such that plural attachments 15 are formed by effecting those cuts.

In addition, owing to the interconnection between the connector portion (170) and the base (17A) of the attachment occupying only a proportion of the periphery of the base, along the dimension thereof transverse to which the connector portion projects, that proportion being defined by an end section/end half in the embodiments illustrated, the attachments, advantageously, can be formed, from a single plate, in nested relation, in particular in opposed relation with the connector portion of one projecting towards the base of the (/an)other thereof staggered or side-by-side along that dimension, as is apparent from FIGS. 18B, 18C and 18E. Moreover, owing to the connector portions' being configured with tapers (defined by cuts 1601 in the embodiments illustrated), they could, in fact, be arranged such that adjacent tapered edge sections thereof/the cut lines defining them are parallel or (at least partially) coincident.

It will be appreciated that the dimension of the blank/plate along the dimension SP can be greater and the tool(s) configured such that greater than two, e.g. three, four or five (for instance), attachments are formed therefrom.

Also possible is that the pressing apparatus is configured to receive said metal plate and the tool(s) thereof additionally configured to form (/cut/bend) the spikes therein and/or any/all of edges EP and SP of the attachment formed therefrom in the operation of the apparatus—possibly in a said single pressing operation effected by/using that apparatus.

Although in the truss assembly 10 shown the supplementary trusses 14 are hinged to the top 13A and bottom 13B chord members of the main truss 12, by respective upper and lower hinged fastening attachments 15, other placements of such attachments would be possible, including in particular with different designs of main and supplementary trusses. However, it is envisaged that in most circumstances there would be at least an upper and lower hinged fastening attachment for each supplementary truss, despite it being conceivable that a single, longer, such attachment might suffice in some circumstances. The primary function of the hinged connections between the main truss 12 and supplementary trusses 14 is to enable the latter to be swung out from their folded condition assumed during transportation and lifting. Insofar as they provide those connections, the attachments 15 thus need only have capacities to withstand the handling and installation loads. Although in principle they could also be designed to withstand in-service loading in the completed roof structure, in practice supplementary fixings would usually be subsequently installed to withstand the in-service loading, these supplementary fixings being fitted later in the installation process when the majority of the roof structure is in place and braced to provide a stable and safe working environment.

Each supplementary truss 14 is fabricated using any of alternative jigging systems embodying the present disclosure, described below.

Figure 4A:
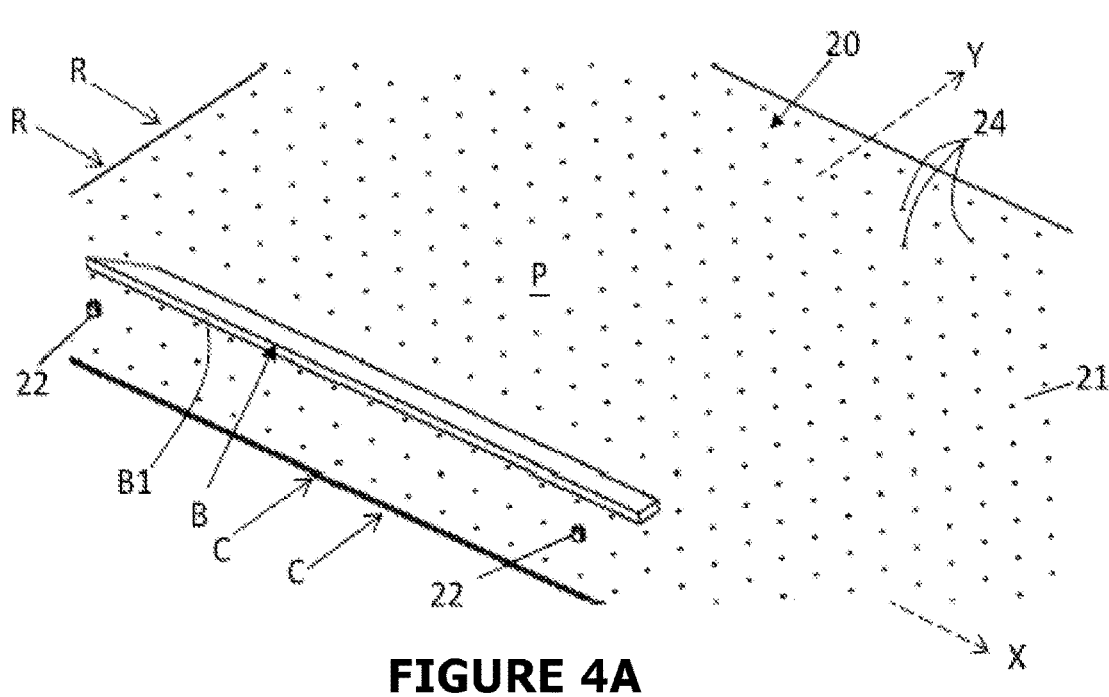
FIGS. 4A to 4R are perspective views showing successive stages in said fabrication.
Figure 4B:
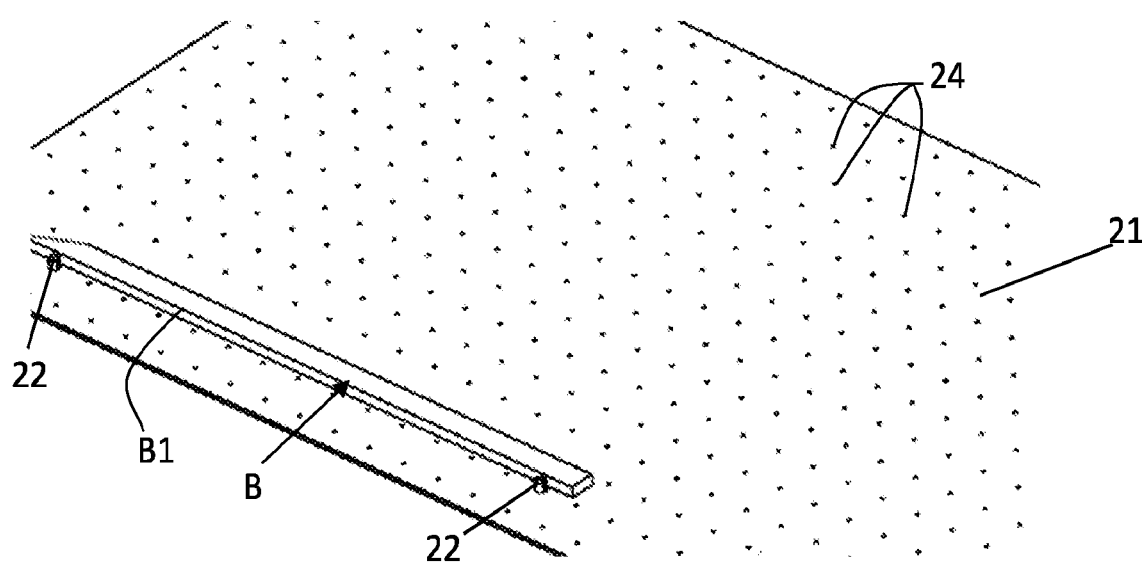
Figure 4C:
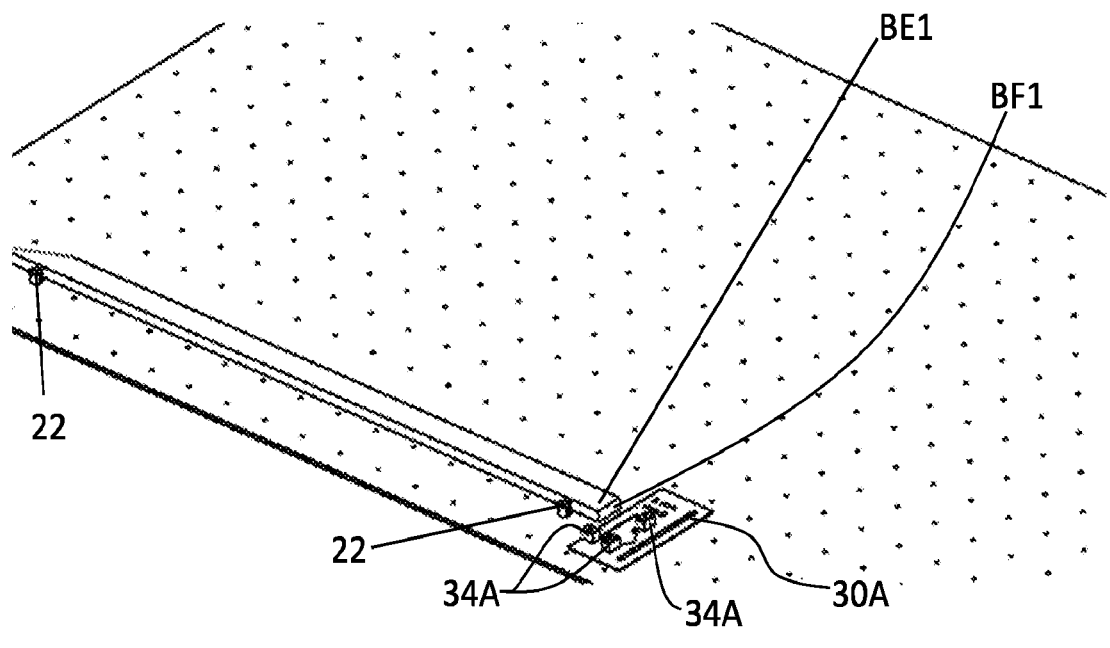
Figure 4D:
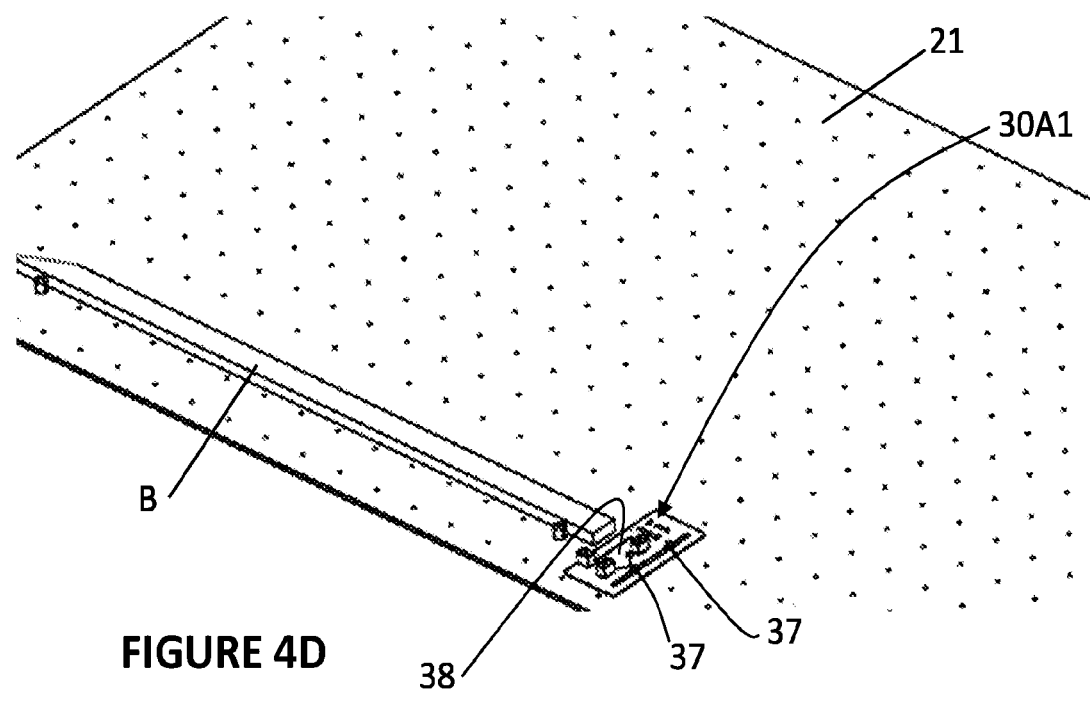
Figure 4E:
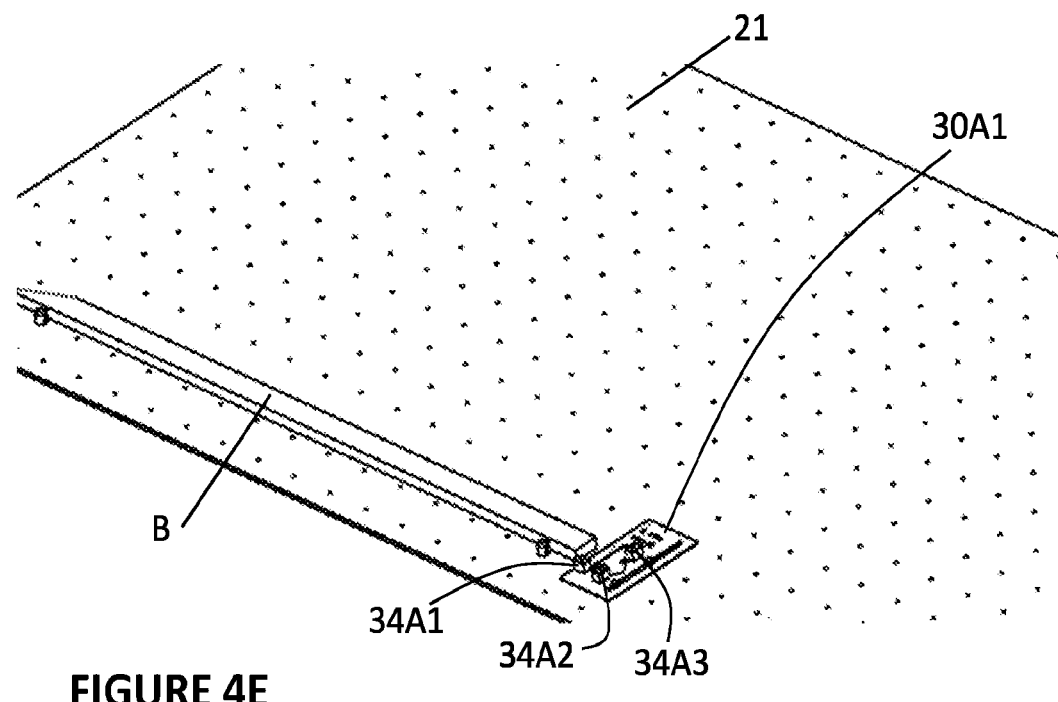
Figure 4F:
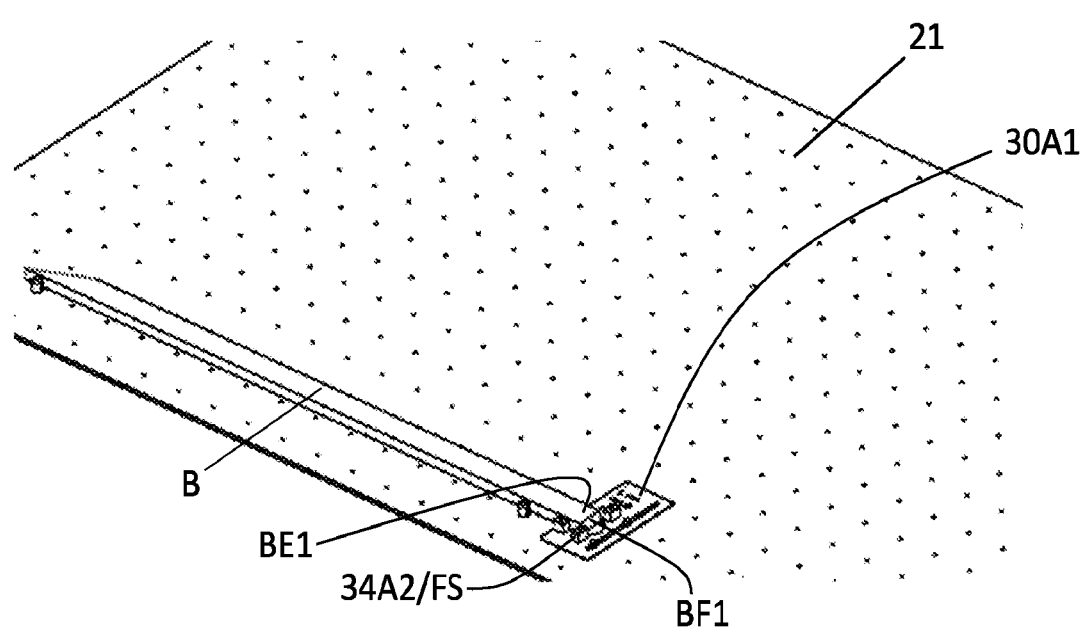
Figure 4G:
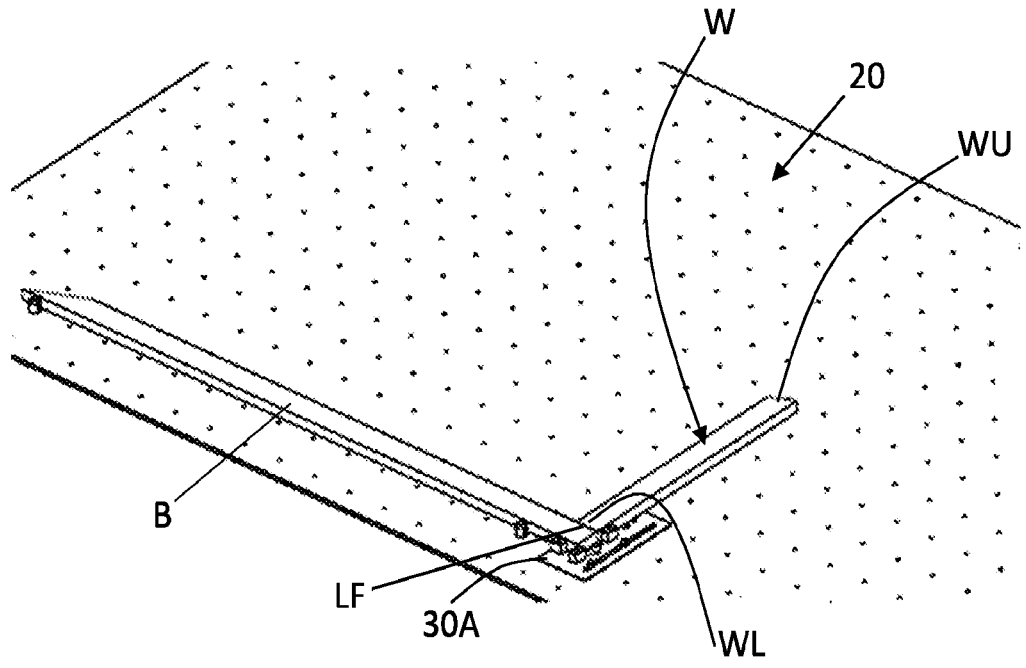
Figure 4H:
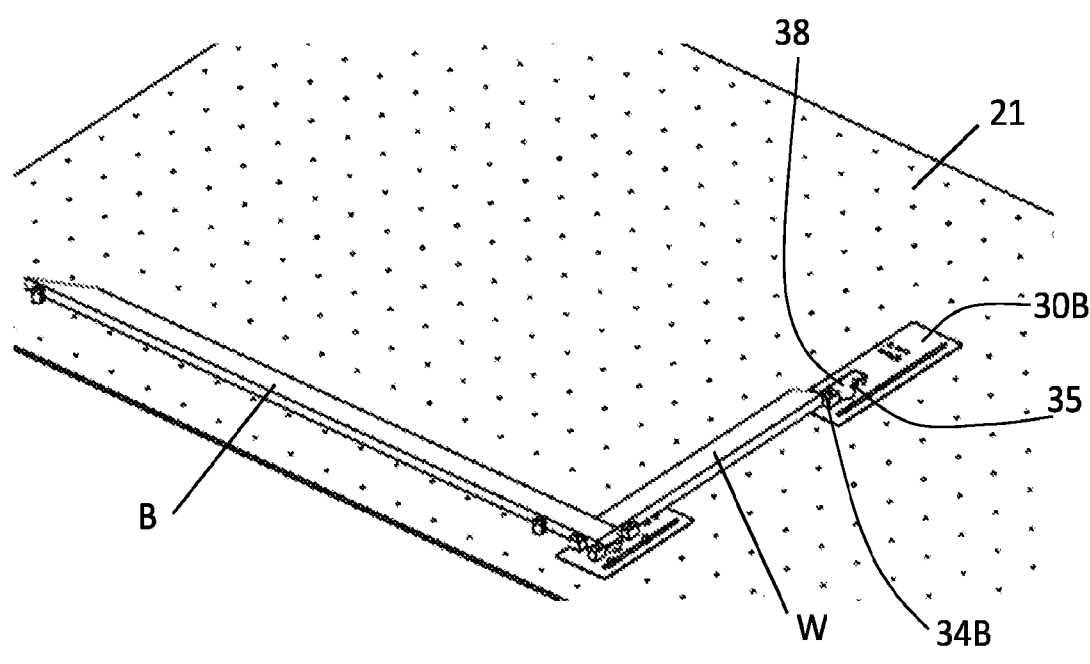
Figure 4I:
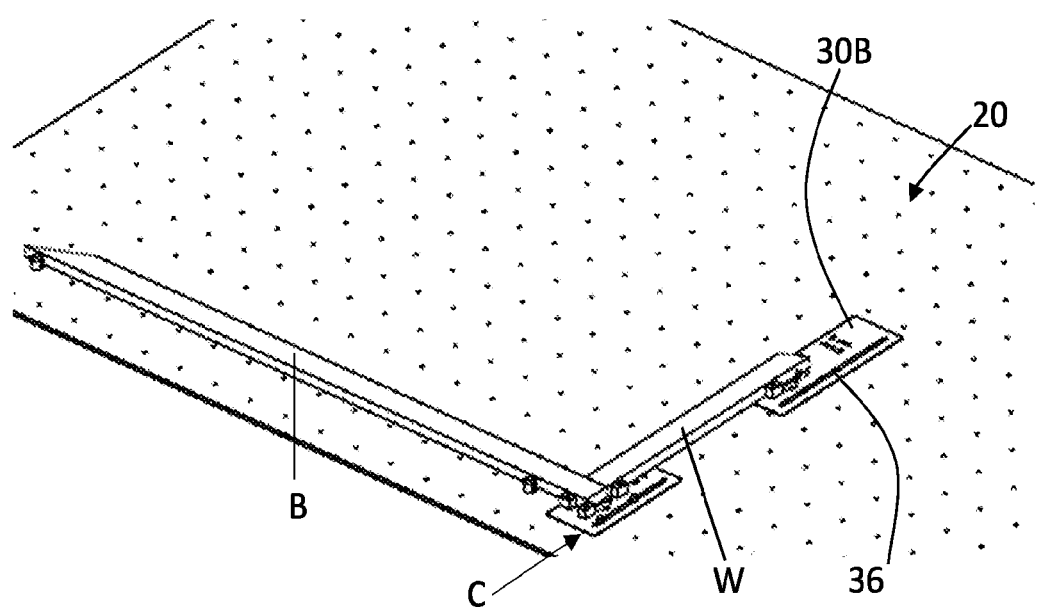
Figure 4J:
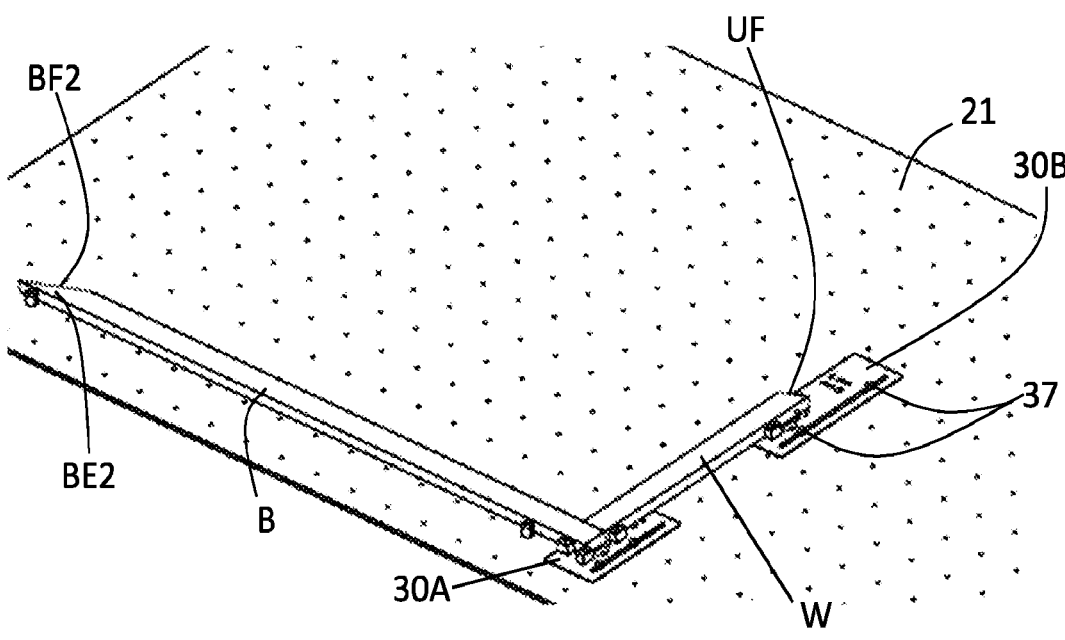
Figure 4K:
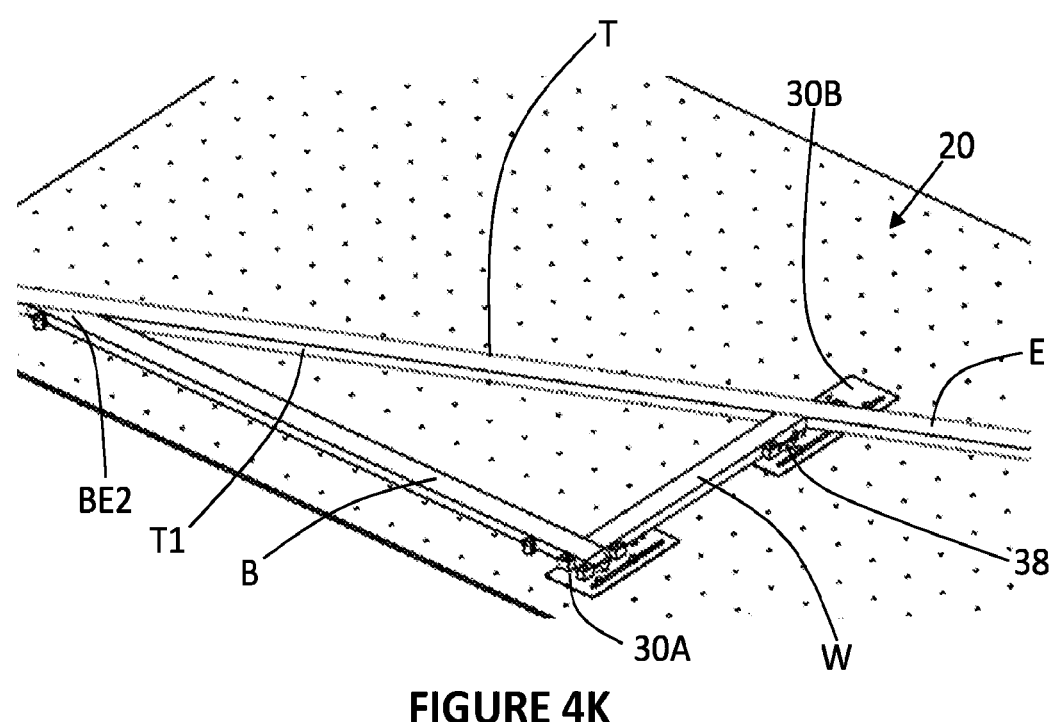
Figure 4L:
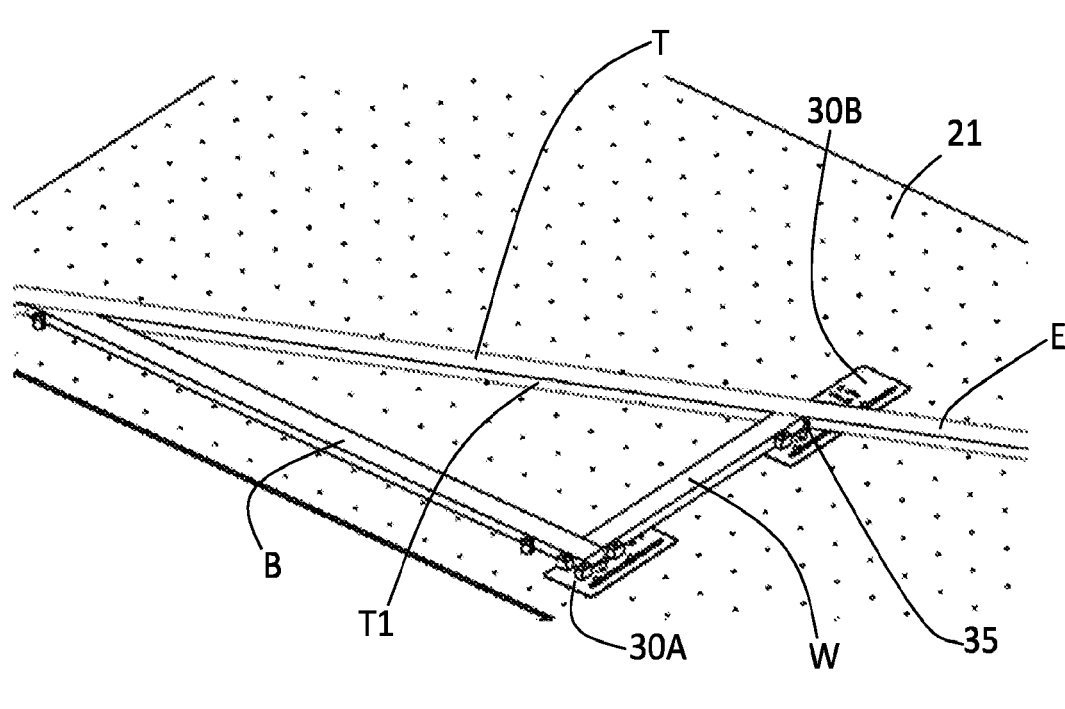
Figure 4M:
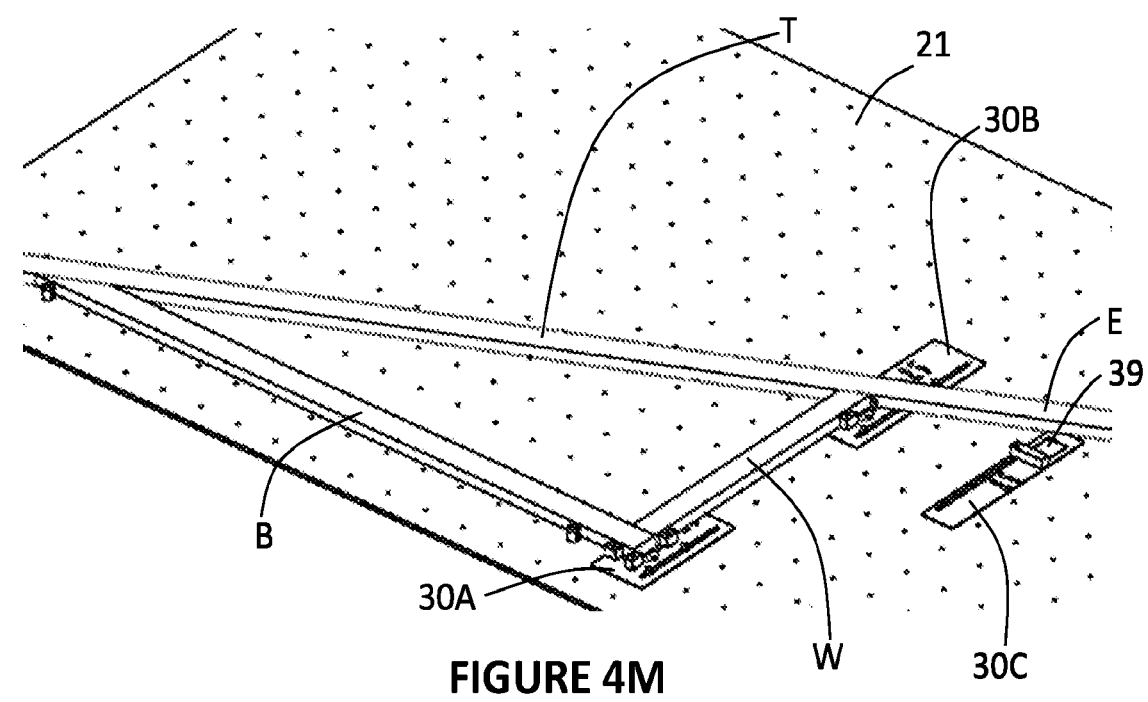
Figure 4N:
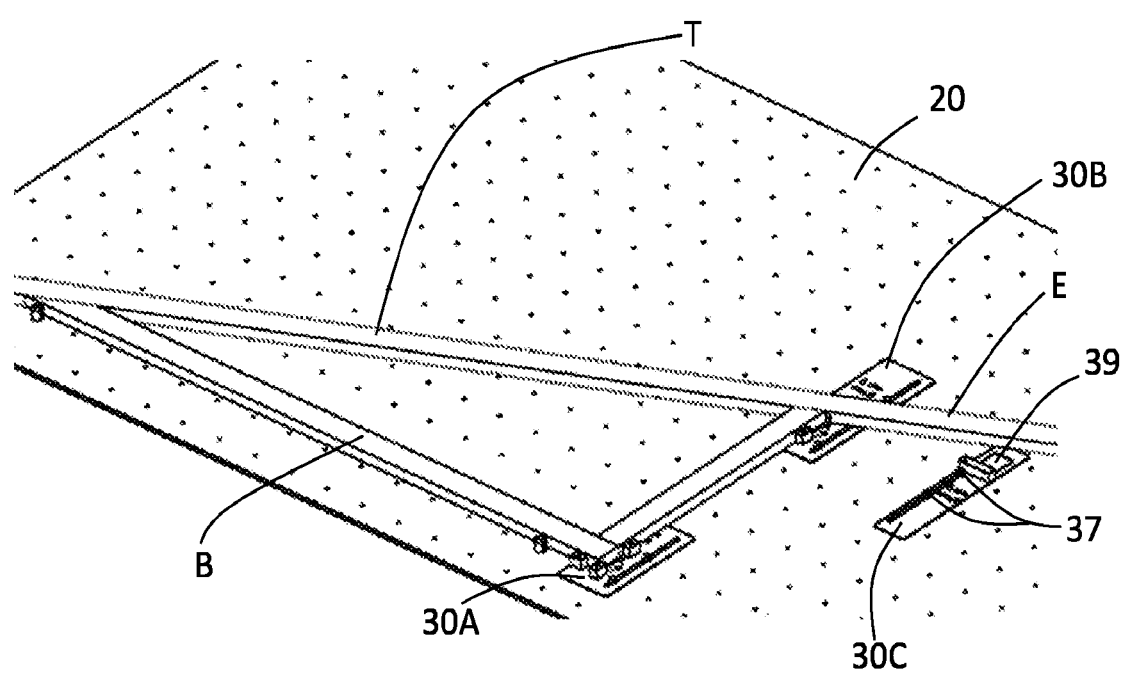
Figure 4O:
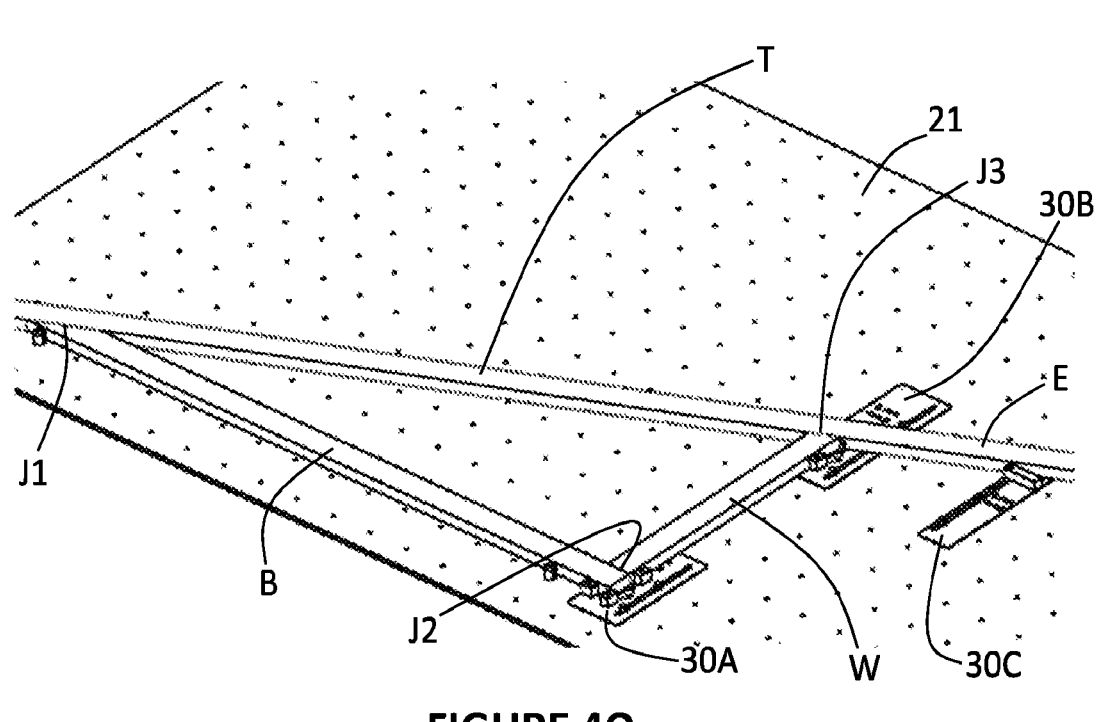
Figure 4P:
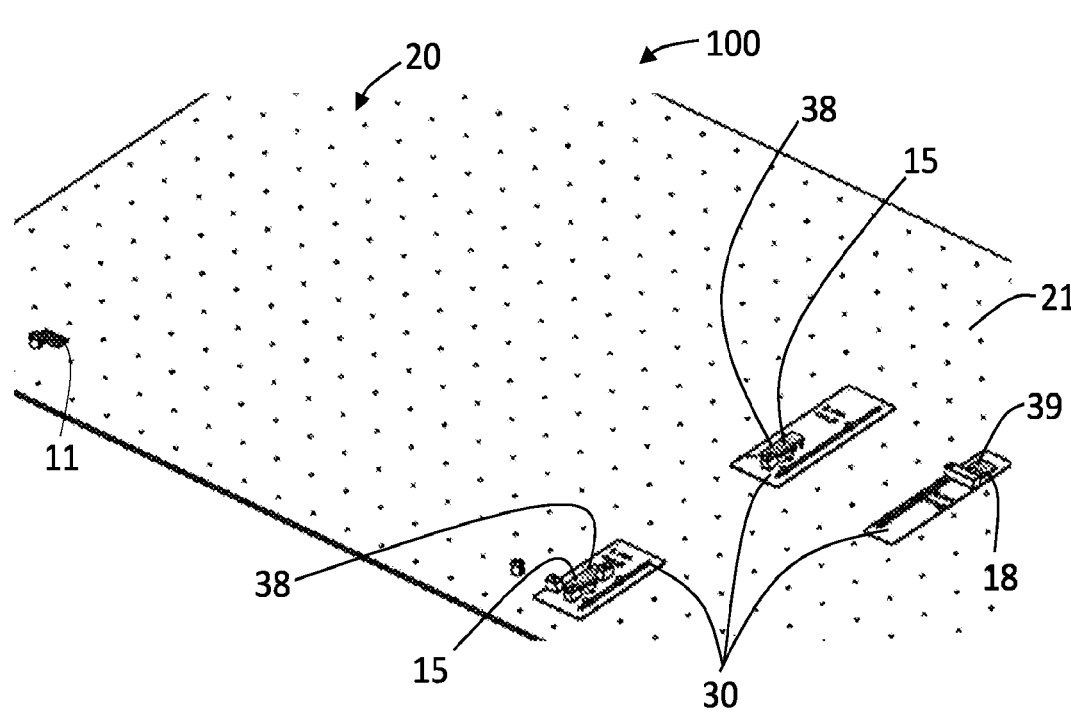
Figure 4Q:
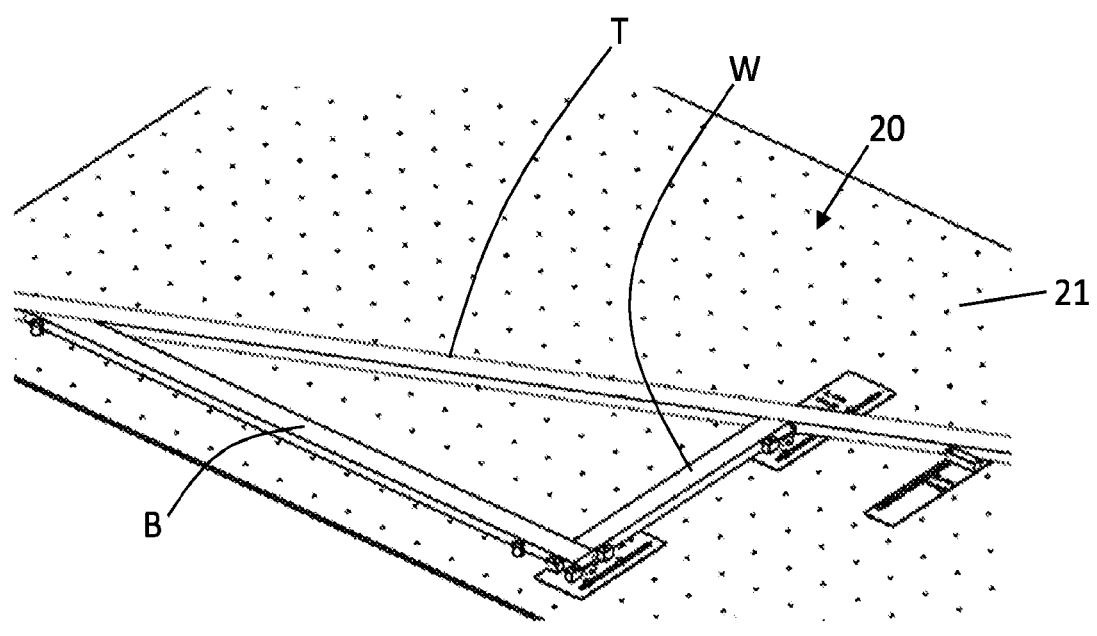
Figure 4R:
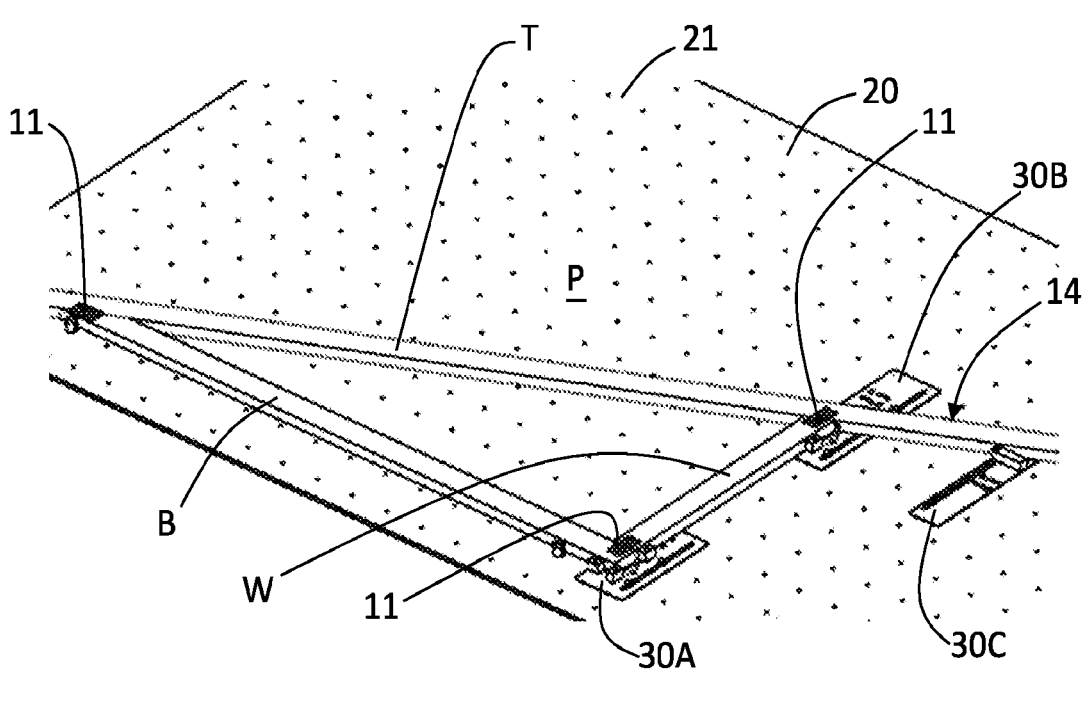

A jigging system 100 according to one preferred embodiment of the present disclosure, shown in FIGS. 4P to 4R, comprises a support structure, defined by a jig table 20, and jigs, generally designated by the reference numeral 30, configured to engage both the table 20 and timber members arranged thereon to form members of the truss.

Fabrication of a supplementary truss 14, sequential stages of which are shown in FIGS. 4A to 4R, commences with, referring to FIG. 4A, positioning on the jig table 20 a member B which is to define the bottom chord B of the truss 14, the table 20 comprising a support surface 21 and an array of threaded holes 24 which open through the surface 21, the holes 24 being arranged to form spaced apart rows R, each parallel to an axis X, and spaced apart columns C, each parallel to an axis Y, which axis is perpendicular to axis X. The spacing between centres of adjacent holes 24 is 150 mm in each row R and 150 mm in each column C. Pucks 22 are positioned at spaced positions on the table 20, the pucks 22 being provided with threaded screws 22A (see FIG. 5A) which are screwed into respective ones of the holes 24 in a particular row R, whereby the pucks 22 define fixtures, and the member B, referring to FIG. 4B, is positioned such that a face B1 of the member B defining a bottom face of that chord abuts the pucks 22, whereby the member B is aligned rotationally about an axis which is orthogonal both to the surface 21 and to the plane P of the truss 14 fabricated thereon, the plane P being parallel/coincident with the plane defined by the surface 21. It is preferable that the pucks 22 be arranged so as to be adjacent respective ends of the member B, to accommodate any bowing along the length of that member (i.e. such that a straight axis extending between the ends of the member B is aligned).

Figure 5A:
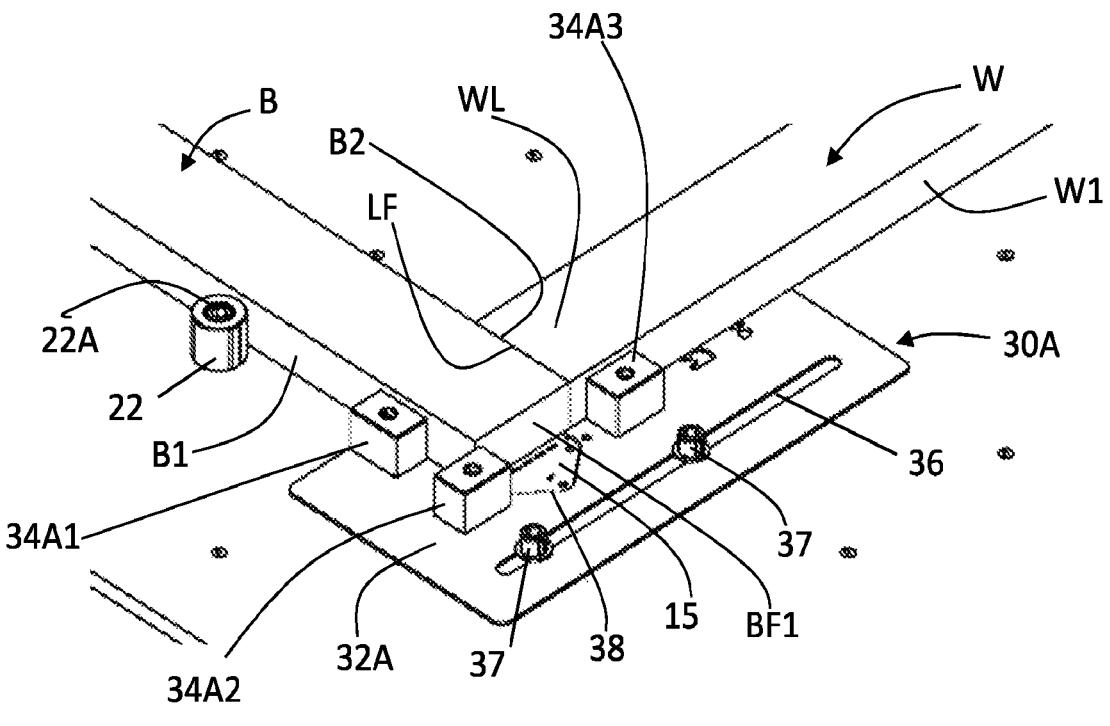
FIGS. 5A to 5C are perspective views showing respective jigs of the system of the first embodiment locating said members/attachments.
Figure 8A:
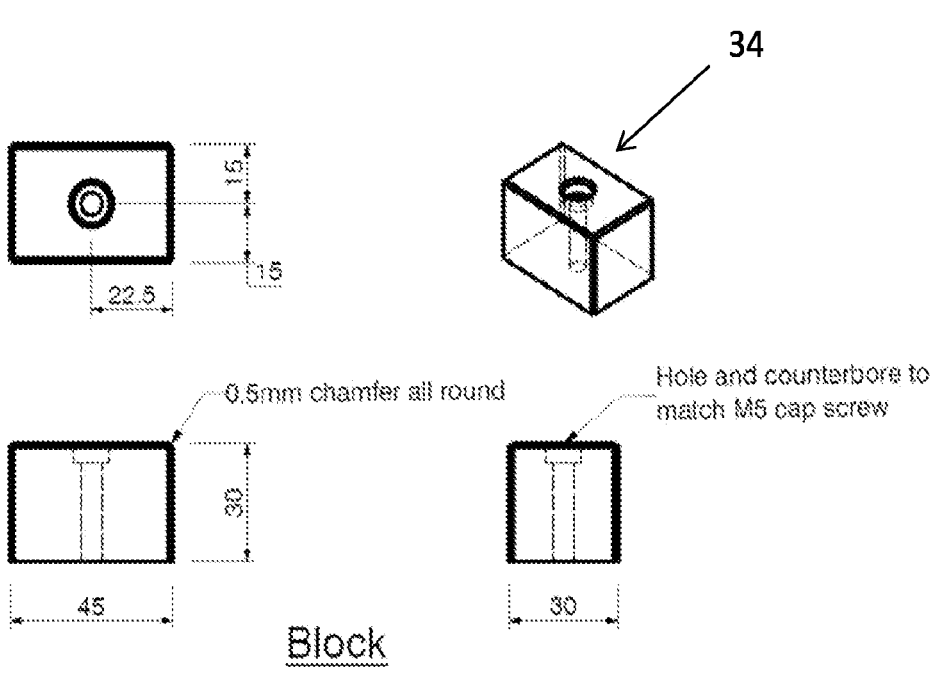
FIG. 8A shows details of a locating block employed in jigs of embodiments of the present disclosure.

Next, referring to FIGS. 4C and 5A, a jig 30A is positioned on the table 20, in the region of a square-cut end BE1 of the member B, to which end a square-cut end WL of the web member W of the truss 14 (being a lower end of that member when the truss 14 is in situ) is to be secured. Referring especially to FIG. 5A, the jig 30A comprises a base plate 32A, which is received against the surface 21, and oblong locating blocks 34A1, 34A2 and 34A3—designated by reference numeral 34 in relation to the jigs 30 generally and details of a given one of which are shown in FIG. 8A—which are secured to the plate 32A by welds (not shown), formed through respective ones of holes arranged at predetermined positions in the plate 32, so as to be positioned thereon to abut respective faces of the members B and W. The blocks 34A1 and 34A2 are arranged such that flat upright side faces FS thereof are mutually perpendicular and positioned to abut the axial face B1 of the rotationally aligned member B and an end face BF1 of that member at the end BE1, respectively. Block 34A3 is arranged such that an upright side face FS thereof is coplanar with that of block 34A2 and positioned to abut a face W1 of member W, which face, like face B1, extends axially (relative to the member defining it).

The initial positioning of the jig 30A and member B on the table 20 is such that a linear slot 36 through the plate 32A, which slot is parallel with the plane in which the faces FS of blocks 34A2 and 34A3 lie, aligns with respective holes 24 in a given column C, so as to extend parallel with axis Y, and, referring to FIG. 4D, screws 37—preferably cap screws—are passed through the slot 36 and screwed into those holes whereby heads 37A thereof are just touching the upper surface of the plate 32A to either side of the slot 36, such that the screws 37 retain the jig 30A against the table 20. The width of the slot 36 is only slightly greater than outer diameters of the shanks of the screws 37 whereby the screws 37 (while they remain untightened) permit movement of the jig 30A only in a direction parallel to the axis of the slot 36 (and thus to the axis Y), the jig 30A thus being aligned to the plane P and to the Y axis.

The plate 32A is configured with a cutout 38, defining a holder, into which the attachment 15 is downwardly receivable, the configuration of which cutout is complementary to that of the perimeter/periphery of the attachment 15, defined by peripheral edges of the base 17A, hinge 16D and tab 16C thereof, whereby the attachment 15 when received by the cutout 38—with the base 17A, hinge 16D and tab 16C lowermost, so as to be received against the surface 21—is held fixed relative to the plate 32A. The attachment 15 is thus located relative to the planes in which the faces FS lie, whereby the axis A of the hinge 16D (see FIGS. 7A and 7B) is parallel with the plane in which faces FS of blocks 34A2 and 34A3 lie, and parallel with plane P.

The jig 30A is arranged, as shown in FIG. 4D, with the face FS of block 34A1 set back slightly from the plane in which the face B1 of the rotationally aligned member B lies. Next, referring to FIGS. 4E and 4F, that member is shifted in the direction towards the slot 36, along axis X, such that the end BE1 overlies the plate 32A, and the jig 30A advanced (slid) along the axis of that slot (i.e. along axis Y), whereby face FS of block 34A1 and axial face B1 abut. The screws 37 are then screwed down such that the heads thereof tightly engage the plate 32A and the jig 30A is thus fixed, substantially by friction, against movement parallel to axis Y. The member B in the direction of axis X such that the end face BF1 thereof and face FS of block 34A2 abut, as shown in FIGS. 4F and 5A. The jig 30A is thus located, along the Y axis, to the member B (which is already correctly rotationally orientated in the plane P, owing to its abutting the pucks 22), and the member B located, along the axis X, to the jig 30A (which is likewise already correctly rotationally orientated in the plane P).

Referring to FIGS. 4G and 5A, the web member W is positioned on the table 20 such that an end face LF thereof (being the lower end face of the member W when it/the truss 14 is in situ) abuts an axial face B2 of member B opposite to (and parallel with) face B1 and the face W1 abuts face FS of block 34A3.

Figure 5B:
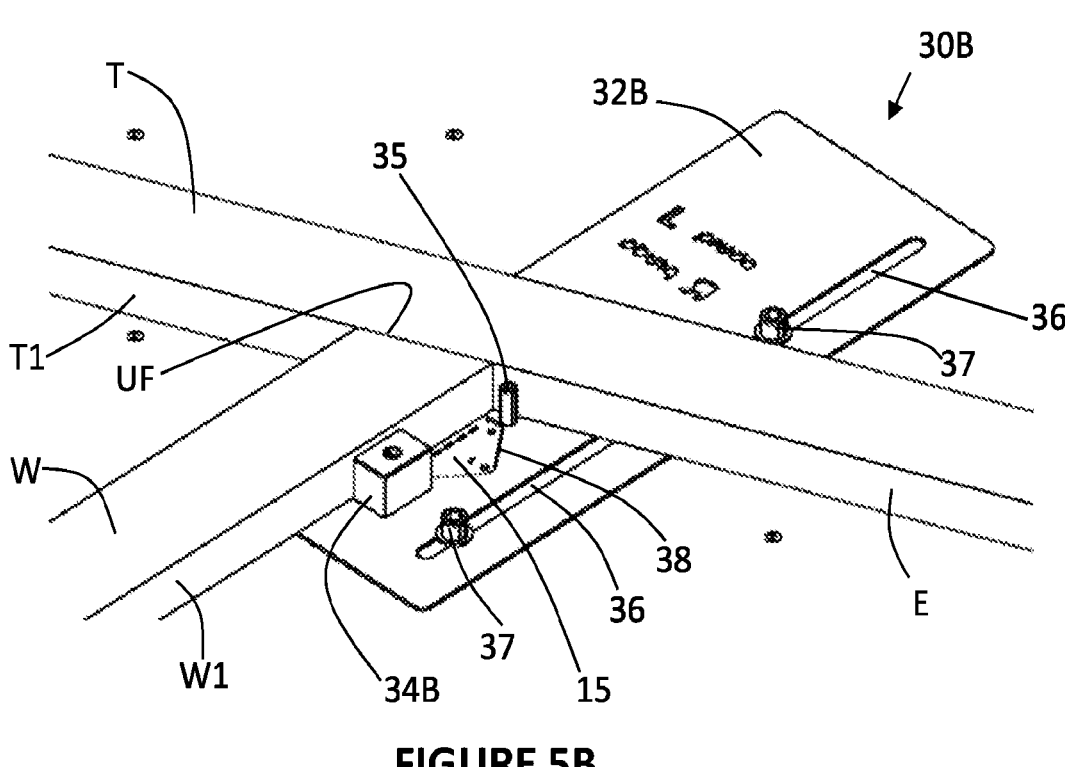
Figure 8B:
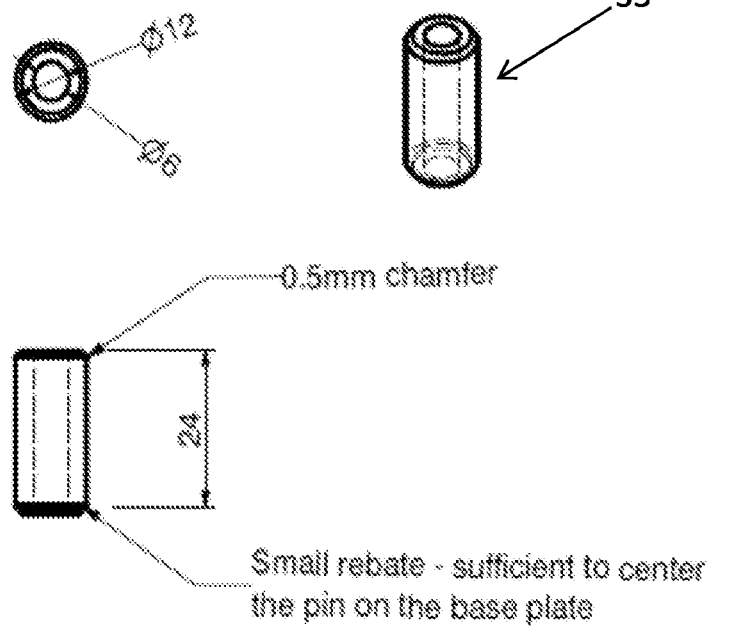
FIG. 8B shows details of a locating pin employed in jigs of embodiments of the present disclosure.

Referring to FIGS. 4H and 5B, a jig 30B is positioned on the table 20, so as to be in the region of an end WU of the member W (being an upper end of that member when it/the truss 14 is in situ) is to be secured. Referring especially to FIG. 5B, the jig 30B comprises a base plate 32B, which is received against the surface 21, and an oblong locating block 34 (34B) secured to the plate 32B, by a weld (not shown) formed through a hole arranged at a predetermined position in the plate 32B so as to be positioned thereon to abut face W1 of member W. The jig 30B further comprises a locating pin 35, details of which are shown in FIG. 8B, secured to the plate 32B by a weld (not shown) formed through a hole arranged at a predetermined position in the plate 32B so as to be positioned thereon to abut the top chord member T when that member and the jig 30B are located one to the other.

The initial positioning of the jig 30B on the table 20, referring also to FIG. 41, is such that linear slot 36 through the plate 32B, which slot is parallel with the plane in which the face FS of block 34B lies, aligns with respective holes 24 (in the same column C as those with which the slot 36 of plate 32A align), so as to extend along the axis, Y, and, referring to FIG. 4J, screws 37 are passed through the slot 36 of plate 32B and screwed into those holes 24 whereby heads 37A thereof are just touching the upper surface of the plate 32B to either side of the slot 36, such that the screws 37 retain the jig 30B against the table 20. The width of the slot 36, again, is only slightly greater than outer diameters of the shanks of the screws 37 received therethrough, whereby the screws 37 (while they remain untightened) permit movement of the jig 30B only in a direction parallel to the axis of the slot 36 (and thus along the axis Y), the jig 30B thus being aligned to the plane P and to the Y axis.

The plate 32B, like plate 32A, is configured with a (holder-defining) cutout 38, into which an(other) attachment 15 is downwardly receivable, the configuration of which cutout is likewise complementary to that of the perimeter/periphery of the attachment 15, whereby the latter when received by the cutout 38 (in exactly the same manner as the (first/lower) attachment 15 is received by the cutout 38 in plate 32A) held fixed relative to the plate 32B. The (second/upper) attachment 15 is thus located relative to the plane in which the face FS of block 34B lies, whereby the axis A of the hinge 16D (see FIGS. 7A and 7B) is parallel with that plane and with plane P.

Next, referring to FIGS. 4J, 4K and 5B, the top chord member T is positioned on the table 20 such that an axial face T1 thereof, defining a lower or bottom face of the top chord T, is received against an angled end face UF of the web member W at a tapered (chamfered) upper end WU of the web member W (being the upper end face of the member W when it/the truss 14 is in situ) and received against an angled end face BF2 of the bottom chord member B at a tapered (chamfered) end BE2 thereof, opposite to end BE1, whereby the member T is located rotationally in a plane parallel to plane P, and translationally along a direction perpendicular to its axis in that same plane. The member T, which is provided in a predetermined length, is positioned along its axis such that a datum, such as a pencil mark, on the member T that is spaced from the (outer/lower) end thereof by a distance equal to the intended overhang or raking length/dimension in the truss 14 (being the distance along that axis/the face T1 from the end BE2 to the outer/lower end of the member T/end of face T1) aligns with the end BE2, whereby the member T is located along said axis (and said length/dimension is established).

Referring to FIGS. 4L and 5B, the jig 30B is then advanced (slid) along the axis of the slot 36 thereof (i.e. along axis Y), whereby the circumferential side face 35A of locating pin 35 is received against the axial face T1 and the jig 30B thus located along axis Y, and to the top chord member T. The screws 37 are then screwed down such that the heads thereof tightly engage the plate 32B and the jig 30B is thus fixed against movement along axis Y.

Figure 5C:
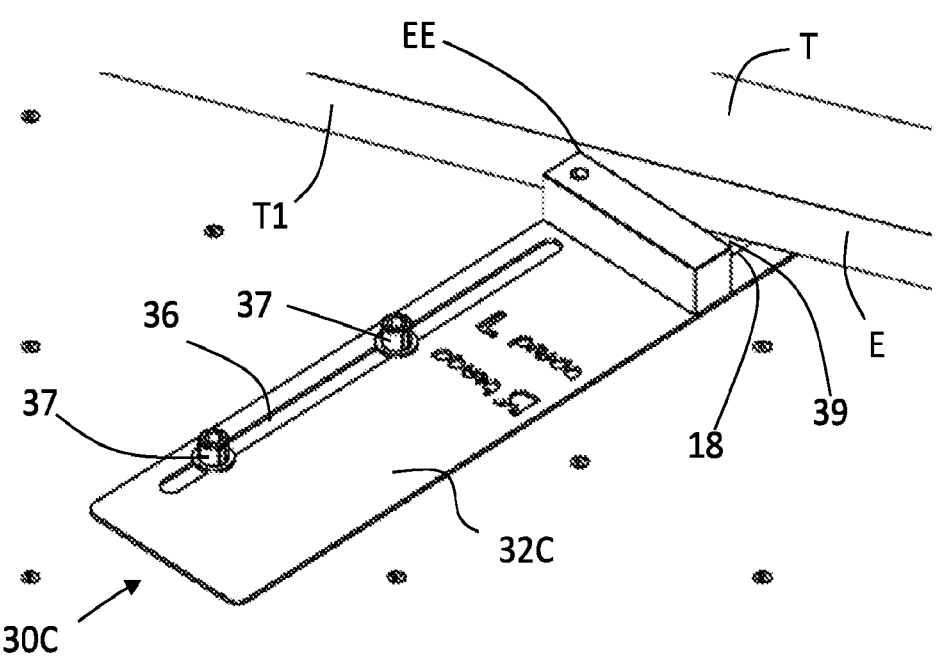

Referring to FIGS. 4M and 5C, a jig 30C, for applying locating attachment 18 to the top chord member T is positioned on the table 20, so as to be in the region of a position, along extension section E of the top chord member T, which defines extension E of the top chord T in the truss 14, at which the attachment 18 is to be applied. Referring especially to FIG. 50, the jig 30C comprises a base plate 32C, which is received against the surface 21, and a block 33 secured to the plate 32C, by at least one weld (not shown) formed through a respective hole arranged at predetermined position in the plate 32C, such that an upright locating edge EE at an end thereof can be brought into abutment with face T1.

The initial positioning of the jig 30C on the table 20 is such that linear slot 36 through the plate 32C aligns with respective holes 24 in a given column C, which column is selected according to what is to be the spacing S between the truss 12 and the truss 500 in the structure 1000—specifically, the spacing between the corresponding (forward or rearward/left or right) faces of the trusses 12 and 500—which typically will be selectable from alternatives of 600 mm, 900 mm and 1,200 mm. In the example shown, the spacing S is to be between the adjacent faces of trusses 12 and 14. Referring to FIG. 4N, screws 37 are passed through the slot 36 of plate 32C and screwed into those holes 24 whereby the heads 37A thereof are just touching the upper surface of the plate 32C to either side of the slot 36, such that the screws 37 retain the jig 30C against the table 20. The width of the slot 36, again, is only slightly greater than outer diameters of the shanks of the screws 37 received therethrough, whereby the screws 37 (while they remain untightened) permit movement of the jig 30C only in a direction parallel to the axis of the slot 36 (and thus along the axis Y), the jig 30C thus being aligned to the plane P and to the Y axis.

Figure 7C:
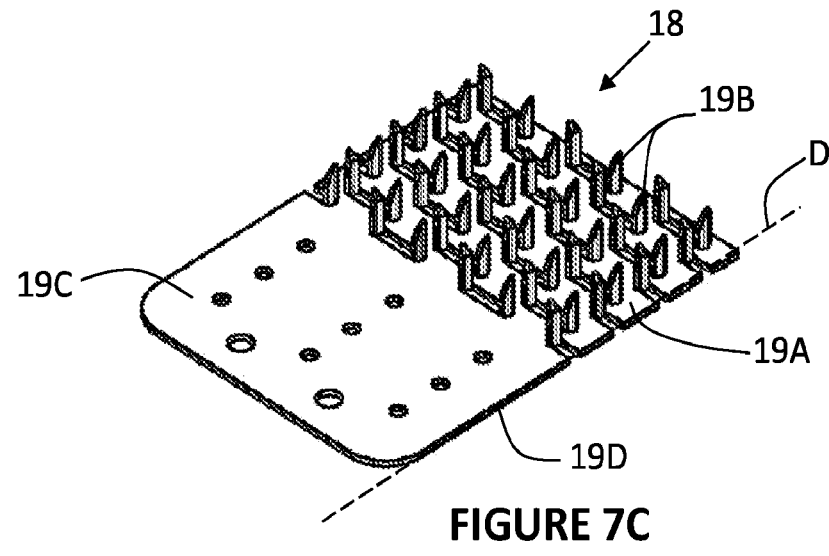
FIG. 7C is a perspective view of the locating attachment.

The plate 32C is configured with a cutout 39 (see FIGS. 4M, 4N and 5C), defining a holder, into which the attachment 18 is downwardly receivable, the configuration of which cutout is complementary to that of the perimeter/periphery of the attachment 18, whereby the latter when received by the cutout 39 (in the same manner as an attachment 15 is by a cutout 38) held fixed relative to the plate 320. The attachment 18 is thus located, whereby the axis D of edge 19D thereof (FIG. 7C) is parallel with axis Y.

The attachment 18 is likewise stamped—either from a blank, that may itself be stamped from substantially planar metal (preferably steel) plate (e.g. 1.2 mm thick), or from the plate itself—by way of a pressing apparatus, which includes one or more tools, of the kind described above.

The attachment 18 comprises a nail plate portion, comprising a base 19A and spikes or teeth 19B bent and projecting from the base 19A (with which they are integral) and are pressable into the member T/extension E, into the timber thereof such that the base 19A is received thereagainst/adjacent thereto and the attachment 18 is thus applied, and further comprising a locating portion 19C which is coplanar with the base 19A and has parallel straight side edges 19D arranged such that one or the other—depending on the handedness of the truss 14—is, referring to FIG. 20, contacted/directly abutted by a top chord member 500T of the truss 500 when the truss 14 is in its extended position, whereby the attachment 18 serves as a "stop" against which the truss 500 is located so as to be spaced from the truss 12 the desired distance. The attachment 18/base 19A includes an end edge 19E, to which the side edges 19D of the locating portion 190/attachment 18 are perpendicular.

The axis of the edge EE is perpendicular to the axis of a straight edge portion 39A of the cutout 39 that is parallel to the slot axis, adjacent to which edge portion the locating edge 19D lies when attachment 18 is received in the cutout 39, and passes through the plate 32C at a set perpendicular distance from the axis of the edge portion 39A.

The jig 300 (the locating edge EE of which is set back slightly from the face T1, as shown in FIG. 4N) is advanced (slid) along the axis of the slot 36 thereof/parallel to the axis Y, such that the edge EE abuts the face T1, as shown in FIG. 4O, whereby the cutout 39 (and thus the attachment 18 when received therein) is located to the member T1, along the slot axis in particular. Because the axis of edge portion 39A is parallel to the axis Y and a set distance (in the direction of axis X) from the axis through the cutouts 38 which is arranged to be coaxial with the hinge axes A when the attachments 15 are received in those cutouts, the attachment 19 when applied will be correctly positioned and orientated on the extension E, so as to locate precisely the truss 500 by abutting that truss. The screws 37 are then screwed down such that the heads thereof tightly engage the plate 32C and the jig 30C is thus fixed against movement along axis Y.

The members B, W, T, thus located one-to-another on the surface 21 by virtue of their engagement with pucks 22 and the jigs 30A and 30B and their abutment with each other, are stapled together—at the junction J1 between the members B and T, the junction J2 between the members B and W and the junction J3 between the members W and T—so as to be preliminarily interconnected. The preliminary assembly comprising them is then lifted slightly and the attachments 15 and 18 placed into the cutouts 38 and 39 respectively, as shown in FIG. 4P. Also while the members B, W, T are clear of the table surface 21, a (standard) nail plate 11 is positioned, base-down, on the surface 21 to underlie the junction J1. The preliminary assembly comprising members B, W, T is then set back down (to re-engage the pucks 22 and jigs 30A, 30B and 30C), as shown in FIG. 4Q, and nail plates 11 are arranged, base-up, over the junctions J1, J2 and J3, as shown in FIG. 4R. The members B, W, T, attachments 16 and 19 and nail plates 11 are pressed, e.g. by way of a platen or roller as will be known to a person skilled in the art, such that the teeth of the (located) lower attachment 15 are driven into members B and W at the junction J2, whereby those members are securely fastened together by that attachment, the teeth of the (located) upper attachment 15 are driven into members W and T at the junction J3, whereby those members are securely fastened together by that attachment, the teeth of the nail plate 11 are driven into the members B and T at the junction J1, whereby those members are securely fastened together by that nail plate, and the teeth of the (located) attachment 19 are driven into the top chord extension E, whereby that attachment is securely fastened to the extension E. The truss 14, thus formed, is then removed from the table 22. If necessary/appropriate, the truss 14 may thereafter be subjected to a further pressing operation, to ensure that the attachments 16 and 19 and nail plates 11 are driven fully home.

Figure 3:
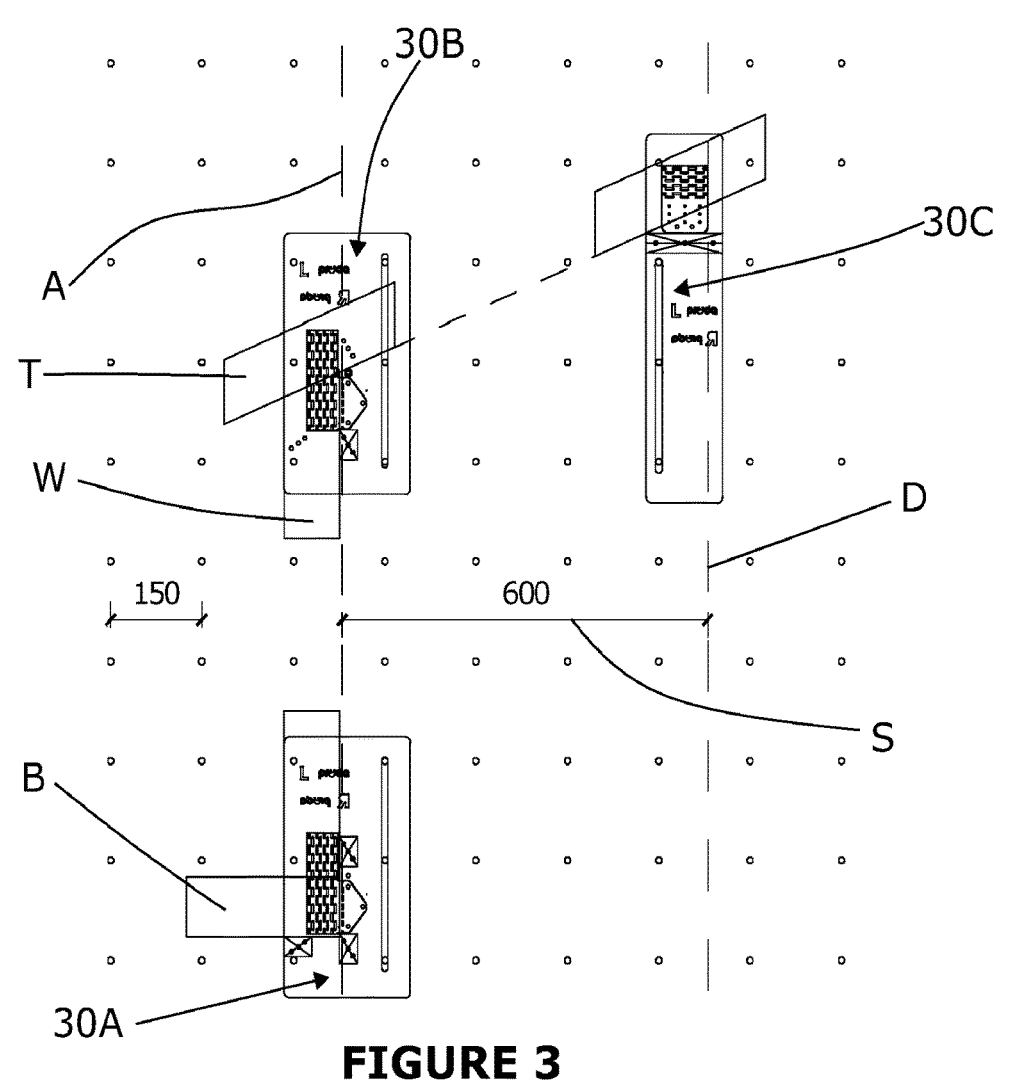
FIG. 3 is a schematic view showing how a jigging system according to a first preferred embodiment of the present disclosure functions to locate members of a said supplementary truss one to another, and to locate the attachments to the members for application thereto, in the fabrication of the supplementary truss.
Figure 6A:
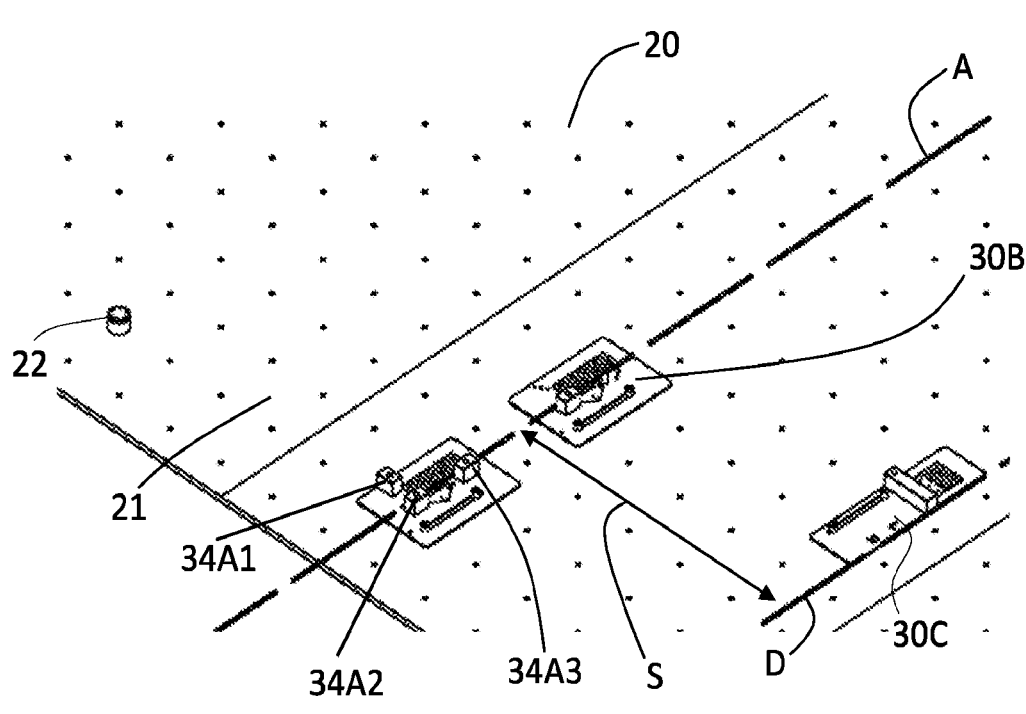
FIGS. 6A and 6B are perspective views showing the positioning of the jigs of the system of the first embodiment, relative to a support structure of that system, arranged to locate the attachments to the members.
Figure 6B:
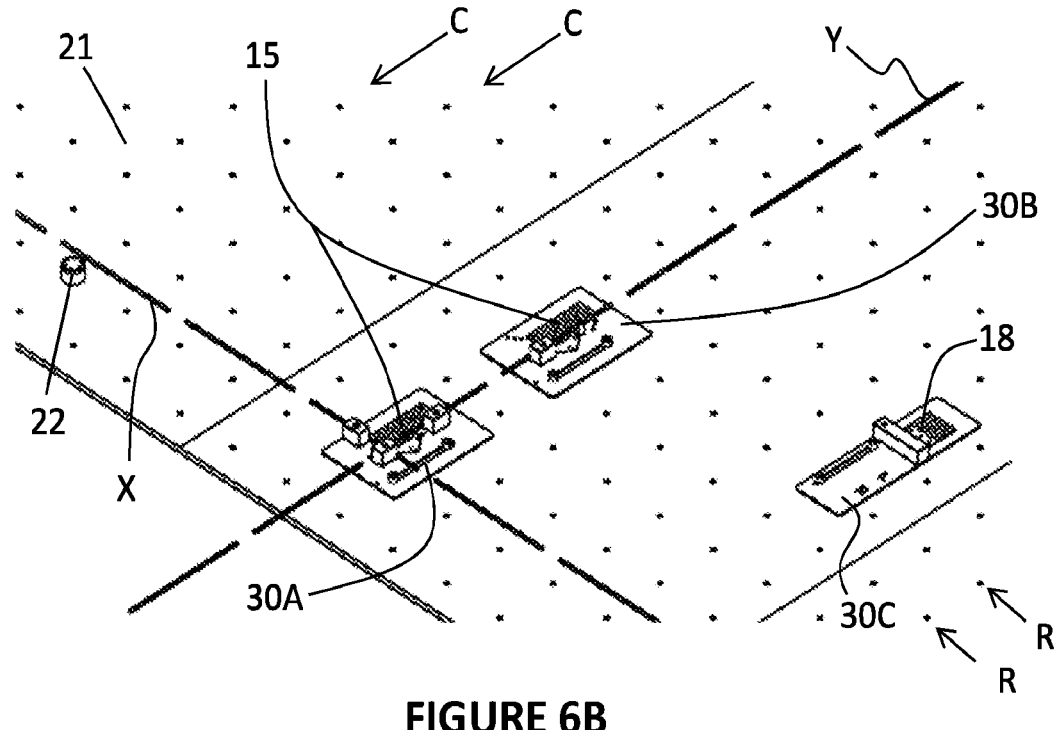

FIG. 6A shows the jigs 30A, 30B and 30C, and attachments 15 and 19 held thereby, in the positions they occupy once located, with the former secured against the table surface 21. Referring also to FIGS. 4, 6B and 3 (likewise showing the jigs and attachments in those positions), with the central axis of the bottom chord member B arranged coaxial with axis X, owing to opposed ends thereof abutting the pucks 22, the jig 30A aligns correctly the cutout 38 thereof (thereby locating first/lower attachment 15 once received therein) to that axis—upon face FS of block 34A thereof coming into abutment with axial face B1 of the member B—and locates the member B axially along axis X (and thus to the first/lower attachment once so received)— upon the end face BF1 of that member being brought into abutment with face FS of block 34B thereof. The jig 30A also locates the web member W axially, in the direction of axis Y—upon the lower face LF of that member being brought into abutment with the axial face B2 of (located) member B, and locates the cutout 38, and thus the once received thereby, to the junction J1, for application of the first/lower attachment 15 at the correct position.

Jigs 30A and 30B cooperate, by virtue of the faces FS of blocks 34A3 and 34B thereof abutting the web axial face W1, to align the central axis f member W, both rotationally and in a direction transverse thereto within the truss plane (locating it, in the direction of the axis X, and the second/ upper attachment one-to-the-other when the latter is received by the cutout 38 thereof)—such that the central axis of member W is coaxial with axis Y.

Jig 30B, owing to the abutment between pin 35 thereof and the top chord member T, locates to that member along the axis Y and thereby locates the cutout 38 thereof, and thus the upper/second attachment once received by that cutout, to the junction J2, for application of the second/upper attachment 15 at the correct position.

Advantageously, the jigs 30A and 30B serve both to locate the members B and W one-to-the-other—whereby the top chord member T can be located to those members (by being brought into abutment with the chamfered/tapered ends thereof) the location of the member—and to locate the attachments 15 to the members.

Advantageously, jig 30C, by virtue of its being aligned parallel to the axis Y and a set distance from the (coaxial) hinge axes A, owing to the engagement between the slot 39 thereof and screws 37, and to the latter being received by holes 24 in a column C which is a set number of columns apart from that in which the holes 24 that receive the screws 37 holding jigs 30A and 30B, locates the attachment 19 in a direction parallel to the axis X and rotationally in the truss plane. Jig 30C, also advantageously, by virtue of the abutment between edge EE of the block 33 thereof and the top chord/extension lower axial face T1, locates the attachment 19 in a direction parallel to the Y axis, whereby it is applied to the extension E at the correct position and in the correct orientation—such that the axis D of edge 19D thereof is parallel with, and a set distance (S) from, the axis A (that distance being 600 mm in the example illustrated).

Because the attachments 15 and 18 are stamped/punched, they have repeatable, relatively precisely defined, configurations (around their peripheries in the embodiments described and illustrated), rendering them readily and reliably locatable (in the manner described). The jig base plates, generally designated by the reference numeral 32, in the preferred embodiments disclosed herein, likewise stamped/ punched from substantially planar metal (preferably steel) plate (e.g. 2.5 mm thick), similarly thus have repeatable, relatively precisely defined, configurations, including the configurations of the peripheries thereof and the configurations of the cutouts 38/39 thereof, whereby the fits formed between the base plates and attachments are close/precise, as are the fits via which the jigs engage the table/support structure.

In respect of the further embodiment a description of which now follows, reference numerals are re-used, or used again together with a "prime" (') symbol, to denote features which are the same, or which correspond, respectively.

Shown in FIGS. 9A to 9D, 10A, 10B, 11A and 11B are details of a jigging system 100' according to another preferred embodiment of the present disclosure, the system 100' comprising a support structure, which comprises a jig table 20', and jigs, generally designated by the reference numeral 30', configured to engage the table 20' and timber members B, W, T arranged thereon to form members of the truss 14.

In this embodiment, the table 20', instead of being formed with threaded holes through the surface thereof, is formed with spaced apart slots 25Y of equal width and extending parallel with axis Y, and the jigs, generally designed by the reference numeral 30'. The jigs 30' comprise jigs 30A', 30B' and 30C' and have configurations similar to those of jigs 30A, 30B and 30C respectively except with respect to how they engage the jig table and are position-adjusted relative thereto.

Figure 9A:
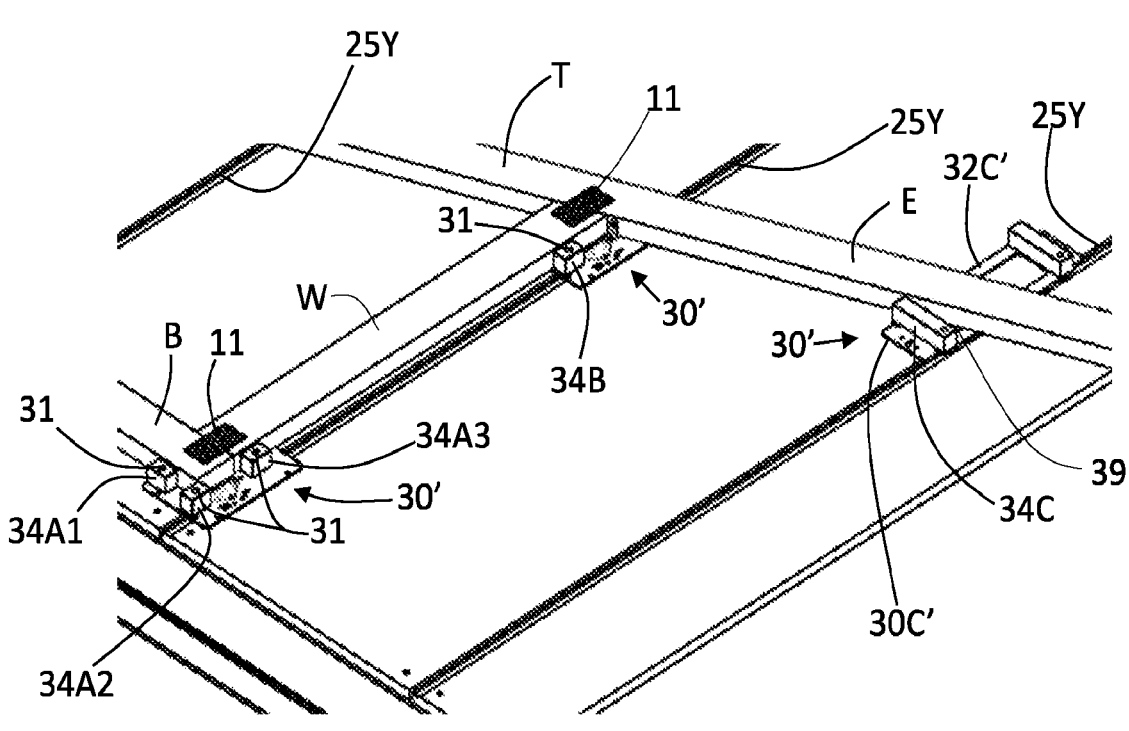
FIGS. 9A and 9B are perspective views showing components of a jigging system according to a second preferred embodiment of the present disclosure used to locate the members one-to-another and attachments to the (thus located) members, in the fabrication of a left-handed supplementary truss.
Figure 9B:
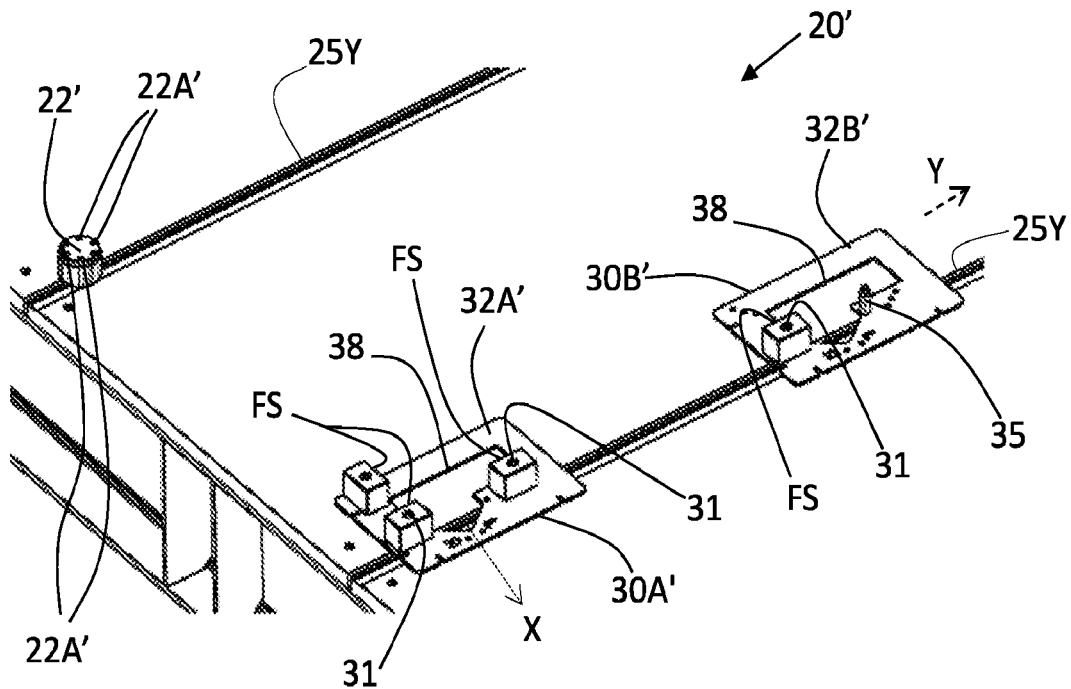

Pucks 22', one of which is shown in FIG. 9B, are positioned at spaced positions on the table 20', the pucks 22' each being spaced a predetermined distance, parallel to axis Y, from an edge 27 of the table, which edge extends parallel to axis X, the pucks being provided with screws 22A' which are screwed into the table top (which is preferably formed of timber), fixing the pucks 22' such that they define fixtures, and the member B, is positioned such that face B1 of the member B abuts the pucks 22', whereby the member B is aligned rotationally about an axis which is orthogonal both to the surface 21' and to the plane P of the truss 14 fabricated thereon. It is preferable that the pucks 22' be arranged so as to be adjacent respective ends of the member B, to accommodate any bowing along the length of that member.

Jig 30A', like jig 30A, comprises a base plate (32A'), configured with cutout 38, which plate is received against the support surface 21', and oblong locating blocks, 34A1, 34A2 and 34A3, arranged in the same manner as in the case of the previous embodiment. In this embodiment, the plate 32A' is not configured with a slot, and the jig 30A' is not provided with cap screws 37. Instead, fasteners, pins or dowels 31 are received through holes in the blocks 34A2 and 34A3, and through the holes through which are formed the welds securing them to the plate 32A', so as to project beyond the underside of the plate 32A' to be receivable in a slot 25Y. The width of each slot 25Y is only slightly greater than outer diameters of the shanks of the screws 31 whereby the screws 31 permit movement of the jig 30A' only in a direction parallel to the axis of the slot 36 (and thus to the axis Y), the jig 30A' thus being aligned to the plane P and to the Y axis.

Jig 30A' is positioned on the table 20' in the region of a square-cut end BE1 of member B, with the face FS of block 34A1 set back slightly from the plane in which the face B1 of the rotationally aligned member B lies. The member B is shifted towards the plane in which faces FS of blocks 34A2 and 34A3 lie such that the end BE1 overlies the plate 32A', and the jig 30A' advanced (slid) along axis Y, whereby face FS of block 34A1 and axial face B1 abut and the end face BF1 thereof and face FS of block 34A2 abut, as shown in FIG. 9A. The jig 30A' is then fixed against the surface 21', such as by at least one screw passed through a hole in the plate 32A' and screwed down into the table top, to be precluded from movement along the slot 25Y with which the jig 30A' is engaged. The jig 30A' is thus located, along the Y axis, to the member B (which is already correctly rotationally orientated in the plane P, owing to its abutting the pucks 22'), and the member B located, along the axis X, to the jig 30A' (which is likewise already correctly rotationally orientated in the plane P).

Jig 30B' comprises a base plate (32B'), configured with cutout 38, which plate is received against the support surface 21', and locating block 34B and locating pin 35 which are secured to the plate 32B', arranged in the same manner as in the case of the previous embodiment. In this embodiment, the plate 32B' likewise is not configured with a slot, and the jig 30B' is not provided with cap screws 37. Instead, fasteners, pins or dowels 31 are received through holes in the block 34B and locating pin 35, and through the holes through which are formed the welds securing them to the plate 323', so as to project beyond the underside of the plate 32B' to be received in slot 25Y, the screws 31 permitting movement of the jig 30B' only in a direction parallel to the axis of the slot 36 (and thus to the axis Y), the jig 30B' thus being aligned to the plane P and to the Y axis.

The web member W is positioned on the table 20' such that end face LF thereof abuts axial face B2 and the face W1 abuts faces FS of blocks 34A3 and 343.

The top chord member T is positioned on the table 20 'such that axial face T1 thereof is received against angled end face UF of the web member W at the tapered/chamfered upper end WU of the web member W and received against angled end face BF2 of the bottom chord member B at the tapered/chamfered end BE2 thereof, whereby the member T is located rotationally in the plane parallel to plane P, and translationally along a direction perpendicular to its axis in that same plane. The jig 30B' is then advanced (slid) along axis Y, whereby the circumferential side face 35A of locating pin 35 is received against the axial face T1 and the jig 30B thus located along axis Y, and to the top chord member T. The jig 30B' is then fixed against the surface 21', such as by at least one screw passed through a hole in the plate 32B' and screwed down into the table top, to be precluded from movement along the slot 25Y with which the jig 30B' is engaged.

Figure 9C:
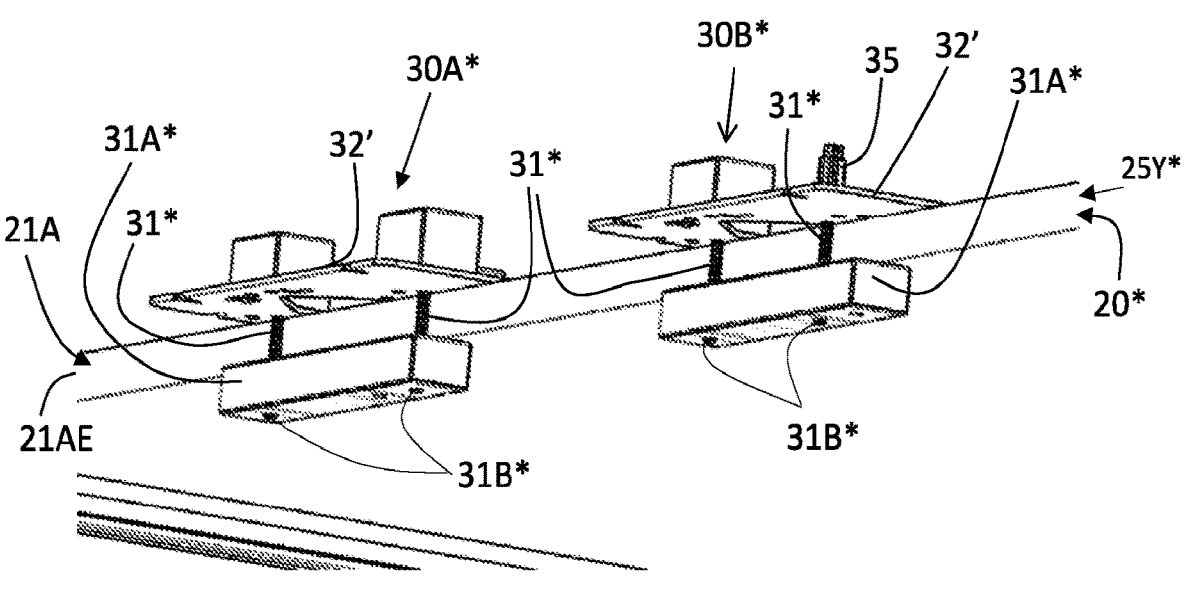
FIG. 9C is a perspective view showing a panel section of the support structure of a system according to a variant of the second embodiment and jigs of that system engaged with said section.
Figure 9D:
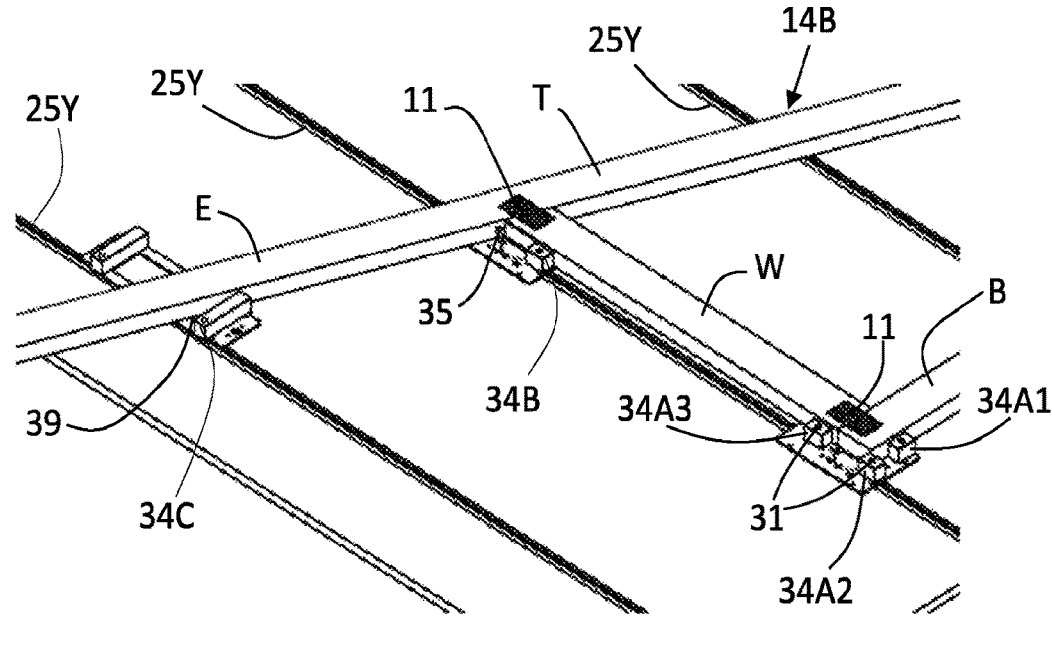
FIG. 9D is a perspective view showing components of the jigging system of the second embodiment used to locate said members one-to-another and said attachments to the (thus located) members, in the fabrication of a right-handed supplementary truss.

Jig 300' comprises a base plate 32C', which plate is received against the support surface 21' and is configured with first and second cutouts 39 and first and second locating blocks 33, which of the first cutout 39 and block 33 and the second cutout 39 and block 33 that cooperate, to hold the attachment 18 and abut the member T (thereby cooperating to locate the former to the latter, as previously described) respectively, being dependent on the handedness of the truss 14 (compare FIGS. 9A and 9D). In the example shown in FIG. 9A, the jig 30C' along the slot 25Y with which it is engaged is for fabrication of a left-handed truss 14A. FIG. 9D shows the setup (as viewed from the opposite corner of the table at the same end thereof) for fabrication of a right-handed truss 14B, and particularly the positioning of the jigs 30A' and 30B' (being right-handed ones in this case) relative to jig 30C'.

In this embodiment, the plate 32C' likewise is not configured with a slot, and the jig 30C' is not provided with cap screws 37. Instead, pins or dowels 31 are received through holes in the blocks 33, and through the holes through which are formed the welds securing them to the plate 320', so as to project beyond the underside of the plate 32C' to be received in another of the slots 25Y, which is selected and/or arranged according to what is to be the spacing S—which typically will, again, be selectable from alternatives of 600 mm, 900 mm and 1,200 mm, the pins/dowels 31 permitting movement of the jig 300' only along/parallel to the axis of the (other) slot 25Y (and thus to the axis Y), the jig 30C' thus being aligned to the plane P and to the Y axis.

Figures 2B, 2C:
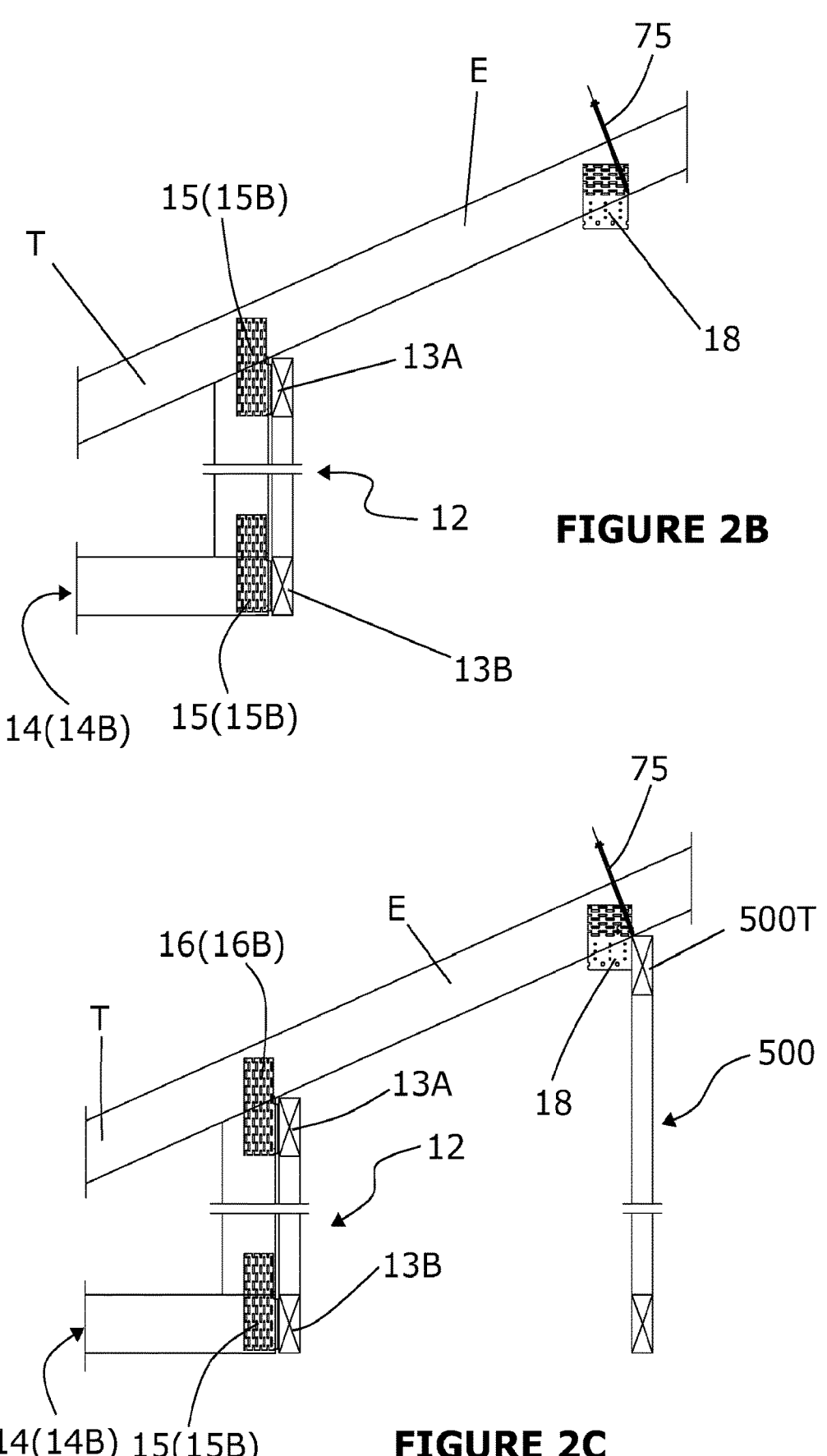
FIG. 2B is a partial cross-sectional view showing parts of the main truss and the right-hand supplementary truss in an extended position, including the locating attachment and a screw applied to the top chord extension of that supplementary truss, a mirror image of which is the corresponding view of parts of the main truss and left-hand supplementary truss in an extended position.
FIG. 2C is a partial cross-sectional view corresponding to FIG. 2B and showing the abutment between the locating stop and further truss top chord referred to above.

The attachment 18 comprises a nail plate portion, comprising a base 19A and spikes or teeth 19B bent and projecting from the base 19A (with which they are integral) and are pressable into the member T/extension E/into the timber thereof such that the base 19A is received thereagainst/adjacent thereto and the attachment 18 is thus applied, and further comprising a locating portion 190 which is coplanar with the base 19A and has parallel straight side edges 19D arranged such that one or the other depending on the handedness of the truss 14—is, referring to FIG. 2C, contacted/directly abutted by a top chord member 500T of the truss 500 when the truss 14 is in its extended position, whereby the attachment 18 serves as a "stop" against which the truss 500 is located so as to be spaced from the truss 12 the desired distance. The attachment 18/base 19A includes an end edge 19E, to which the side edges 19D of the locating portion 19C/attachment 18 are perpendicular.

The jig 30C' (the locating edge EE of which is set back slightly from the face T1) is advanced (slid) along the axis of the (other) slot 25Y, parallel to the axis Y, such that the edge EE of the first block 33 abuts the face T1, whereby the cutout 39 (and thus the attachment 18 when received therein) is located to the member T1, along the slot axis 25Y in particular.

The jig 30C' is then fixed against the surface 21', such as by at least one screw passed through a hole in the plate 32C' and screwed down into the table top, to be precluded from movement along the (other) slot 25Y with which the jig 300' is engaged.

Because the axis of edge portion 39A is parallel to the axis Y and a set distance (in the direction of axis X) from the axis through the cutouts 38 which is arranged to be coaxial with the hinge axes A when the attachments 15 are received in those cutouts, the attachment 19 when applied will be correctly positioned and orientated on the extension E, so as to locate precisely the truss 500 by abutting that truss.

The members B, W, T, thus located one-to-another on the surface 21' by virtue of their engagement with pucks 22' and the jigs 30A' and 30B' and their abutment with each other, are stapled together—at the junction J1, the junction J2 and the junction J3—so as to be preliminarily interconnected. The preliminary assembly comprising them is then lifted slightly and the attachments 15 and 18 placed into the cutouts 38 and (first) cutout 39 respectively. Also while the members B, W, T are clear of the table surface 21', a (standard) nail plate 11 is positioned, base-down, on the surface 21' to underlie the junction J1. The preliminary assembly comprising members B, W, T is then set back down (to re-engage the pucks 22' and jigs 30A', 30B' and 300'), and nail plates 11 are arranged, base-up, over the junctions J1, J2 and J3. The members B, W, T, attachments 16 and 18 and nail plates 11 are pressed such that the teeth of the (located) lower attachment 15 are driven into members B and W at the junction J2, whereby those members are securely fastened together by that attachment, the teeth of the (located) upper attachment 15 are driven into members W and T at the junction J3, whereby those members are securely fastened together by that attachment, the teeth of the nail plate 11 are driven into the members B and T at the junction J1, whereby those members are securely fastened together by that nail plate, and the teeth of the (located) attachment 19 are driven into the top chord extension E, whereby that attachment is securely fastened to the extension E. The truss 14, thus formed, is then removed from the table 20'. If necessary/appropriate, the truss 14 may thereafter be subjected to a further pressing operation, to ensure that the attachments 16 and 19 and nail plates 11 are driven fully home.

In respect of the further embodiment a description of which now follows, reference numerals are re-used, or used again together with an asterisk (*), to denote features which are the same, or which correspond, respectively.

Figure 10A:
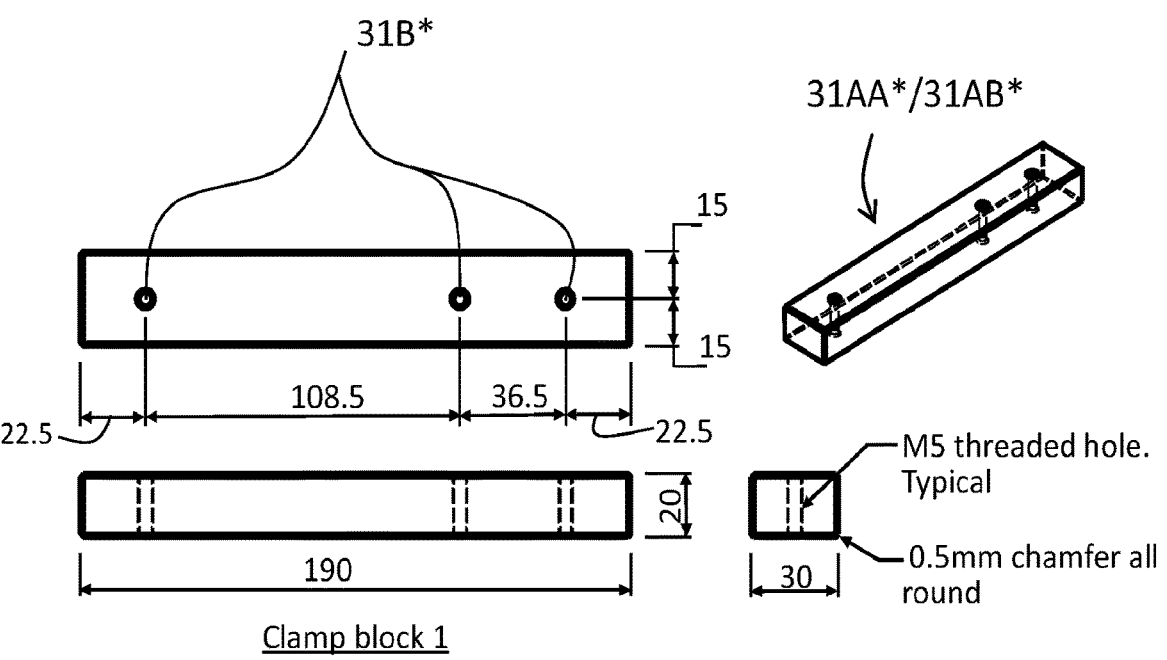
FIG. 10A shows details—perspective, and plan, side and end elevation views—of a clamping block used to secure together jigs and the support structure of the system of said variant.
Figure 10B:
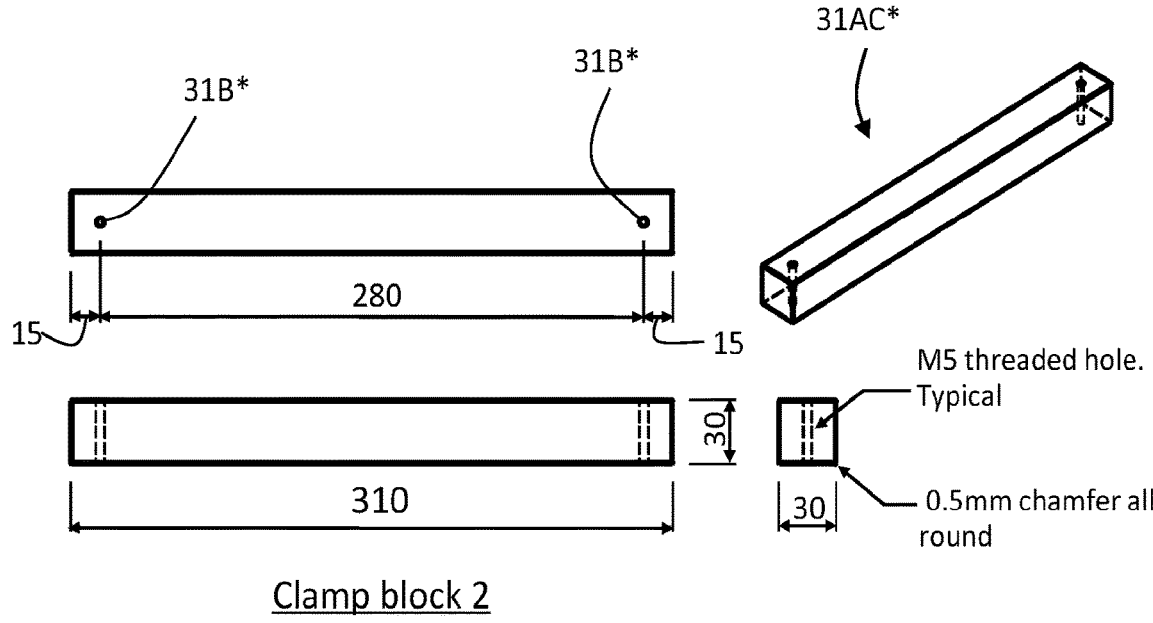
FIG. 10B shows details—perspective, and plan, side and end elevation views—of a locating block of a said jig.

In the system 100* of that further embodiment (being a variant of the previous embodiment), details of which system are shown in FIG. 9C, the slots 25Y* pass all the way through the table top, and the jigs, designated generally by the reference numeral 30*—two of which, namely jigs 30A* and 306*, are shown in the drawing—each include a clamping block 31A* received against the underside of support panelling which defines the table top. Details of the said blocks (31AA* and 31AB*) of the jigs 30A* and 30B* are shown in FIG. 10A, and details of the block (31AC*) shown of the jig 300* are shown in FIG. 10B. The fasteners/pins/dowels (31') through the blocks 33 and 34 and fastener/pin/dowel 35 on the respective base plates 32' pass through mounting holes 31B* in blocks 31A* so as to engage those blocks whereby the adjacent edges 21AE of adjacent ones of panel sections 21A (which define the support surface)—one of which edges/sections is shown in FIG. 9C—are clamped between each base plate 32' and the respective block 31A* once the jig 30* comprising them has been positioned at the correct location along the (respective) slot 25Y* (to locate the respective attachment 15/18/member(s)). The fasteners/pins/dowels 31*/35, for example in the form of screws, and the mounting holes 31B* in blocks 31A* may have complementary threaded portions for effecting clamping of the edges 21AE of adjacent ones of the panel sections 21A between the base plates 32' and the blocks 31A*.

In respect of the further embodiment a description of which now follows, reference numerals are re-used, or used again together with a double prime (″) symbol, to denote features which are the same, or which correspond, respectively.

In the system 100″ of that further embodiment (being a variant of the previous embodiment), details of which system are shown in FIGS. 12A to 12E and 13A to 13E, the jigs 30″ comprise jigs 30A″, 30B″, 300″ which correspond to jigs 30A', 30B' and 300' respectively (and have configurations similar thereto, except with respect to how they engage the jig table (20″) and are position-adjusted relative thereto, as will be described later) as well as 30D″ for engaging the members T and B at junction J1 therebetween. The table 20″ of the system 100″ is formed with slots, generally designated by the reference numeral 25″, via which jigs 30″ can engage the table 20″, the slots 25″ comprising slots 25X″ extending parallel with axis X and arranged adjacent respective ones of opposed edges of the table top, whereby either of left- and right-handed versions of the jigs 30A″, 30B″ and 30D″ can, along with jig 300″, arranged on the table 20″ according to whichever of left- and right handed versions of the truss 14 is to be formed (see FIG. 12E), and slots 25Y″ extending parallel with axis Y.

Figures 11A, 11B, 11C:
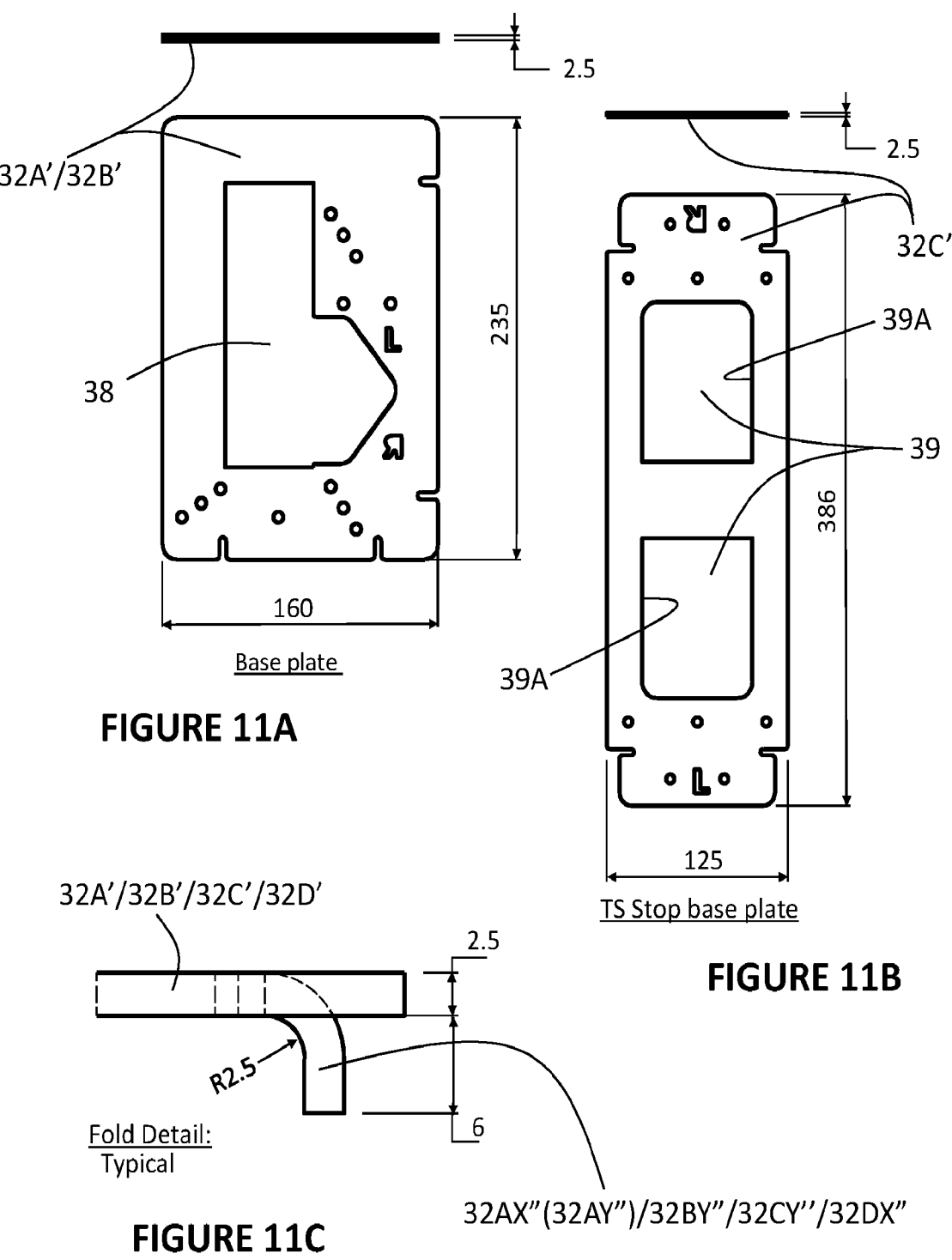
FIGS. 11A and 11B are plan and end elevation views showing base plates of jigs of the system of the second embodiment, said variant thereof, or either of third and fourth embodiments of the present disclosure.
FIG. 11C shows details of a fold or bend formed at edge portions of the base plates of jigs of the system of the third embodiment.
Figure 12A:
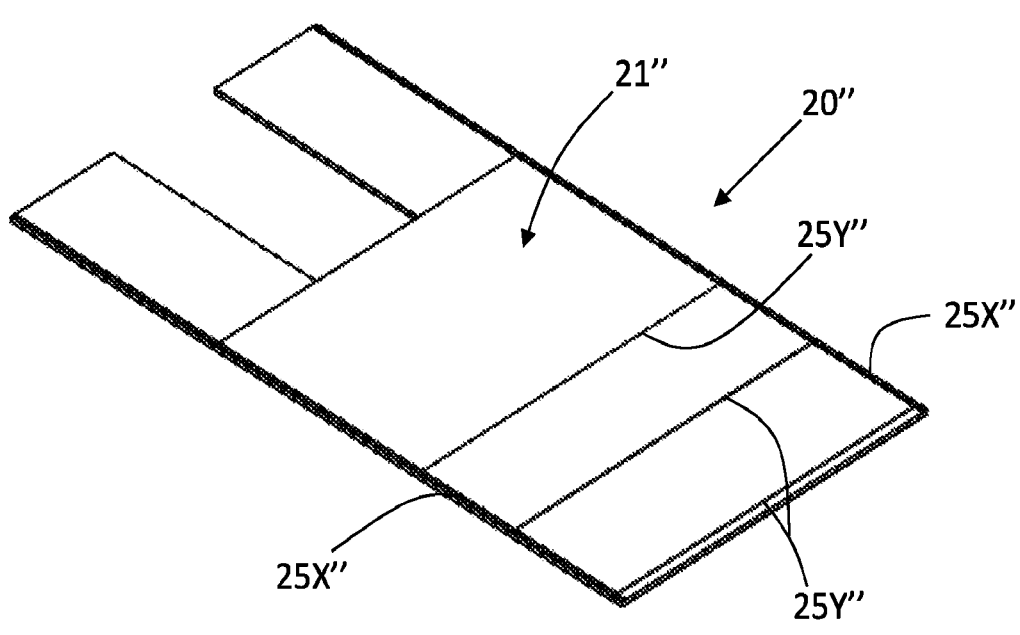
FIGS. 12A to 12E are perspective views showing the support structure and jigs of the system of the third embodiment; including the positioning of the latter (relative to the former) when locating said members and said attachments for application thereto.
Figure 12B:
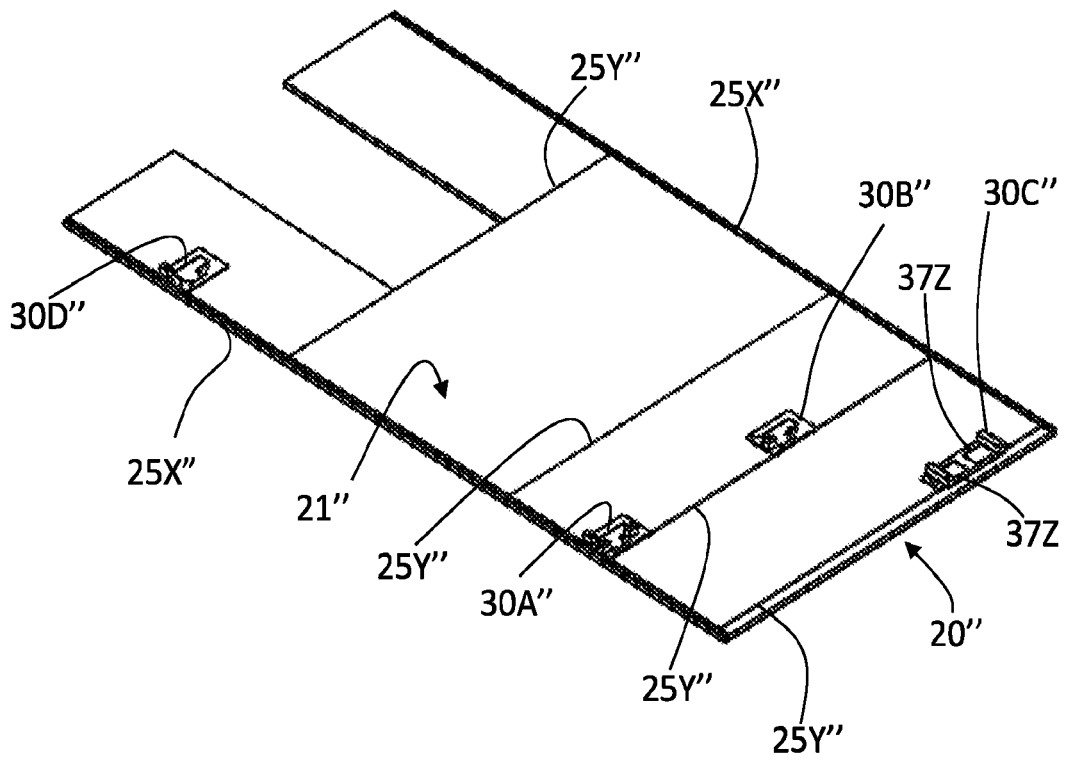
Figure 12C:
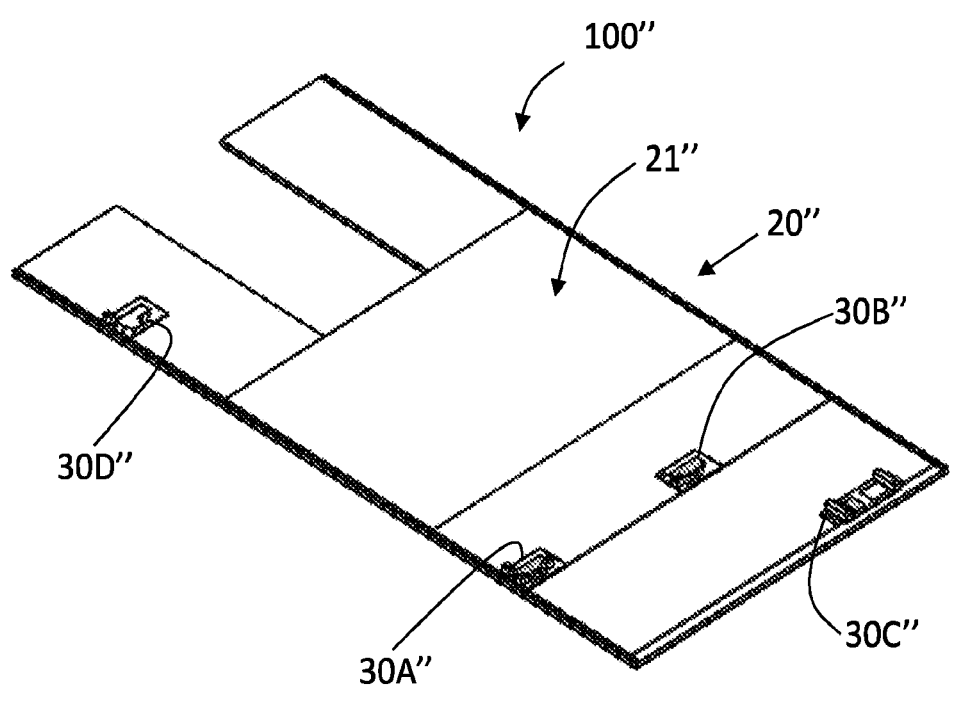
Figure 12D:
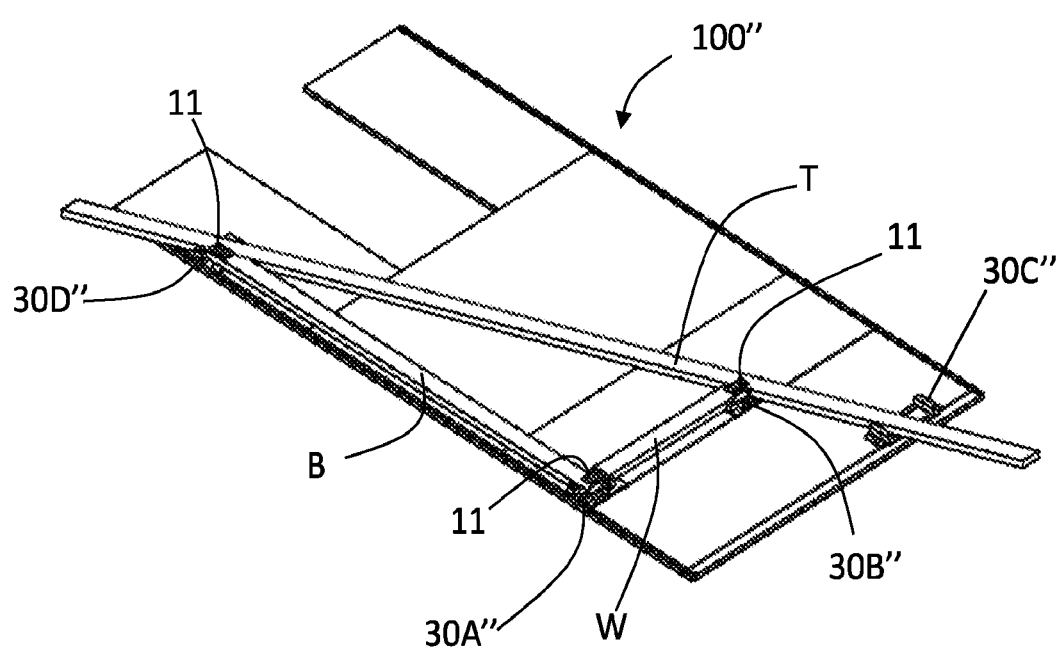
Figure 12E:
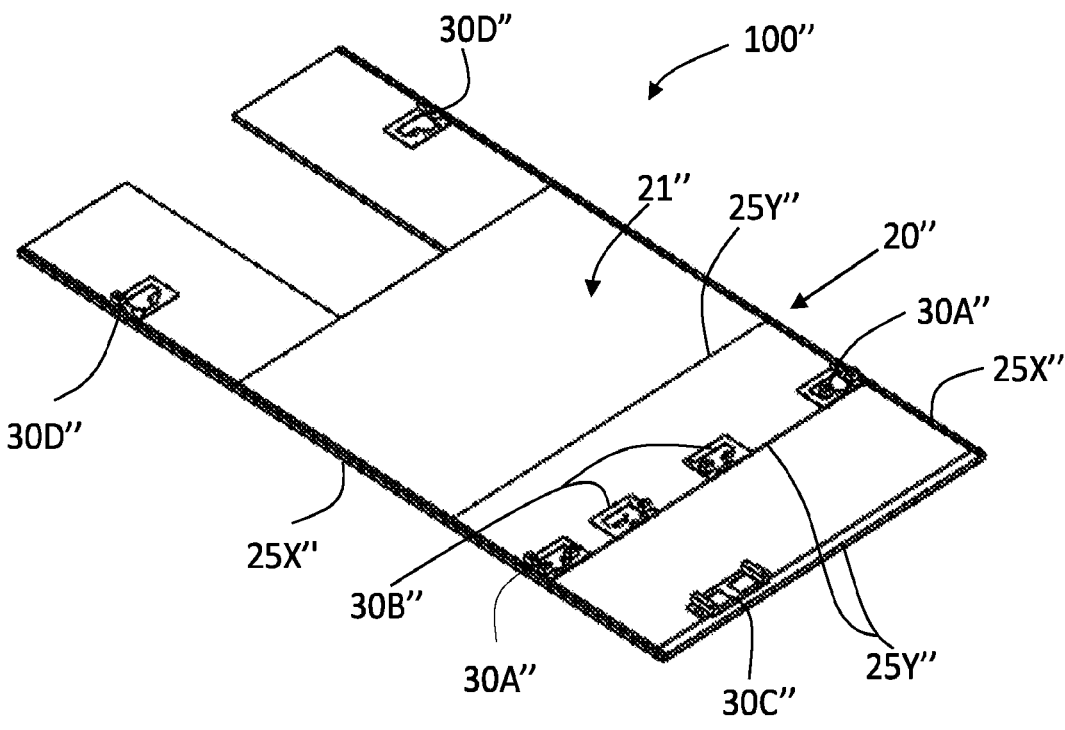

Jig 30A″ (FIG. 13A), comprises base plate (32A'), which is received against the support surface 21', and oblong locating blocks, 34A1, 34A2 and 34A3, arranged in the manner already described. Rather than the jig 30A″ being provided with fasteners, pins or dowels 31/31*, integral tongues or ribs 32AX″ and 32AY″ are bent or folded from the plane of the plate 32A' and project, transverse to that plane, from a respective edge portion of the plate 32A, whereby the ribs 32AX″ and 32AY″ are receivable in respective ones of the slots 25X″ and 25Y″ adjacent an intersection therebetween, so as to retain the plate 32A″, and thus the jig 30A″, to the table 20″, precluding movement thereof on the surface 21″. FIG. 11C shows details of a typical fold or bend formed at an edge portion of the base plate 32A' (or 32B'/32C'/32D') to thereby form an integral tongue or rib 32AX″ (or 32AY″/32B″/32CY″/32DX″).

Jig 30D″ (FIG. 13B), like jig 30A″, comprises a base plate (32D') which is receivable against the support surface 21″, the plate 32D' being provided with at least one integral tongue or rib 32DX″ likewise bent or folded from the plane of the plate 32D' and projecting, transverse to that plane, from an edge portion of the plate 32D', so as to be receivable in a slot 25X″ (being that which receives rib(s) 32AX″), to retain the plate 32D″, and thus the jig 30D″, to the table 22″, precluding movement thereof on the surface 21″ (except such movement in the direction of the slot 25X″/X axis). The jig 30D″ further comprises an oblong locating block 34D arranged on the plate 32D' and positioned such that the perpendicular spacing between the plane in which locating face FS thereof lies and the rib 32DX″ is the same as that between the plane of locating face FS of block 34A1 and rib 32AX' of jig 30A', whereby when jig 30D″ is engaged with the table 22″ via rib(s) 32DX″ the two faces FS are coplanar. Jig 30D″ additionally comprises cutout 38, into which a nail plate 11 is downwardly receivable. The nail plate 11 has a rectangular base the dimensions of which are the same as those of the base 17A of the attachment 15, whereby the nail plate 11 (like that base) has a configuration complementary to that of, or forms a matching fit with, the (substantially rectangular) part of the cutout 38, thereby being (as the said base/attachment is) keyed to the cutout 38/base plate/jig and thus located by it.

With the jigs 30A" and 30D" thus positioned on the table 20", the member B is arranged on the table 20" such that face B1 thereof abuts the faces FS of blocks 34D and 34A1, whereby the member B is aligned rotationally, and located in a direction parallel to axis Y, on the table surface 21". The member B is shifted parallel to axis X such that the end face BF1 thereof and face FS of block 34A2 abut, whereby the member B is located in a direction parallel to the axis X. The jig 30D" is slid along the slot 25X" to the/any extent necessary such that it underlies the chamfered end of member B at the correct position for application of the nail plate 11 at junction J1.

The web member W is positioned on the table 20" such that end face LF thereof abuts the axial face B2 of member B the face W1 abuts face FS of block 34A3. Jig 30B" is positioned on the table 20", so as to be in the region of end UF of the member W. The jig 30B" comprises base plate 32B', which is received against the surface 21", and oblong locating block 34B secured to and arranged on the plate 32B' (in the same manner as in the previous embodiment) so as to be positioned to abut face W1 of member W. The jig 30B" further comprises locating pin 35 secured to and arranged on the plate 32B' (likewise in the same manner as in the previous embodiment) so as to be positionable to abut face T1 of member T/extension E. The plate 32B', rather than being configured with a slot, is provided with a tongue or rib 32BY" which is bent or folded from the plane of the plate 32B' and projects, transverse to that plane, from a respective edge portion of the plate 326', whereby the rib 32BY" is receivable the slot 25Y" which receives rib 32AY", so as to retain the plate 32B', and thus the jig 306", to the table 22", precluding movement thereof on the surface 21" (except such movement in the direction of the slot 25Y"/Y axis).

With top chord member T positioned on the table 20" such that face T1 is received face UF and against face BF2, the jig 30B" is advanced (slid) along the axis of the slot 25Y" in which the rib 32BY" thereof is received, whereby pin 35 is received against face T1 and the jig 30B" thus located along axis Y and to the top chord member T.

The jig 300" comprises base plate 32C', configured with cutout 39, which plate is received against the surface 21", and locating block 34C arranged and secured as already described. Integral tongue or rib 32CY" is bent or folded from the plane of the plate 32C" and projects, transverse to that plane, from a respective edge portion of the plate 32C", whereby the rib 32CY" is receivable in another of the slots 25Y", which is spaced from the slot 25Y" that receives the ribs 32AY" and 32BY", so as to retain the plate 320', and thus the jig 30C", to the table 20", precluding movement thereof on the surface 21" (except such movement in the direction of the other slot 25Y"/Y axis).

Each of the jigs 30A" to 30D", after positioning thereof, is secured to the table 20" by one or more screws 37Z inserted through a hole in the base plate 32' thereof and screwed into the table top (which is preferably formed of timber), so as to be precluded from any movement relative thereto.

Figure 13A:
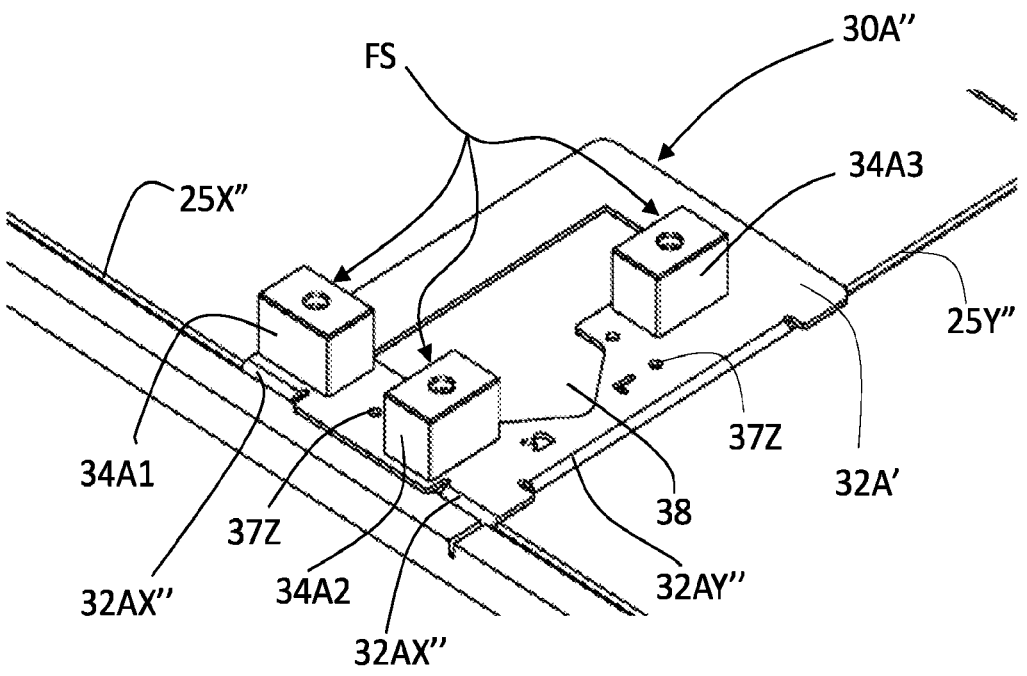
FIGS. 13A to 13O are perspective views showing left-hand versions of respective jigs of the system of the third embodiment and the manner in which they engage the support structure of that system.
Figure 13B:
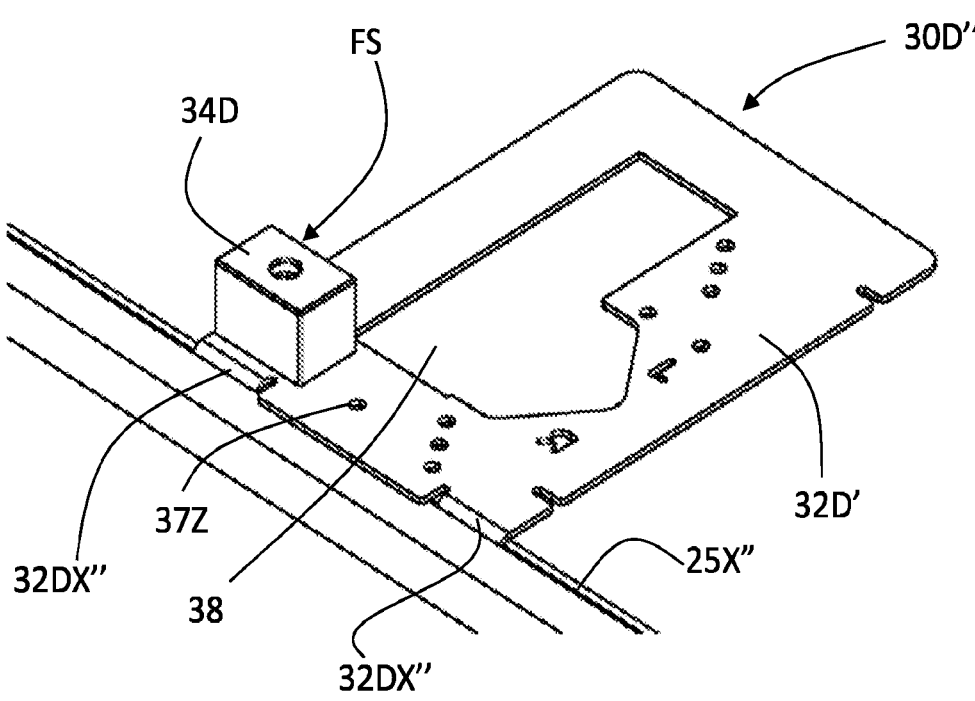
FIG. 13D shows further details of the support structure (including suitable dimensions thereof), and one of the jigs, of the system of the third embodiment.
Figure 13C:
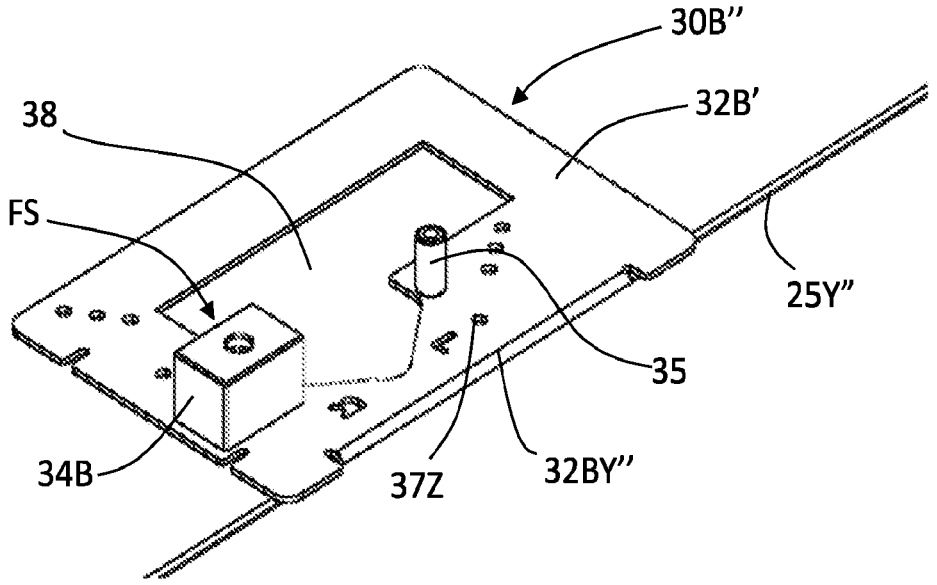
Figure 13D:
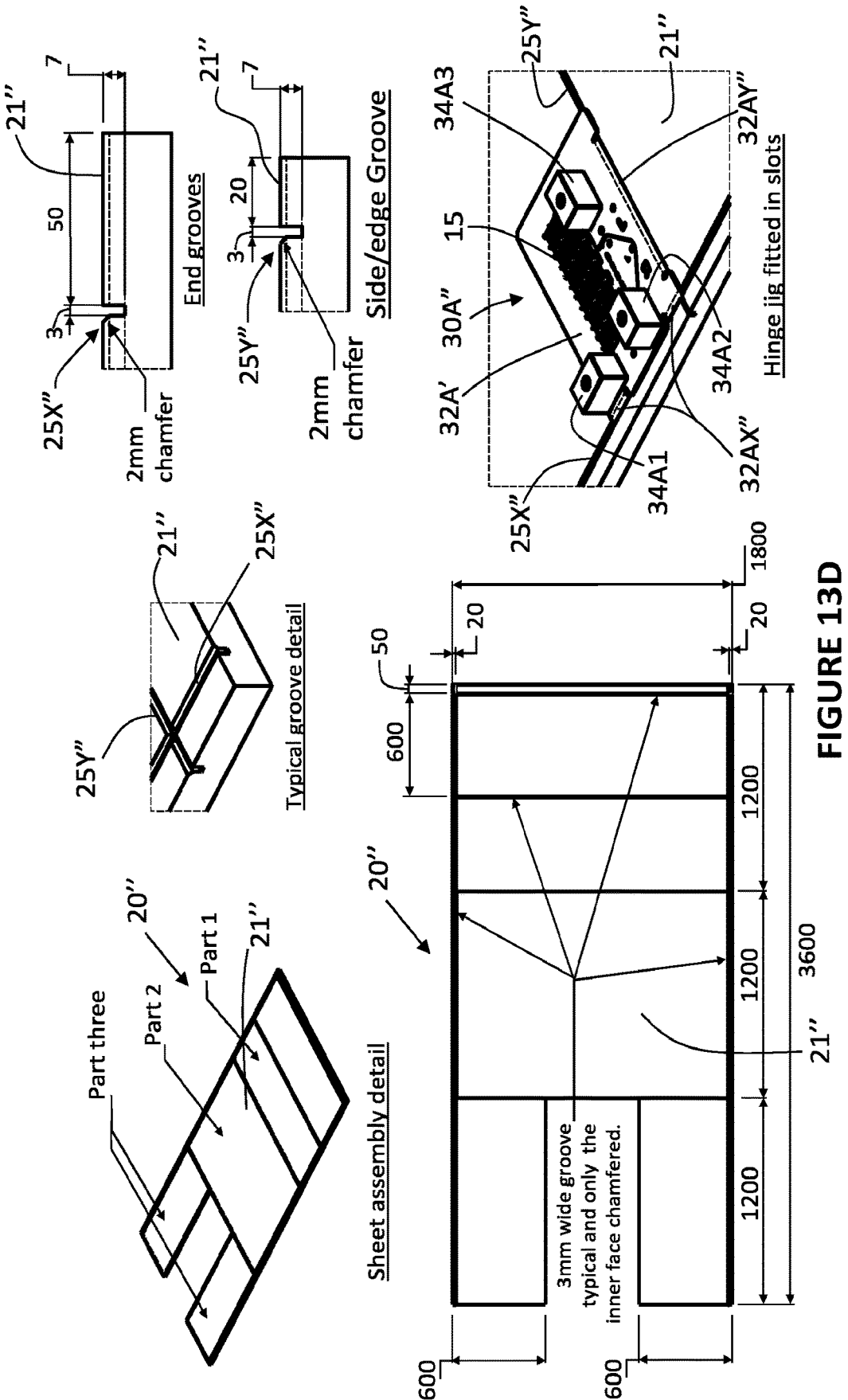
Figure 14A:
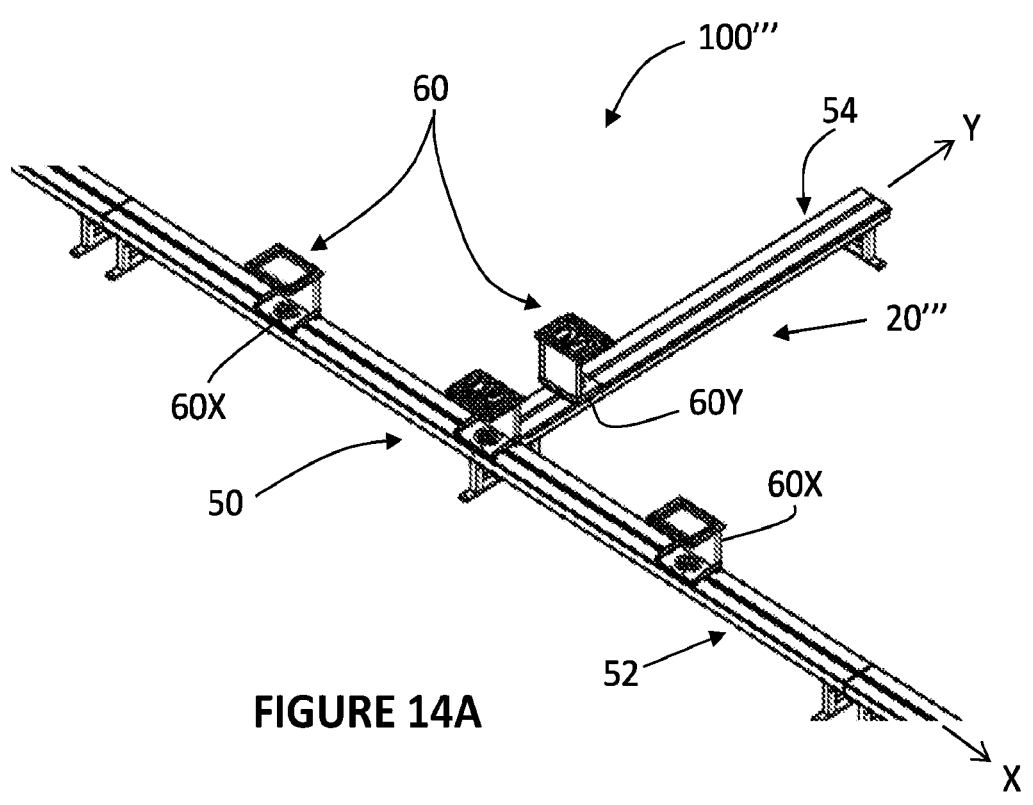
FIGS. 14A to 14D are perspective views showing the support structure and jigs of the system of the fourth embodiment, including the positioning of the latter (relative to the former) when locating said members and said attachments for application thereto.
Figure 14B:
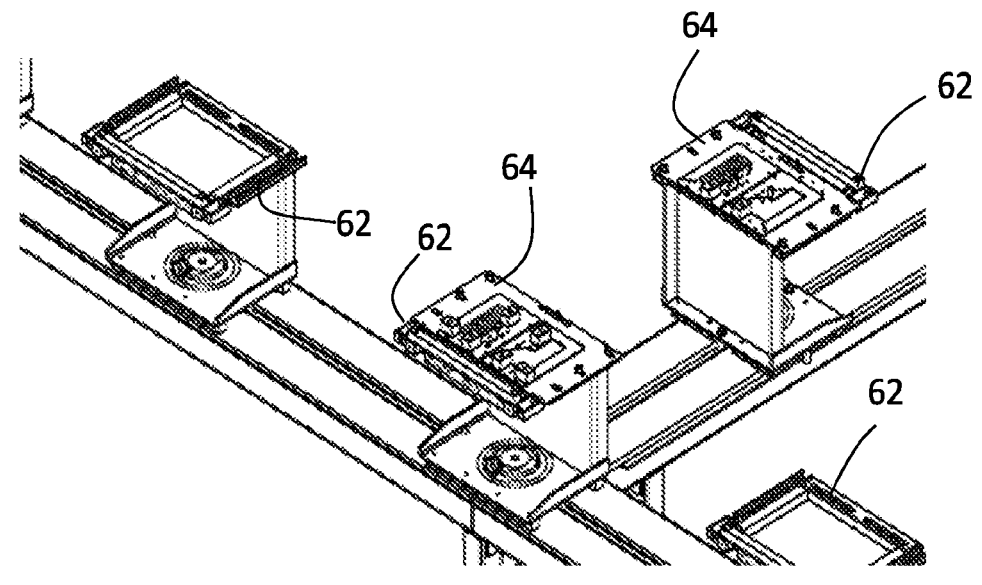
Figure 14C:
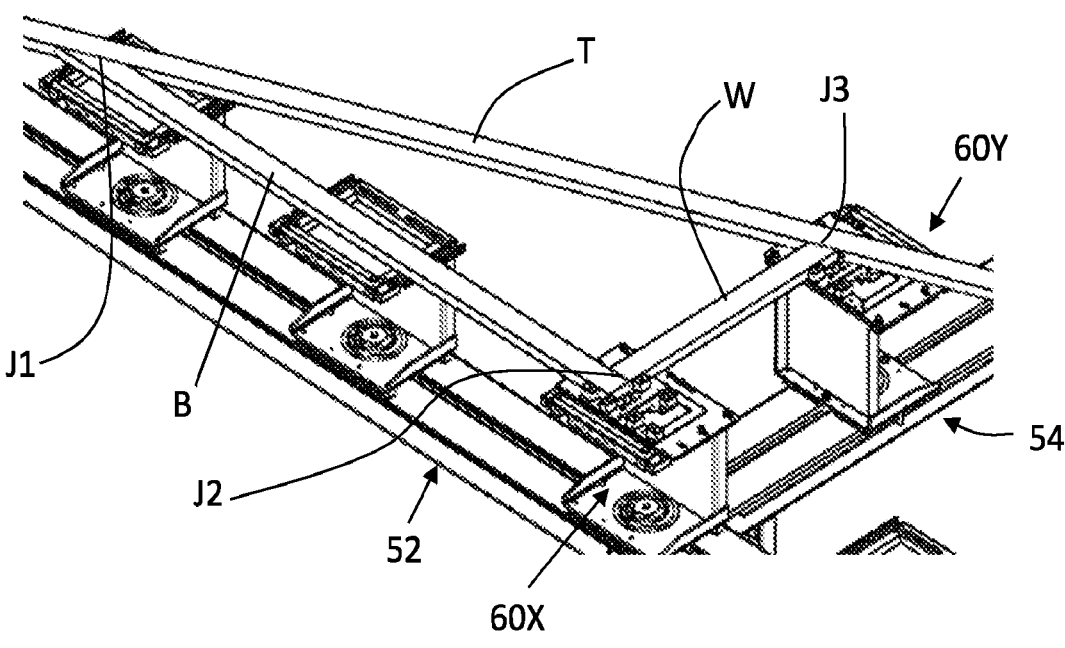
Figure 14D:
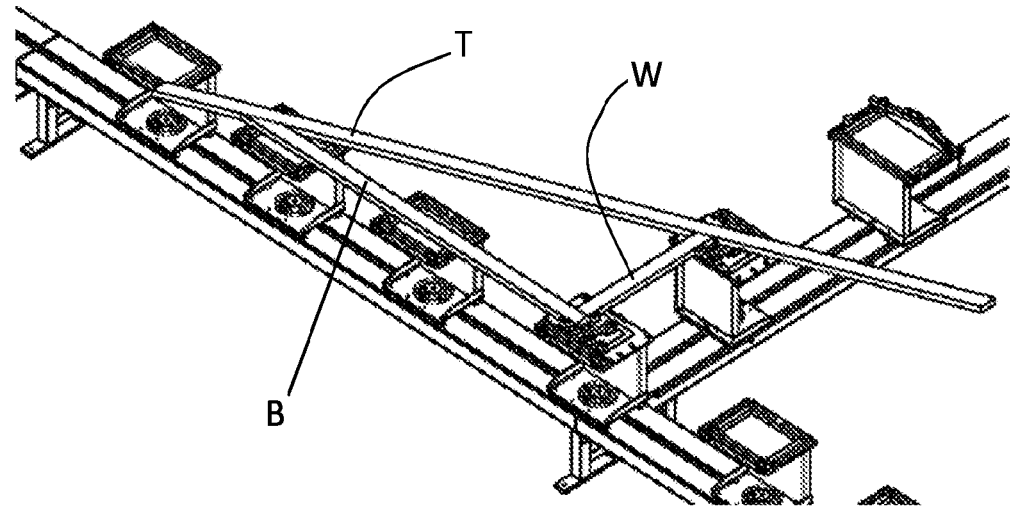
Figure 15A:
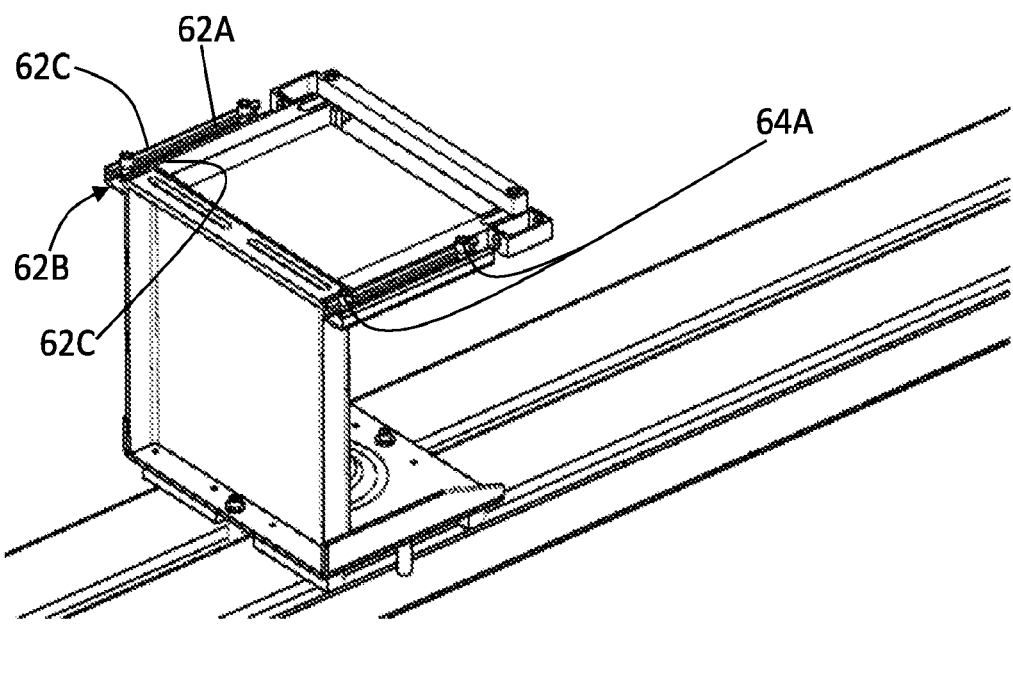
FIGS. 15A to 15F show further details of the system of the fourth embodiment.
Figure 15B:
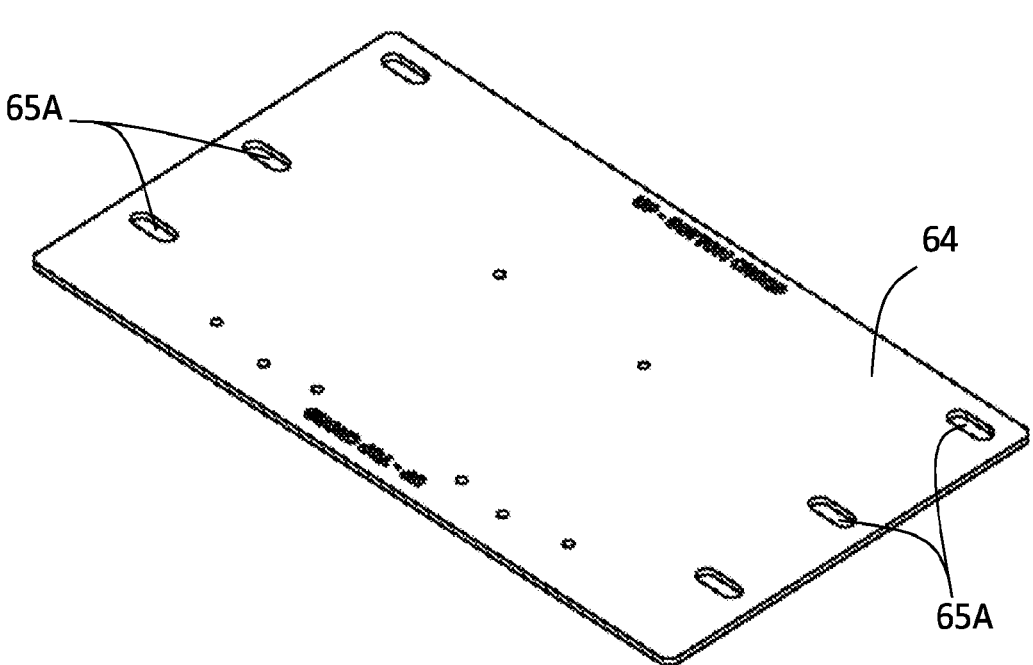
Figure 15C:
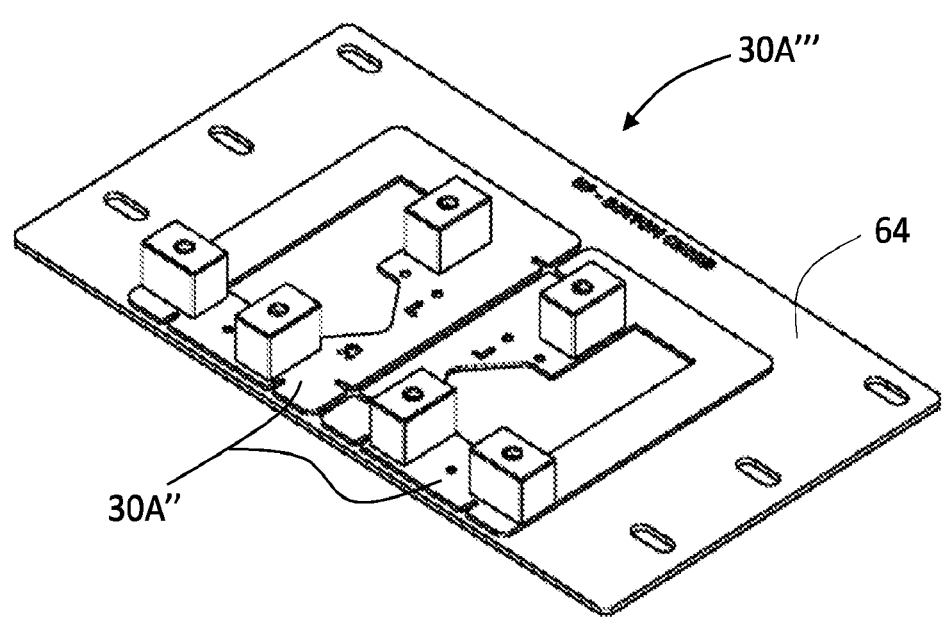
Figure 15D:
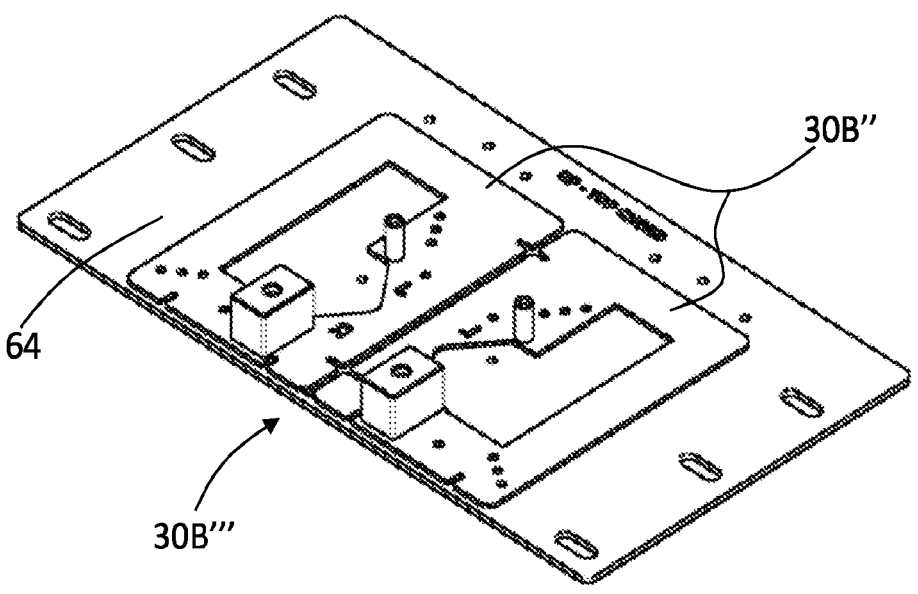
Figure 15E:
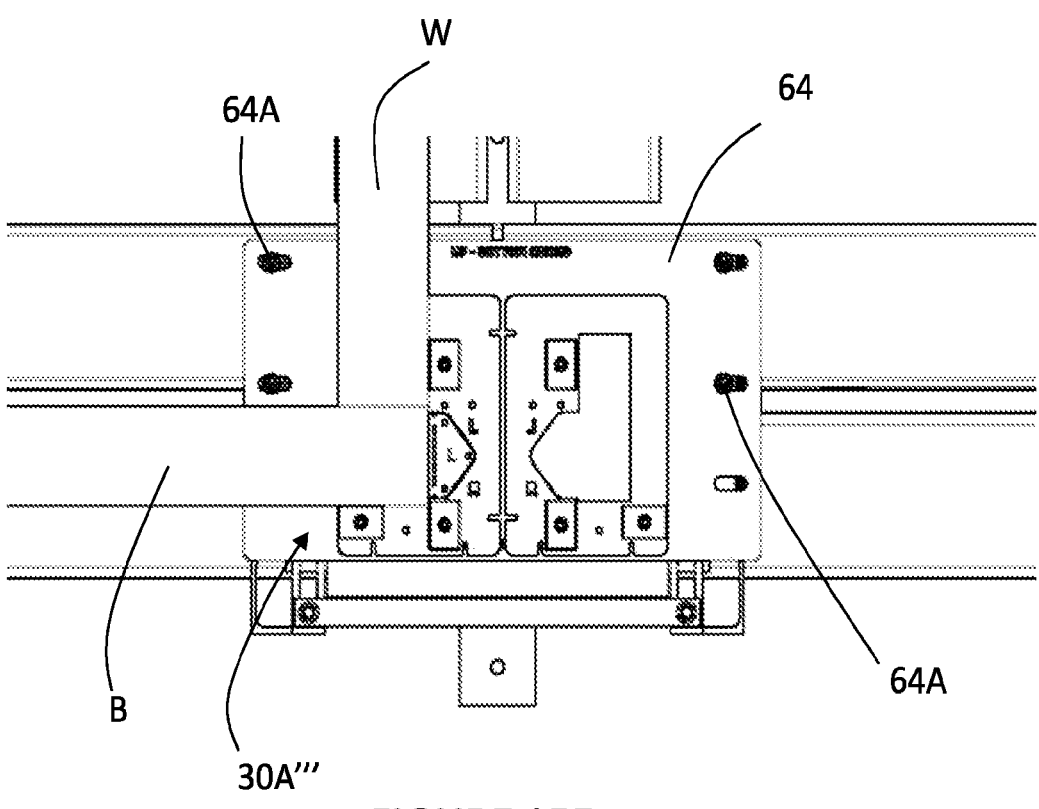
Figure 15F:
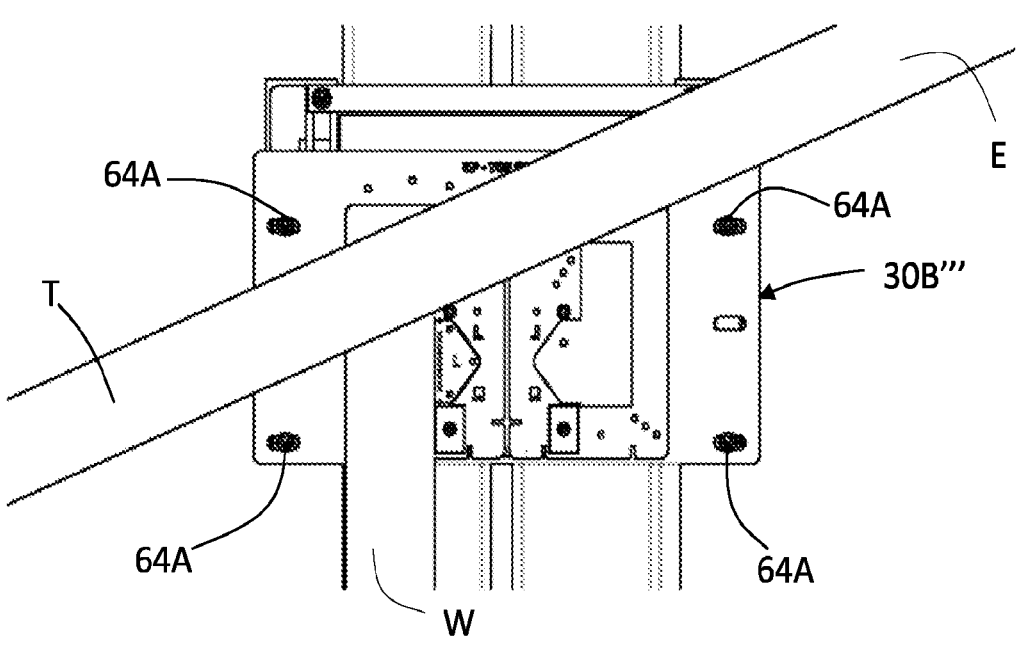

The positioning of the jigs 30" and members T, B, W on the table 20", again, is according to what is to be the spacing S between the truss 12 and the truss 500 in the structure 1000. Details of the table 20", including dimensions thereof, are shown in FIG. 13D.

Again, because the axis of edge portion 39A is parallel to the axis Y and a set distance (in the direction of axis X) from the axis through the cutouts 38 corresponding to the hinge axis, the attachment 19 when applied will be correctly positioned and orientated so as to locate precisely the truss 500 by abutting that truss.

The members B, W, T, thus located one-to-another on the surface 21' are stapled together—at the junctions J1, J2 and J3—so as to be preliminarily interconnected. The preliminary assembly comprising them is then lifted slightly and the attachments 16 and 19 and heel plate 11 placed into the cutouts 38, 39 and 39D' respectively. The preliminary assembly comprising members B, W, T is then set back down (to re-engage the jigs 30A', 30B', 300' and 30D' at the same positions), nail plates 11 are arranged, base-up, over the junctions J1, J2 and J3 and the members B, W, T, attachments 16 and 19 and nail plates 11 pressed, e.g. by way of a platen or roller, as previously described.

The truss 14 after it is removed from the table 20', again, may be subjected to a further pressing operation to ensure that the attachments 16 and 19 and nail plates 11 are driven fully home, if necessary/appropriate.

In respect of the further embodiment a description of which now follows, reference numerals are re-used, or used again together with a triple prime (+") symbol, to denote features which are the same, or which correspond, respectively.

Shown in FIGS. 14A to 14D and 15A to 15F is a system 100''' according to a further preferred embodiment of the present disclosure, the system 100''' including a support structure 20—comprising a frame 50, which may be floor-mounted and which includes a base rail 52, extending along/parallel to the axis X and at least one transverse rail 54 projecting from the base rail 52 and at right angles to it whereby it extends along/parallel to the axis Y. The system 100" further includes moveable support stands, in the form of "station boxes", generally designated by the reference numeral 60, which are mounted to the frame 50, the stands/ station boxes 60 consisting of station boxes 60X mounted to the base rail 52 to be moveable therealong ("base rail stands" or "base rail station boxes"), in the direction of axis X, and a station box 60Y mounted to the transverse rail 54 to be moveable therealong ("transverse rail station box" or "transverse rail stand"), in the direction of axis Y. The assembly comprising the frame 50 and stands 60 may be defined by a jigging apparatus as disclosed in WO 2019/231900 A1 (also to the present applicant), the content of which is incorporated herein by reference.

The or each transverse rail 54 can be moveably (e.g. slideably) coupled to the base rail 52 so as to be moveable relative thereto in a direction parallel to the axis X, e.g. to this end being supported via casters on a ground or floor surface (over which frame 50 is arranged).

The system includes jigs 30A" and 30B" (the ribs/tongues of which are not bent/folded)—again in both left-handed and right-handed forms—which can be mounted to support frames 62 of one of the base rail stands 60X and the transverse rail stand 60Y respectively, via respective mounts 64 each comprising a plate fastened to the respective frame 62, such as with threaded fasteners 64A—comprising screws, received through mounting holes 65A in the plate 64, which holes are elongated in the direction parallel to the axis X, and through slots 62A in the frame 62, which slots are parallel with axis Y, and nuts received in respective channels 62B into which the slots 62A open, the nuts being sized and shaped to engage opposed side walls of the channels 62B so as to be precluded from rotation therein. The fasteners 64A when loosened are able to move along the axes of the slots 62A/channels 62B, whereby the respective plate 64 can move/be adjusted in a direction parallel to/along the axis Y, and permit movement of the slotted holes 65A relative thereto parallel to the axis X, and thus movement/ adjustment of the plate 64 in that direction. The fasteners 64A when tightened clamp (between the nut thereof and the head of the screw thereof) both the plate 64 and respective toes 620, defined to either side of the respective slot 62A, thus locking the plate 64 to the frame 62, precluding relative movement therebetween.

The jigs 30A″ and 30B″ are secured, such as by welding (or via threaded fasteners), to the upper sides of the respective mounting plates 64. In the case of the said jigging apparatus, the plates 64 define adapters rendering the jigs compatible with that apparatus.

Thus defined are a jig 30A″ comprising the jig(s) 30A″, the stand 60X to which it/they is/are mounted, and the plate 64 mounting the former to the latter, and a jig 303— comprising the jig(s) 30B″, the stand 60Y to which it/they is/are mounted, and the plate 64 mounting the former to the latter.

Fabrication of a truss 14 using the system 100″ is carried out as follows.

The jig 30A‴ is arranged so as to align with the jig 30B‴ (along the Y axis direction), such that the face FS of block 34B of whichever of the left- and right-handed jigs 30B″ is employed (this being dependent on the handedness of the truss 14 being fabricated) aligns (i.e. is coplanar) with the face FS of the block 34A3 of the (correspondingly) left- or right-handed jig 30A. A stand 60X is positioned along rail 52 and the jig 30B‴ positioned along the rail 54 so as to underlie junctions J2 and J3 respectively when the members T, B and W are arranged over the support structure 20″. In the example shown, a further stand 60X is arranged between the stand 60X positioned to underlie junction J2, to support from below the member B at an intermediate position therealong.

In other examples, the further stand 60X may be omitted—particularly where the member B is short and/or relatively rigid (e.g. wide) so as not to bow when supported on the stands 60.

Also in other examples, plural (e.g. two or three) further stands 60X, spaced one-from-the-next, may be employed— particularly where the member B is long and/or relatively flexible (e.g. narrow). Also in other examples, at least one (further) stand 60Y may be arranged on rail 54 between the jig 30B″ and the jig 30A″ to support the member W from below at an intermediate position therealong if necessary likewise to preclude unacceptable bowing of member W. Also in other examples, a further transverse rail 54 may be employed, with a stand 60Y mounted thereon positioned to support member T from below at an intermediate position therealong if necessary likewise to preclude unacceptable bowing of member T.

Also employable is a further transverse rail 54 (not shown) with a stand 60Y moveably mounted thereon positioned to support extension E from below in the region of the position at which the attachment 19 is to be applied to that extension. A mount, likewise comprising a plate, is fastened (in the same manner) to the frame 62 of that stand and jig 30C″ in its left-handed or right-handed orientation (again depending on the handedness of the truss 14 being fabricated—being left-handed in the example illustrated) is secured, likewise such as by welding (or instead via fasteners), to the upper side of the mounting plate—whereby there is defined a jig (30C″) for locating and applying attachment 19.

After the members T, B and W have been relatively positioned in abutment with one another and engaged by the jigs 30A‴ and 30B‴ (in the same manner as described previously), they are stapled together—at the junctions J1, J2 and J3—so as to be preliminarily interconnected. The preliminary assembly comprising them is then lifted slightly and the attachments 16 placed into the cutouts 38 (and the attachment 19 placed into cutout 39 of jig 30C‴ if employed), and a nail plate 11 is arranged to underlie the junction J1 The preliminary assembly is then set back down (to re-engage the jigs 30A‴ and 30B‴ and other stand(s) 60) and nail plates 11 arranged over the junctions J1, J2 and J3 (in the same manner as in each of the previous embodiments), and the members B, W, T, nail plates 11 and (located) lower and upper attachments 16 (as well as attachment 19 if jig 300‴ is employed), pressed such that the teeth thereof are driven into members T, B at junction J1, members B and W at junction J2 and members T and W at junction J3, and into the extension E if jig 30C″ is so employed.

It will be appreciated that, in a variant of this embodiment, there may be included a jig (30D″), comprising the stand 60X which is to support the members T and B at junction J1, a mount, likewise comprising a plate, fastened (in the same manner) to the frame 62 of that stand and jig 30D—which is left-handed or right-handed depending on the handedness of the truss 14 being fabricated—is secured, likewise such as by welding or via threaded fasteners, to the upper side of the mounting plate—whereby there is defined a jig (30D″) for locating and applying the nail plate 11 on the same side (face) of the truss as the attachments 16/19.

Figure 16A:
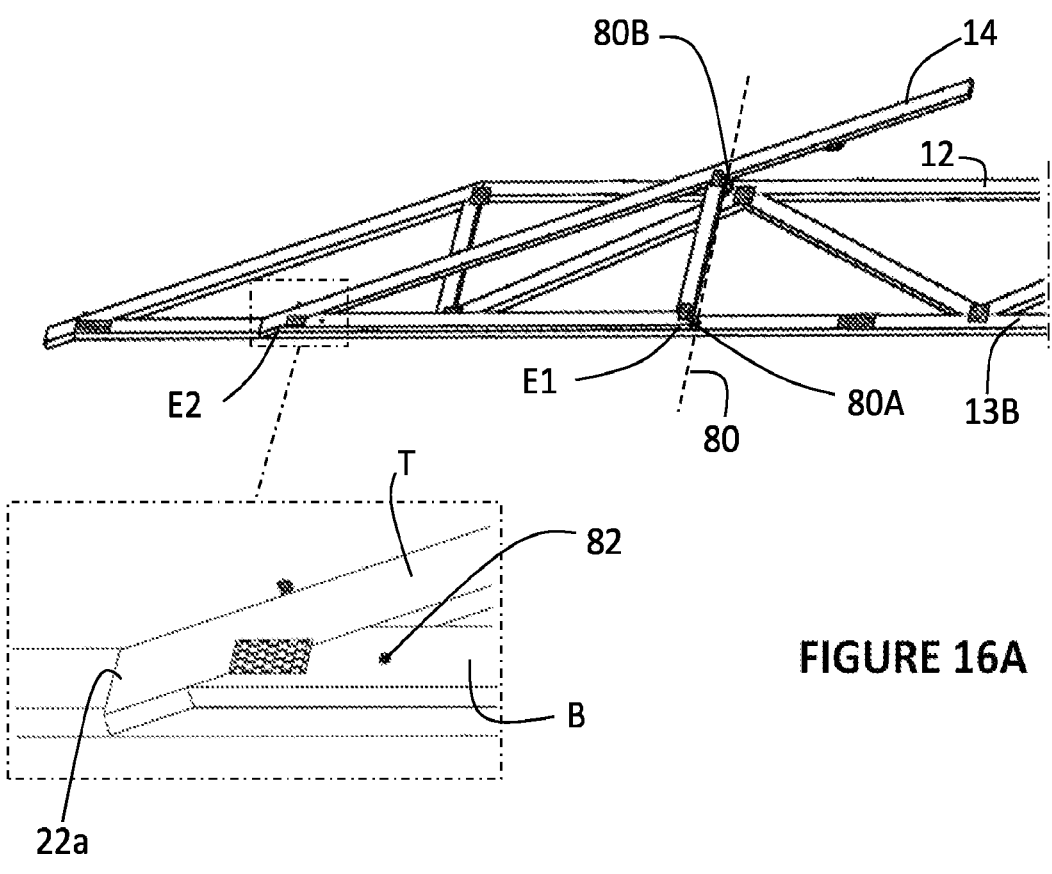
FIGS. 16A to 16O show how the supplementary truss 14 is located and secured to the main truss 12.
Figure 16B:
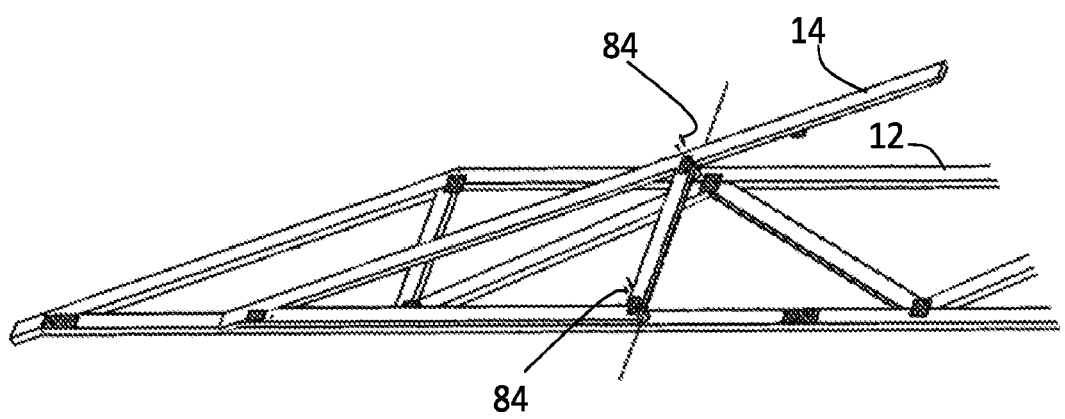
Figure 16C:
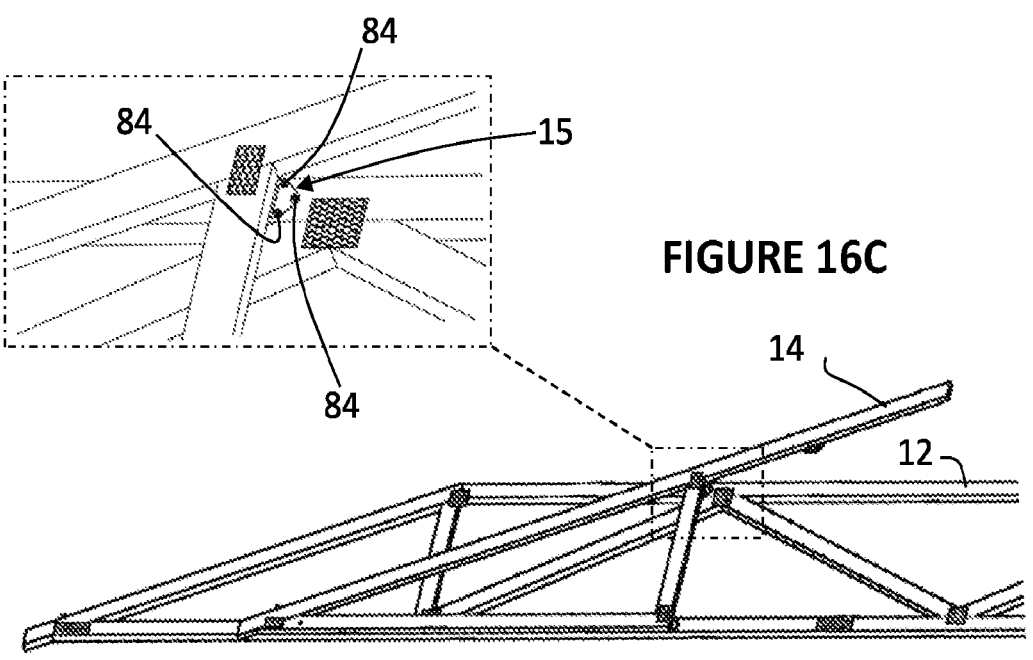

FIGS. 16A to 16C illustrate the process of securing a constructed supplementary truss 14 to a previously constructed main truss 12, manufactured in accordance with any of the embodiments described above.

Initially, referring to FIG. 16A, positions 80A and 80B on an axis 80 to which the hinge axes A are to be located are determined and marked on the main truss 12. The supplementary truss 14 is then positioned on the main truss 12 at the marked location while ensuring that ends E1, E2 of the supplementary truss 14 are in alignment with bottom chord 13B of the main truss 12. A screw 82 is inserted through both the main truss 12 and the supplementary truss 14 to facilitate securing the supplementary truss 14 to the main truss 12 and to prevent the supplementary truss swinging out from the main truss 12 until required to do so.

Referring to FIGS. 16B and 16C, each attachment 15 is then secured to the main truss 12, via three screws 84 that are received in the upper chord 13A and the lower chord 13B, though it will be appreciated that other fasteners may also be used. The process is then repeated for the/each other supplementary truss 14 that is to be secured to the main truss 12.

By fabricating the supplementary trusses as described and illustrated herein, the attachments 15/18 can be positioned accurately, thereby ensuring that swinging of the supplementary truss 14 from the main truss 12 results in an end 22a of the truss 14 which is outermost in use being accurately positioned for securement to a building frame. Also, by aligning ends E1, E2 of the bottom chord member B, in accordance with the preferred embodiments of the present disclosure, variations in the bottom chord member B, which may arise due to bowing of the timber, can be accommodated while ensuring that the said ends, which is where the supplementary truss 14 is secured, are more accurately positioned.

Advantageously, the jigging system according to the preferred embodiments of the present disclosure eliminates reliance upon the truss being already formed before the application of the attachments to it. Moreover, the configuration of the system is such that the attachments are spatially located, with precision, along perpendicular, i.e. "X" and "Y", axes, corresponding to horizontal and vertical axes, respectively, such being critical for the supplementary truss to be correctly positioned once swung into its extended condition and for the stop attachment to be correctly positioned to abut the truncated standard truss 500 whereby the latter is located. In particular, plates/cutouts of the jigs hold the attachments at known positions—both relative to those jigs and on the support structure/table—and the abuttable locators of the jigs (comprising blocks and fasteners/pegs/pins in the embodiments illustrated but may take different forms without departure from the present disclosure, as will be appreciated by a person skilled in the art) serve to hold/retain members at known positions—relative to one another and relative to the attachments.

The system accommodates dimensional imperfection of/within the members, particularly warping therein or bowing therealong, being designed such that reliance is not placed on the members themselves to orientate the axis of each hinge and the axis of the locating portion of the stop attachment and to set the correct spacing of the former axis to the latter axis.

Although the present disclosure is directed primarily at application of hinge attachments and locating attachments, as described, it is not limited to such application. Embodiments of the present disclosure may be directed at application of fastener attachments which (like the hinge attachments described and illustrated) fasten members one-to-another but (unlike those hinge attachments) not to another truss, or possibly not to any other structure whatsoever. Also, embodiments of the present disclosure may be directed at application of fastener attachments which (like the fastener (hinge) attachments described and illustrated) fasten the truss to another truss/structure but (unlike those hinge attachments) not members thereof one-to-another.

The present disclosure is not limited to application of attachments which (like the hinge and locating attachments described and illustrated) are self-securing. Embodiments of the present disclosure may, for example, be designed to apply attachments which are otherwise securable to members of the truss—e.g. via adhesive applied to the attachments (and/or to the member(s)), or by screwing or nailing (for instance).

Advantageously, the tables/support structures of the systems of particular preferred embodiments described and illustrated herein may, owing to the configuration of the jigs of those embodiments, comprise standard jigging tables.

Trusses, provided with attachments, are fabricated quickly, simply and repeatably using systems according to the preferred embodiments of the present disclosure.

Moreover, the functional symmetry between left-hand and right-hand hinge attachments allows for respective jig base plates to be orientable in either of face-up and face-down orientations (in the jigs of which they form a part), respectively, to receive such attachments (for application thereof), as will be clear from the foregoing and the drawings. Also, the functional symmetry of the locating attachment/the locating edges thereof allows for application of that attachment to the extension E of either a left-handed or a right-handed truss 14, and respective jig base plates likewise to be orientable, in either of face-up and face-down orientations (in the jigs of which they form a part), respectively, for such application—or (as in the case of jig 340, for example) allows for either of two locators/recesses/cutouts of the base plate, in a given position of that base plate/the jig of which it is a part, respectively, to receive the locating attachment for such application.

Also advantageous is that each jig in the preferred embodiments of the present disclosure defines a fixed structure comprising a unitary or single-piece base, formed with the/each attachment locator (cutout), and the member locator(s) (e.g. block(s)/pin(s)) thereof, eliminating a need to locate any one part of the jig relative to any other part thereof to arrange it correctly/locate it over/on the support structure.

The system, advantageously, is used both for fabrication of the truss and to locate/apply the attachments (while the members of the truss are held/retained in position thereby) in/during/as part of such fabrication, eliminating separate handling. Owing to the precision/accuracy of location effected by the system, installation of the truss and the assembly of which it forms a part can be effected rapidly and easily, so that a tradesperson, working at height in performing the installation, is not subjected to unnecessary hazards and can be relatively unskilled. More particularly, the tradesperson, other than having to ensure correct positioning of the truss 12 and rotational displacement of the (/each) truss 14 (when swung out) relative to it, and that the stops are abutted by truss 500 and fasteners (described below) are driven fully thereinto/therethrough, need have little or no other input into the formation of the assembly 1000. Certification of that assembly can thus be established easily; in particular, an inspector may be able to certify the connection merely by confirming visually that the stops are abutted and the fasteners have been driven fully home.

The attendant improvements to safety are achieved in combination with improvements to, rather than at the expense of, manufacturing efficiency and accuracy.

Figure 17A:
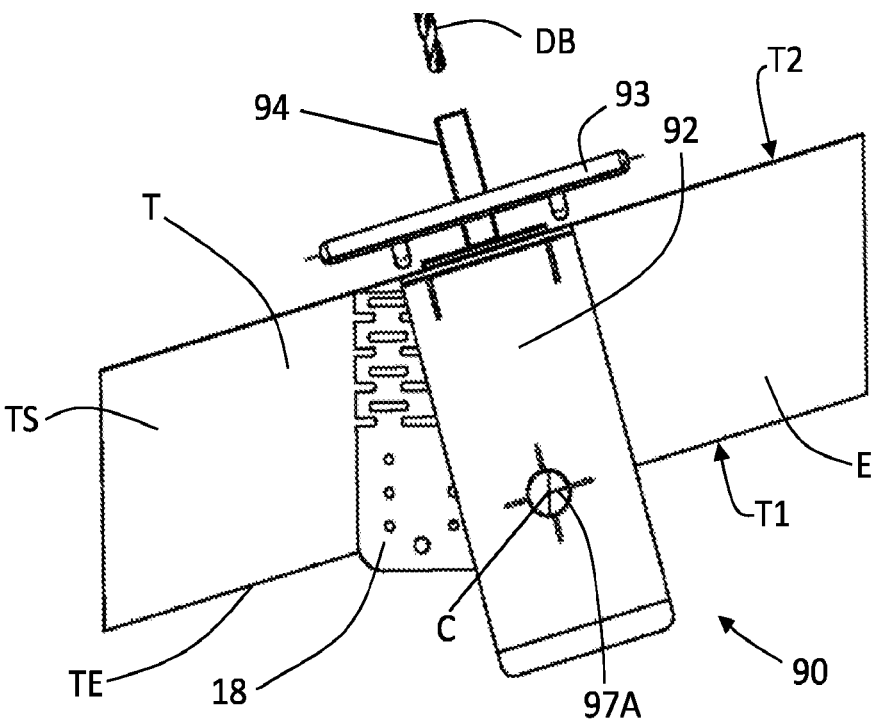
FIGS. 17A and 17B show the use of a jig to drill a hole in the top chord extension to receive the aforementioned screw.
Figure 17B:
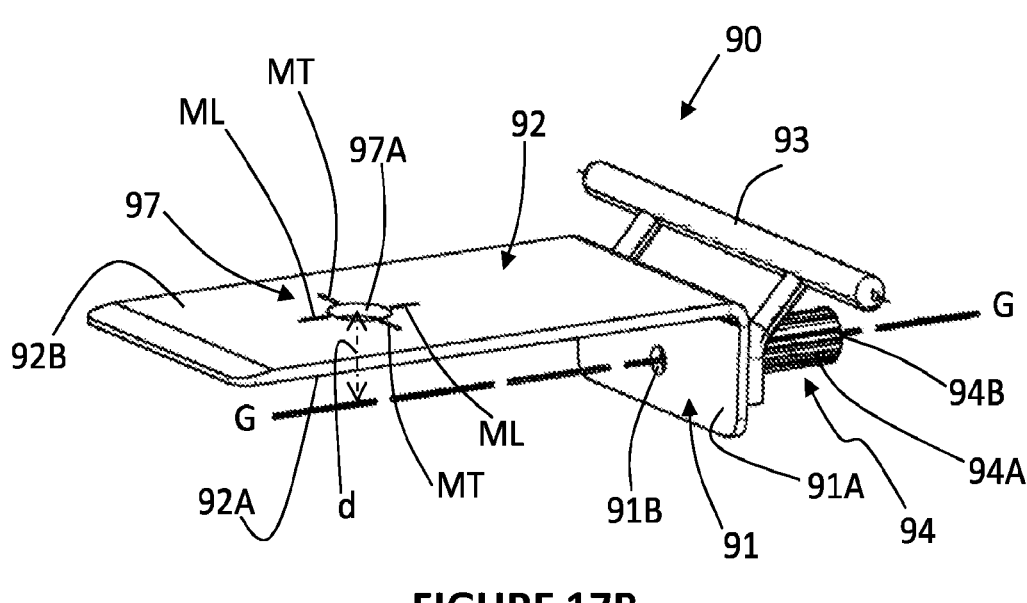

Referring to FIGS. 17A and 17B, a jig 90 may be used to locate and guide a rotating drill bit DB to drill, in a correct position and orientation, a hole 70 (shown in FIG. 1B) in/through the top chord T for receiving a fastener 75, preferably a screw, such that the fastener 75, when the assembly 10 in its erected configuration is located to the truss 500 (by abutment between the locating edges 19D of the attachments 18 and the truncated standard truss top chord 500T), will be received in the top chord 500T at the correct position, in the correct orientation, and to an appropriate depth therein upon being driven fully home (along its axis). The jig 90 and usages thereof are disclosed in Australian provisional patent application no. 2020900798, to the same applicant, the content of which application is incorporated herein by reference.

The jig 90 comprises locators 91 and 92, configured for receipt against the member T and the attachment 18 applied thereto, a handle 93, connected to those locators, via which the jig 90 can be manipulated to effect said receipt, and a guide 94, for guiding a drill bit DB, which guide is connected to the locator 91 and comprises a drilling bush 94A.

The locators 91 and 92 have flat surfaces which define perpendicular locating faces 91A and 92A and are receivable against an axial face T2 of top chord T and over/against an axial side face TS of the top chord T and the attachment 18 secured thereagainst, respectively. The axial face T2 is the upper face of the truss 14 when in situ, and is parallel with and opposite to face T1.

The locator 91 is configured with a hole 91B via which a bore 94B of the guide 94/bush 94A opens through the face 91A, the bore 94B being of a diameter such that the bit DB and guide 94 form a close sliding fit when the former is received by the latter.

The jig 90 further includes a visual locator 97, which comprises an aperture/hole 97A through the locator 92, the perpendicular spacing between the centre C of the hole 97A and the plane in which the locating face 91A lies being the same as the spacing between the faces T1 and T2. Also, referring in particular to FIG. 17B, the perpendicular distance d between face 92A and a central axis G of the bore 94B is half of a thickness (or transverse width) dimension t of the top chord T. Thus, when the locator 91/face 91A and the locator 92/face 92A are received against the face T2 and over/against the face TS/attachment 18 respectively, the hole 97A is bisected by an edge TE of the member T at which the faces T1 and TS meet and the bore axis G passes through an axial centreline of the member T. The dimensioning and location of the attachment 18 are such that when the jig 90 is positioned (along the axis of the member T) whereby hole centre C overlies/coincides with a point pt (marked in FIG. 1B) at which the attachment edge 19D overlies or coincides with the edge TE, as shown in FIG. 17A, the jig 90 is located to the member T whereby the hole 70, when drilled by the bit DB guided by the guide 94, is in said correct position and orientation.

The visual locator 97 may include, provided on a face of the locator 92B, opposite to face 92A thereof, perpendicular transverse MT and longitudinal ML marker lines adjacent the hole 97A and to either side thereof—as if continuations of crosshairs in the aperture 97A—to facilitate visual location of the hole centre C and thus determination of whether and when the hole centre C overlies or is coincident with the point pt.

Plural trusses 14 or truss assemblies 10 (in the collapsed condition)—in which holes 70 have yet to be formed—may be arranged one-atop-another in a stack, within which each is orientated such that the plane P thereof is generally horizontal. It is in such a stack that the trusses 14 or truss assemblies 10, typically strapped up, are transported between the factory or other facility/installation at which they are fabricated, and site. In the case of each truss 14 in the stack, the jig 90, with the aid of the handle 93, is moved in a direction towards the face T2 of the member T thereof and the locator 92, where the truss is not the uppermost of the trusses 14 in the stack, is interposed between that member T and the member T of the truss 14 adjacent to and overlying it. The jig 90 is then located to the member T, using the point pt as a datum, and the hole 70 drilled with the aid of the jig 90, in the manner describe. Advantageously, because the locator 92 is thin and projects (distally)/ is cantilevered from locator 91, the interposition thereof between the adjacent trusses can be effected readily—by directing the jig 90/locator 92 forwardly, with a tapered tip 920 thereof leading, into the interface therebetween, pushing them apart slightly if they are abutting or in particularly close proximity to each other, without any need to lift the upper truss to create a clearance for receiving the locator 92—and is facilitated by that locator's leading edge defining the tip 920.

As the hinged assembly of the supplementary trusses 14 to the main truss 12 takes place as part of the pre-fabrication process in the factory, the supplementary trusses 14 will be accurately positioned relative to the main truss 12. All that is required is for each supplementary truss 14 to be swung about the vertical hinge axis into its required orientation transverse to the main truss 12 and fastened at its outer end E2 to underlying wall structure, usually the top plate of the underlying wall frame. The example which has been given is of a hip formed with two supplementary trusses 14 hinged to the main truss 12. It will readily be understood that there may be more than two supplementary trusses in such a structure and the general principles described herein are applicable to a wide range of other roof structures, such as gables or valleys defined by trusses in mutually transverse orientations.

Following positioning, roof trusses are usually fixed to the underlying top plate or other structure by brackets nailed to the top plate and lower chord of the truss, typically using a nail gun for this purpose.

While various embodiments of the present disclosure have been described above, it should be understood that they have been presented by way of example only, and not by way of limitation. It will be apparent to a person skilled in the relevant art that various changes in form and detail can be made therein without departing from the spirit and scope of the present disclosure. Thus, the present disclosure should not be limited by any of the above described exemplary embodiments.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A jigging system for fabrication of a frame including a plurality of members and an attachment connected to one or more of the members, the jigging system comprising:
    a support structure configured to support the plurality of members in a plane; and
    a plurality of jigs supported by the support structure and configured to hold the attachment in an orthogonal direction to the plane and to abut a face of one of the members of the frame transverse to the plane, such that the attachment can be connected to the frame,
    wherein one of the jigs includes:
        a plate that defines a slot configured to receive a fastener to secure the plate to the support structure, and
        a locating block and a locating pin, each connected to and extending upwards from the plate and engageable with the plurality of members; and
    wherein one of the jigs includes:
        a holder configured to hold the attachment in a predetermined orientation relative to the frame such that hinges can be connected to the attachment and the frame to enable the attachment to rotationally move with respect to the frame.

2. The jigging system of claim 1, wherein one of the jigs is configured to abut one of the members to locate the attachment.

3. The jigging system of claim 1, wherein the frame is a truss and the members of the frame include web and chord members of the truss.

4. The jigging system of claim 3, wherein the members includes bottom and top chord members of the truss, wherein the top chord member is sloped, and wherein the members include a web member interconnecting the bottom and top chord members.

5. The jigging system of claim 4, wherein one of the jigs is configured to abut the top chord member and the web member adjacent a junction therebetween, such that the attachment can be connected to the top chord member and the web member.

6. The jigging system of claim 4, wherein one of the jigs is configured to abut the bottom chord member and the web member adjacent a junction therebetween, such that the attachment can be connected to the bottom chord member and the web member.

7. The jigging system of claim 4, wherein one of the jigs is configured to enable a hinge to be connected to the attachment and the frame such that the attachment can swing about the hinge relative the frame.

8. The jigging system of claim 4, wherein the jigs are configured to enable hinges to be connected to the attachment and the frame such that the attachment can swing about the hinges relative the frame.

9. The jigging system of claim 8, wherein the jigs are configured to position the attachment relative to the frame such that the attachment is subsequently movable to a position to be attached to another truss extending in a direction parallel to the truss.

10. The jigging system of claim 1, wherein the holder is keyed to the attachment.

11. The jigging system of claim 1, wherein the holder defines a recess configured to receive the attachment.

12. The jigging system of claim 1, wherein at least one of the jigs is configured to prevent movement of the frame in the plane.

13. The jigging system of claim 1, wherein at least one of the jigs is configured to prevent movement of the attachment in a plane parallel to the plane in which the frame lies.

14. A jigging system for fabrication of a frame including a plurality of members and an attachment connected to one or more of the members, the jigging system comprising:

a support structure configured to support the plurality of members in a plane; and a plurality of jigs supported by the support structure and configured to abut a face of one of the members of the frame transverse to the plane, such that the attachment can be connected to the frame, wherein one of the jigs defines a recess configured to receive the attachment and defined by a first edge extending longitudinally to align a first edge of the attachment and a second edge extending transversely to align a second edge of the attachment to position the attachment in a predetermined orientation relative to the frame.

15. The jigging system of claim 14, wherein the recess is defined by a third edge extending diagonally to align a third edge of the attachment to position the attachment in the predetermined orientation relative to the frame.

\* \* \* \* \*